US010282024B2

(12) United States Patent
Harrison et al.

(10) Patent No.: US 10,282,024 B2
(45) Date of Patent: May 7, 2019

(54) CLASSIFYING CONTACTS OR ASSOCIATIONS WITH A TOUCH SENSITIVE DEVICE

(71) Applicant: Qeexo, Co., Mountain View, CA (US)

(72) Inventors: Chris Harrison, Pittsburgh, PA (US); Joshua Dale Stone, Pittsburgh, PA (US)

(73) Assignee: QEEXO, CO., Mountain View, CA (US)

(*) Notice: Subject to any disclaimer, the term of this patent is extended or adjusted under 35 U.S.C. 154(b) by 0 days.

(21) Appl. No.: 15/886,562

(22) Filed: Feb. 1, 2018

(65) Prior Publication Data

US 2018/0157371 A1 Jun. 7, 2018

Related U.S. Application Data

(63) Continuation-in-part of application No. 14/684,407, filed on Apr. 12, 2015.

(Continued)

(51) Int. Cl.
*G06F 3/041* (2006.01)
*G06F 3/044* (2006.01)
*G06F 3/0481* (2013.01)

(52) U.S. Cl.
CPC ............ *G06F 3/0416* (2013.01); *G06F 3/044* (2013.01); *G06F 3/0481* (2013.01)

(58) Field of Classification Search
CPC ........ G06F 3/0416; G06F 2203/04104; G06K 9/6201; G06K 9/6267; G06K 9/46
See application file for complete search history.

(56) References Cited

U.S. PATENT DOCUMENTS 2,008,028 A 7/1935 Mccortney et al.
2,430,005 A 11/1947 Denneen et al.
(Continued)

FOREIGN PATENT DOCUMENTS

CN 1797305 A 7/2006
CN 1928781 A 3/2007
(Continued)

OTHER PUBLICATIONS

Kherallah, M et al., "On-line handwritten digit recognition based on trajectory and velocity modeling," Pattern Recognition Letters, vol. 29, Issue 5, pp. 580-594, Apr. 1, 2008.
(Continued)

*Primary Examiner* — Liliana Cerullo
(74) *Attorney, Agent, or Firm* — Amin, Turocy & Watson, LLP

(57) ABSTRACT

Techniques enabling improved classification of objects against a touch sensitive surface of a touch sensitive device are presented. An object classification component can analyze touch screen data associated with a touch sensitive surface associated with a device and motion information relating to motion along at least one axis associated with the device. The object classification component can determine a contact classification for an object with respect to the touch sensitive surface, based on a result(s) of the analyzing, and in response to determining a contact state of the object with respect to the touch sensitive surface. An event determination component can control a function associated with the touch sensitive surface based on the contact classification for the object, the function comprising enabling or disabling a touch sensitive function of the touch sensitive surface of a display screen of the device or switching the display screen on or off.

28 Claims, 23 Drawing Sheets
(2 of 23 Drawing Sheet(s) Filed in Color)

Related U.S. Application Data

(60) Provisional application No. 62/055,416, filed on Sep. 25, 2014.

(56) References Cited

U.S. PATENT DOCUMENTS

| | | | |
|---|---|---|---|
| 3,354,531 | A | 11/1967 | Pryor |
| 4,561,105 | A | 12/1985 | Crane et al. |
| 4,597,932 | A | 7/1986 | Kurihara et al. |
| 4,686,332 | A | 8/1987 | Greanias et al. |
| 5,483,261 | A | 1/1996 | Yasutake |
| 5,544,265 | A | 8/1996 | Bozinovic et al. |
| 5,596,656 | A | 1/1997 | Goldberg |
| 5,615,285 | A | 3/1997 | Beernink |
| 5,625,818 | A | 4/1997 | Zarmer et al. |
| 5,666,438 | A | 9/1997 | Beernink et al. |
| 5,867,163 | A | 2/1999 | Kurtenbach |
| 5,933,514 | A | 8/1999 | Ostrem et al. |
| 6,028,593 | A | 2/2000 | Rosenberg et al. |
| 6,118,435 | A | 9/2000 | Fujita et al. |
| 6,208,330 | B1 | 3/2001 | Hasegawa et al. |
| 6,212,295 | B1 | 4/2001 | Ostrem et al. |
| 6,222,465 | B1 | 4/2001 | Kumar et al. |
| 6,246,395 | B1 | 6/2001 | Goyins et al. |
| 6,252,563 | B1 | 6/2001 | Tada et al. |
| 6,337,698 | B1 | 1/2002 | Keely, Jr. et al. |
| 6,492,979 | B1 | 12/2002 | Kent et al. |
| 6,504,530 | B1 | 1/2003 | Wilson et al. |
| 6,643,663 | B1 | 11/2003 | Dabney et al. |
| 6,707,451 | B1 | 3/2004 | Nagaoka |
| 6,748,425 | B1 | 6/2004 | Duffy et al. |
| 6,772,396 | B1 | 8/2004 | Cronin et al. |
| 6,933,930 | B2 | 8/2005 | Devige et al. |
| 6,943,665 | B2 | 9/2005 | Chornenky |
| 7,050,955 | B1 | 5/2006 | Carmel et al. |
| 7,084,884 | B1 | 8/2006 | Nelson et al. |
| 7,098,896 | B2 | 8/2006 | Kushler et al. |
| 7,212,197 | B1 | 5/2007 | Schkolne et al. |
| 7,443,396 | B2 | 10/2008 | Ilic |
| 7,581,194 | B2 | 8/2009 | Iwema et al. |
| 7,982,724 | B2 | 7/2011 | Hill |
| 8,086,971 | B2 | 12/2011 | Radivojevic et al. |
| 8,144,126 | B2 | 3/2012 | Wright |
| 8,154,524 | B2 | 4/2012 | Wilson et al. |
| 8,154,529 | B2 | 4/2012 | Sleeman et al. |
| 8,199,126 | B1 | 6/2012 | Taubman |
| 8,253,744 | B2 | 8/2012 | Macura et al. |
| 8,269,744 | B2 | 9/2012 | Agari et al. |
| 8,327,029 | B1 | 12/2012 | Purser |
| 8,441,790 | B2 | 5/2013 | Pance et al. |
| 8,547,357 | B2 | 10/2013 | Aoyagi |
| 8,624,878 | B2 | 1/2014 | Sarwar et al. |
| 8,670,632 | B2 | 3/2014 | Wilson |
| 8,674,943 | B2 | 3/2014 | Westerman et al. |
| 8,743,091 | B2 | 6/2014 | Bernstein |
| 8,760,395 | B2 | 6/2014 | Kim et al. |
| 8,762,332 | B2 | 6/2014 | Keebler et al. |
| 8,769,524 | B2 | 7/2014 | Bhullar et al. |
| 9,030,498 | B2 | 5/2015 | Galor et al. |
| 9,060,007 | B2 | 6/2015 | Keebler et al. |
| 9,182,882 | B2 | 11/2015 | Fowler et al. |
| 9,329,688 | B2 | 5/2016 | Harrison |
| 9,329,715 | B2 | 5/2016 | Schwarz et al. |
| 9,377,863 | B2 | 6/2016 | Bychkov et al. |
| 9,557,852 | B2 | 1/2017 | Tsai et al. |
| 9,612,689 | B2 | 4/2017 | Harrison et al. |
| 9,696,859 | B1 | 7/2017 | Heller et al. |
| 9,864,453 | B2 | 1/2018 | Munemoto et al. |
| 2002/0009227 | A1 | 1/2002 | Goldberg et al. |
| 2002/0057837 | A1 | 5/2002 | Wilkinson et al. |
| 2002/0070927 | A1 | 6/2002 | Fujitsuka et al. |
| 2002/0126161 | A1 | 9/2002 | Kuzunuki et al. |
| 2003/0048260 | A1 | 3/2003 | Matusis |
| 2003/0110085 | A1 | 6/2003 | Murren et al. |
| 2003/0132922 | A1 | 7/2003 | Philipp |
| 2003/0217873 | A1 | 11/2003 | Paradiso et al. |
| 2004/0012573 | A1 | 1/2004 | Morrison et al. |
| 2004/0021681 | A1 | 2/2004 | Liao |
| 2004/0054711 | A1 | 3/2004 | Multer |
| 2004/0141010 | A1 | 7/2004 | Fitzmaurice et al. |
| 2004/0160421 | A1 | 8/2004 | Sullivan |
| 2004/0199867 | A1 | 10/2004 | Brandenborg |
| 2004/0225730 | A1 | 11/2004 | Brown et al. |
| 2005/0131778 | A1 | 6/2005 | Bennett et al. |
| 2005/0146512 | A1 | 7/2005 | Hill et al. |
| 2005/0289461 | A1 | 12/2005 | Amado et al. |
| 2006/0010400 | A1 | 1/2006 | Dehlin et al. |
| 2006/0031746 | A1 | 2/2006 | Toepfer et al. |
| 2006/0173985 | A1 | 8/2006 | Moore |
| 2006/0184617 | A1 | 8/2006 | Nicholas et al. |
| 2006/0217126 | A1 | 9/2006 | Sohm et al. |
| 2006/0230021 | A1 | 10/2006 | Diab et al. |
| 2006/0288329 | A1 | 12/2006 | Gandhi et al. |
| 2007/0011205 | A1 | 1/2007 | Majjasie et al. |
| 2007/0044010 | A1 | 2/2007 | Sull et al. |
| 2007/0075965 | A1* | 4/2007 | Huppi ............... H04M 1/72563 345/156 |
| 2007/0100959 | A1 | 5/2007 | Eichstaedt et al. |
| 2007/0109279 | A1 | 5/2007 | Sigona |
| 2007/0126716 | A1 | 6/2007 | Haverly |
| 2007/0168367 | A1 | 7/2007 | Dickinson et al. |
| 2007/0186157 | A1 | 8/2007 | Walker et al. |
| 2007/0192674 | A1 | 8/2007 | Bodin et al. |
| 2007/0245020 | A1 | 10/2007 | Ott |
| 2007/0257767 | A1 | 11/2007 | Beeson et al. |
| 2007/0291297 | A1 | 12/2007 | Harmon et al. |
| 2008/0005666 | A1 | 1/2008 | Sefton et al. |
| 2008/0036743 | A1 | 2/2008 | Westerman et al. |
| 2008/0082941 | A1 | 4/2008 | Goldberg et al. |
| 2008/0103906 | A1 | 5/2008 | Singh |
| 2008/0117168 | A1 | 5/2008 | Liu et al. |
| 2008/0126388 | A1 | 5/2008 | Naaman |
| 2008/0141132 | A1 | 6/2008 | Tsai |
| 2008/0155118 | A1 | 6/2008 | Glaser et al. |
| 2008/0158168 | A1* | 7/2008 | Westerman ........... G06F 3/0418 345/173 |
| 2008/0158185 | A1 | 7/2008 | Westerman |
| 2008/0168403 | A1 | 7/2008 | Westerman et al. |
| 2008/0180406 | A1 | 7/2008 | Han et al. |
| 2008/0244468 | A1 | 10/2008 | Nishihara et al. |
| 2008/0288347 | A1 | 11/2008 | Sifry |
| 2008/0319932 | A1 | 12/2008 | Yih et al. |
| 2009/0025987 | A1 | 1/2009 | Perski et al. |
| 2009/0073144 | A1 | 3/2009 | Chen et al. |
| 2009/0095540 | A1 | 4/2009 | Zachut et al. |
| 2009/0150373 | A1 | 6/2009 | Davis et al. |
| 2009/0174679 | A1 | 7/2009 | Westerman |
| 2009/0178011 | A1 | 7/2009 | Ording et al. |
| 2009/0231275 | A1 | 9/2009 | Odgers et al. |
| 2009/0232355 | A1 | 9/2009 | Minear et al. |
| 2009/0254869 | A1 | 10/2009 | Ludwig et al. |
| 2009/0259628 | A1 | 10/2009 | Farrell et al. |
| 2009/0262637 | A1 | 10/2009 | Badaye et al. |
| 2009/0315835 | A1 | 12/2009 | De Goes et al. |
| 2009/0318192 | A1 | 12/2009 | Leblanc et al. |
| 2010/0036967 | A1 | 2/2010 | Caine et al. |
| 2010/0060602 | A1 | 3/2010 | Agari et al. |
| 2010/0085216 | A1 | 4/2010 | Ms |
| 2010/0094633 | A1 | 4/2010 | Kawamura et al. |
| 2010/0123666 | A1 | 5/2010 | Wickholm et al. |
| 2010/0127997 | A1 | 5/2010 | Park et al. |
| 2010/0214267 | A1 | 8/2010 | Radivojevic et al. |
| 2010/0225601 | A1 | 9/2010 | Homma et al. |
| 2010/0251112 | A1 | 9/2010 | Hinckley et al. |
| 2010/0265185 | A1 | 10/2010 | Oksanen et al. |
| 2010/0271322 | A1 | 10/2010 | Kondoh et al. |
| 2010/0274622 | A1 | 10/2010 | Kennedy et al. |
| 2010/0279738 | A1 | 11/2010 | Kim et al. |
| 2010/0289754 | A1 | 11/2010 | Sleeman et al. |
| 2010/0306649 | A1 | 12/2010 | Russ et al. |
| 2010/0309158 | A1 | 12/2010 | Iwayama et al. |
| 2010/0309933 | A1 | 12/2010 | Stark et al. |
| 2011/0007000 | A1 | 1/2011 | Lim |
| 2011/0057670 | A1 | 3/2011 | Jordan |
| 2011/0057885 | A1 | 3/2011 | Lehtovirta |

(56) References Cited

U.S. PATENT DOCUMENTS

| | | |
|---|---|---|
| 2011/0074701 A1 | 3/2011 | Dickinson et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King et al. |
| 2011/0187652 A1 | 8/2011 | Huibers |
| 2011/0202848 A1 | 8/2011 | Ismalon |
| 2011/0231290 A1 | 9/2011 | Narcisse et al. |
| 2011/0246463 A1 | 10/2011 | Carson et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson et al. |
| 2011/0298798 A1 | 12/2011 | Krah et al. |
| 2011/0310040 A1 | 12/2011 | Ben-Shalom et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski et al. |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig et al. |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West et al. |
| 2013/0091123 A1 | 4/2013 | Chen et al. |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrison et al. |
| 2014/0210791 A1 | 7/2014 | Hanauer et al. |
| 2014/0240271 A1 | 8/2014 | Land et al. |
| 2014/0253477 A1 | 9/2014 | Shim et al. |
| 2014/0267085 A1 | 9/2014 | Li et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield et al. |
| 2015/0145820 A1 | 5/2015 | Huang et al. |
| 2015/0242009 A1 | 8/2015 | Xiao et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1* | 3/2016 | Schwarz .............. G06F 3/041 345/173 |
| 2016/0077650 A1 | 3/2016 | Durojaiye et al. |
| 2016/0085324 A1 | 3/2016 | Schwarz et al. |
| 2016/0117015 A1 | 4/2016 | Veneri et al. |
| 2016/0171192 A1* | 6/2016 | Holz .............. G06F 21/31 726/19 |

FOREIGN PATENT DOCUMENTS

| | | |
|---|---|---|
| CN | 101111817 A | 1/2008 |
| CN | 101339477 A | 1/2009 |
| CN | 101410781 B1 | 4/2009 |
| CN | 101438218 A | 5/2009 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| EP | 938039 A2 | 8/1999 |
| EP | 1659481 A2 | 5/2006 |
| EP | 1762926 A2 | 3/2007 |
| EP | 2136358 A1 | 12/2009 |
| EP | 2280337 A2 | 2/2011 |
| GB | 2344894 A | 6/2000 |
| GB | 2468742 A | 9/2010 |
| JP | H0969137 A | 3/1997 |
| JP | 2004-213312 A | 7/2004 |
| JP | 2007-524970 A | 8/2007 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 1994004992 A1 | 3/1994 |
| WO | 2006070044 A1 | 7/2006 |
| WO | 2008126347 A1 | 10/2008 |
| WO | 2009071919 A1 | 6/2009 |
| WO | 2011096694 A2 | 8/2011 |
| WO | 2012064034 A1 | 5/2012 |
| WO | 2013059488 A1 | 4/2013 |
| WO | 2014182435 A1 | 11/2014 |

OTHER PUBLICATIONS

Matsushita, N. et al., "HoloWall: Designing a Finger, Hand, Body, and Object Sensitive Wall," Proceedings of UIST, 1997, pp. 209-210.

Mimio; http://www.mimio.com.

Non- Final Office Action dated Dec. 30, 2015 in U.S. Appl. No. 14/503,894.

Non-Final Office Action dated Apr. 15, 2015 in U.S. Appl. No. 13/856,414.

(56) References Cited

OTHER PUBLICATIONS

Non-Final Office Action dated Apr. 16, 2018 in U.S. Appl. No. 13/958,427.
Non-Final Office Action dated Apr. 19, 2017 in U.S. Appl. No. 14/869,998.
Non-Final Office Action dated Apr. 21, 2017 in U.S. Appl. No. 15/075,648.
Non-Final Office Action dated Apr. 26, 2018 in U.S. Appl. No. 14/495,041.
Non-Final Office Action dated Apr. 6, 2015 in U.S. Appl. No. 13/887,711.
Non-Final Office Action dated Dec. 1, 2016 in U.S. Appl. No. 14/486,800.
Non-Final Office Action dated Dec. 18, 2015 in U.S. Appl. No. 14/483,150.
Non-Final Office Action dated Dec. 20, 2017 in U.S. Appl. No. 14/834,434.
Non-Final Office Action dated Dec. 28, 2015 in U.S. Appl. No. 14/242,127.
Non-Final Office Action dated Feb. 2, 2017 in U.S. Appl. No. 14/191,329.
Non-Final Office Action dated Jan. 29, 2016 in U.S. Appl. No. 14/219,919.
Non-Final Office Action dated Jul. 8, 2015 in U.S. Appl. No. 14/191,329.
Non-Final Office Action dated Jul. 8, 2016 in U.S. Appl. No. 14/684,407.
Non-Final Office Action dated Jul. 11, 2017 in U.S. Appl. No. 14/390,831.
Non-Final Office Action dated Jul. 17, 2017 in U.S. Appl. No. 15/073,407.
Non-Final Office Action dated Jul. 19, 2017 in U.S. Appl. No. 14/219,919.
Non-Final Office Action dated Jun. 2, 2015 in U.S. Appl. No. 14/242,127.
Non-Final Office Action dated Jun. 9, 2016 in U.S. Appl. No. 14/612,089.
Non-Final Office Action dated Jun. 13, 2016 in U.S. Appl. No. 15/073,407.
Non-Final Office Action dated Jun. 13, 2016 in U.S. Appl. No. 14/751,589.
Non-Final Office Action dated Jun. 24, 2014 in U.S. Appl. No. 13/849,698.
Non-Final Office Action dated Aug. 2, 2017 in U.S. Appl. No. 14/684,407.
Non-Final Office Action dated Mar. 13, 2015 in U.S. Appl. No. 13/958,427.
Non-Final Office Action dated May 7, 2018 in U.S. Appl. No. 14/191,329.
Non-Final Office Action dated May 9, 2018 in U.S. Appl. No. 13/887,711.
Non-Final Office Action dated May 16, 2017 in U.S. Appl. No. 14/503,894.
Non-Final Office Action dated May 31, 2017 in U.S. Appl. No. 14/612,089.
Non-Final Office Action dated Nov. 5, 2015 in U.S. Appl. No. 13/887,711.
Non-Final Office Action dated Nov. 10, 2016 in U.S. Appl. No. 13/958,427.
Non-Final Office Action dated Nov. 15, 2017 in U.S. Appl. No. 15/198,062.
Non-Final Office Action dated Nov. 24, 2015 in U.S. Appl. No. 14/191,329.
Non-Final Office Action dated Nov. 25, 2016 in U.S. Appl. No. 14/495,041.
Non-Final Office Action dated Oct. 8, 2015 in U.S. Appl. No. 13/958,427.
Non-Final Office Action dated Oct. 1, 2015 in U.S. Appl. No. 14/492,604.
Non-Final Office Action dated Oct. 16, 2014 in U.S. Appl. No. 13/780,494.
Non-Final Office Action dated Oct. 18, 2017 in U.S. Appl. No. 15/406,770.
Non-Final Office Action dated Oct. 19, 2015 in U.S. Appl. No. 14/668,870.
Non-Final Office Action dated Oct. 2, 2015 in U.S. Appl. No. 14/486,800.
Non-Final Office Action dated Oct. 23, 2014 in U.S. Appl. No. 14/275,124.
Non-Final Office Action dated Oct. 25, 2013 in U.S. Appl. No. 13/410,956.
Non-Final Office Action dated Oct. 28, 2015 in U.S. Appl. No. 14/390,831.
Non-Final Office Action dated Oct. 7, 2015 in U.S. Appl. No. 14/495,041.
Non-Final Office Action dated Sep. 8, 2016 in U.S. Appl. No. 14/492,604.
Non-Final Office Action dated Sep. 9, 2016 in U.S. Appl. No. 13/887,711.
Non-Final Office Action dated Sep. 21, 2016 in U.S. Appl. No. 15/206,554.
Non-Final Office Action dated Sep. 29, 2016 in U.S. Appl. No. 14/834,434.
Olwal, A. et al., "SurfaceFusion: Unobtrusive Tracking of Everyday Objects in Tangible User Interfaces," Proceedings of GI, 2008, pp. 235-242.
Paradiso, J. et al., "Sensor Systems for Interactive Surfaces," IBM Systems Journal, vol. 39, Issue 3-4, pp. 892-914, 2000.
Paradiso, J. et al., "Tracking and Characterizing Knocks Atop Large Interactive Displays," Sensor Review, vol. 25, Issue 2, pp. 134-143, 2005.
Patten, J. et al., "A Wireless Object Tracking Platform for Tangible User Interfaces," Proceedings of CHI, 2001, pp. 253-260.
Pedro, L. et al., "Augmenting touch interaction through acoustic sensing", Proceedings of the ACM International Conference on Interactive Tabletops and Surfaces, pp. 53-56, Nov. 13-16, 2011.
Rekimoto, J. et al., "Augmented Surfaces: A Spatially Continuous Work Space for Hybrid Computing Environments," Proceedings of CHI, 1999, pp. 378-385.
Rekimoto, J. et al., "TooiStone: Effective use of the Physical Manipulation Vocabularies of Input Devices," Proceedings of UIST, 2000, pp. 109-117.
Rekimoto, J., "SmartSkin: An Infrastructure for Freehand Manipulation on Interactive Surfaces," Proceedings of CHI, 2002, pp. 113-120.
Sarah, M. K. et al., "A Personal Touch—Recognizing Users Based on Touch Screen Behavior," PhoneSense'12, Nov. 6, 2012, Toronto, ON, Canada, Nov. 6, 2012, pp. 5.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0.
Seo, J.S. et al., "Audio fingerprinting based on normalized spectral subband centroids," IEEE International Conference on Acoustics, Speech, and Signal Processing, vol. 3, pp. 213-216, 2005.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Vandoren, P. et al., "DIP-IT: Digital Infrared Painting on an Interactive Table," Proceedings of CHI, 2008, pp. 2901-2906.

(56) References Cited

OTHER PUBLICATIONS

"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018.
Asano, F. et al., "Real-Time Sound Source Localization and Separation System and Its Application to Automatic Speech Recognition," Proceedings of Eurospeech, 2001, pp. 1013-1016, 2001.
Benko, H. et al., "Sphere: Multi-Touch Interactions on a Spherical Display," Proceedings of the 21st annual ACM symposium on User interface software and technology, 2008, pp. 77-86.
Burges, Christopher, "A Tutorial on Support Vector Machines for Pattern Recognition," Data Mining and Knowledge Discovery, vol. 2, Issue 2, pp. 121-167, Jun. 1998.
Cao, X. et al., "Leveraging Contact Shape on Interactive Surfaces," IEEE International Workshop on Horizontal Interactive Human Computer System (TABLETOP), pp. 139-146, 2008.
Cheng, B. et al., "SilentSense: Silent User Identification via Dynamics of Touch and Movement Behavioral Biometrics," Cryptography and Security (cs.CR); Human-Computer Interaction, pp. 9, Aug. 31, 2013.
Chinese Search Report dated Mar. 29, 2016 in Chinese patent Application No. 201280062500.7.
Deyle, T. et al., "Hambone: A Bio-Acoustic Gesture Interface," 11th IEEE International Symposium on earable computers, 2007, pp. 1-8.
Dietz, P. et al., "DiamondTouch: A Multi-User Touch Technology," ACM Symposium on User Interface Software & Technology (UIST), pp. 219-226, 2001.
Dietz, P. et al., "DT Controls: Adding Identity to Physical Interfaces," ACM Symposium on User Interface Software & Technology (UIST), pp. 245-252, 2005.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0.
English Translation of Decision of Refusal dated Nov. 10, 2016 in Japanese Patent Application No. 2014-537253.
English Translation of Final Rejection dated Apr. 27, 2015 in Korean Patent Application No. 10-2014-0027979.
English Translation of Final Rejection dated Dec. 12, 2014 in Korean Patent Application No. 10-2014-0027979.
English Translation of First Office Action dated Apr. 15, 2016 in Chinese Patent Application No. 201280062500.7.
English Translation of First Office Action dated Feb. 27, 2017 in Chinese Application No. 201480002879.1.
English Translation of First Office Action dated May 2, 2017 in Chinese Patent Application No. 201580000833.0.
English Translation of First Office Action dated Oct. 11, 2017 in Chinese Patent Application No. 20150209998.0.
English Translation of Notification of Reason for Refusal dated Jul. 10, 2014 in Korean patent application No. 10-2014-0027979.
English Translation of Notification of Reasons for Refusal dated Apr. 15, 2016 in Japanese Patent Application No. 2014-537253.
English Translation of Office Action dated May 9, 2017 in Japanese Patent Application No. 2014-537253.
Final Office Action dated Jan. 5, 2018 in U.S. Appl. No. 14/503,894.
English Translation of Second Office Action dated Jul. 6, 2017 in Chinese Application No. 201480002879.1.
English Translation of Second Office Action dated Nov. 7, 2016 in Chinese Patent Application No. 201280062500.7.
English Translation of Third Office Action dated Oct. 16, 2017 in Chinese Application No. 201480002879.1.
European Patent Office Extended Search Report dated Feb. 23, 2017 in European Patent Application No. 14832247.
European Patent Office Extended Search Report dated Nov. 9, 2016 in European Patent Application No. 14794212.
Examination Report dated Feb. 26, 2018 in European Patent Application No. 14785422.8.
Examination Report dated Mar. 5, 2018 in European Patent Application No. 14794212.2.
Extended European Search Report dated Apr. 16, 2018 in European Application No. 15845310.0.
Extended European Search Report dated Aug. 11, 2016 in European Patent Application No. 14785422.8.
Extended European Search Report dated Aug. 25, 2017 in European Patent Application No. 15748667.1.
Extended European Search Report dated Jul. 22, 2014 in European Patent Application No. 12755563.9.
Extended European Search Report dated Jul. 24, 2015 in European Patent Application No. 12842495.9.
Extended European Search Report dated Mar. 16, 2018 in European Patent Application No. 15842839.1.
Extended European Search Report dated Mar. 19, 2018 in European Patent Application No. 15840819.5.
Extended European Search Report dated Mar. 19, 2018 in European Patent Application No. 15843933.1.
Extended European Search Report dated Mar. 27, 2018 in European Patent Application No. 15843989.3.
Extended European Search Report dated May 14, 2018 in European Patent Application No. 15847469.2.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Aug. 26, 2016 in U.S. Appl. No. 14/219,919.
Final Office Action dated Aug. 7, 2015 in U.S. Appl. No. 14/191,329.
Wang, F. et al., "Empirical Evaluation for Finger Input Properties in Multi-Touch Interaction," Proceedings of CHI, 2009, pp. 1063-1072.
Final Office Action dated Dec. 20, 2016 in U.S. Appl. No. 15/073,407.
Final Office Action dated Feb. 1, 2017 in U.S. Appl. No. 15/206,554.
Final Office Action dated Feb. 9, 2016 in U.S. Appl. No. 14/486,800.
Final Office Action dated Feb. 24, 2016 in U.S. Appl. No. 13/887,711.
Final Office Action dated Feb. 26, 2016 in U.S. Appl. No. 14/492,604.
Final Office Action dated Jan. 18, 2017 in U.S. Appl. No. 14/684,407.
Final Office Action dated Jul. 12, 2017 in U.S. Appl. No. 14/495,041.
Final Office Action dated Jul. 18, 2017 in U.S. Appl. No. 14/191,329.
Final Office Action dated Jun. 8, 2016 in U.S. Appl. No. 14/495,041.
Final Office Action dated Jun. 19, 2015 in U.S. Appl. No. 13/958,427.
Final Office Action dated Jun. 30, 2017 in U.S. Appl. No. 13/958,427.
Final Office Action dated Jun. 8, 2017 in U.S. Appl. No. 13/887,711.
Final Office Action dated Mar. 7, 2018 in U.S. Appl. No. 14/219,919.
Final Office Action dated Mar. 12, 2018 in U.S. Appl. No. 14/684,407.
Final Office Action dated Mar. 17, 2017 in U.S. Appl. No. 14/492,604.
Final Office Action dated Mar. 28, 2016 in U.S. Appl. No. 13/958,427.
Final Office Action dated Mar. 31, 2016 in U.S. Appl. No. 14/242,127.
Final Office Action dated May 6, 2016 in U.S. Appl. No. 14/191,329.
Final Office Action dated May 1, 2017 in U.S. Appl. No. 14/834,434.
Final Office Action dated May 13, 2016 in U.S. Appl. No. 14/390,831.
Final Office Action dated May 20, 2016 in U.S. Appl. No. 14/503,894.
Final Office Action dated Nov. 9, 2016 in U.S. Appl. No. 14/612,089.
Final Office Action dated Nov. 23, 2015 in U.S. Appl. No. 14/668,870.
Final Office Action dated Nov. 28, 2014 in U.S. Appl. No. 13/849,698.
Final Office Action dated Sep. 6, 2017 in U.S. Appl. No. 14/486,800.
Final Office Action dated Sep. 18, 2015 in U.S. Appl. No. 14/242,127.
Gutwin, C. et al., "Supporting Informal Collaboration in Shared-Workspace Groupware," Journal of Universal Computer Science, vol. 14, Issue 9, pp. 1411-1434, 2008.
Hall, M. et al., "The WEKA Data Mining Software: An Update," SIGKDD Explorations, vol. 11, Issue 1, pp. 10-18, 2009.
Harrison, C. et al., "Scratch Input: Creating Large, Inexpensive, Unpowered and Mobile Finger Input Surfaces," Proceedings of UIST, 2008, pp. 205-208.
Harrison, C. et al., "Skinput: Appropriating the Body as an Input Surface," Proceedings of CHI, 2010, pp. 453-462.
Hartmann, B. et al., "Augmenting Interactive Tables with Mice & Keyboards," Proceedings of UIST, 2009, pp. 149-152.
Hinckley, K. et al., "Pen+Touch=New Tools," Proceedings of UIST, 2010, pp. 27-36.
Hinckley, K. et al., "Sensor Synaesthesia: Touch in Motion, and Motion in Touch," Proceedings of CHI, 2011, pp. 801-810.

(56) References Cited

OTHER PUBLICATIONS

Hinkley, K. et al., "An Exploration of Simultaneous Pen+Touch Direct Input," Proceedings of CHI, 2010, pp. 2793-2802.
Holz, C. et al., "The Generalized Perceived Input Point Model and How to Double Touch Accuracy by Extracting Fingerprints," Proceedings of CHI, 2010, pp. 581-590.
International Search Report and Written Opinion dated Sep. 19, 2016 in International Patent Application No. PCT/US2016/040194.
International Search Report and Written Opinion dated Dec. 15, 2015 in International Patent Application No. For PCT/US2015/051355.
International Search Report and Written Opinion dated Dec. 17, 2015 in International Patent Application No. PCT/US2015/050570.
International Search Report and Written Opinion dated Feb. 26, 2016 in International Patent Application No. PCT/US2015/051582.
International Search Report and Written Opinion dated Jan. 28, 2016 in International Patent Application No. PCT/US2015/051106.
International Search Report and Written Opinion dated Jul. 1, 2016 in International Patent Application No. PCT/US2015/047616.
International Search Report and Written Opinion dated Jul. 8, 2013 in International Application No. PCT/CA2013/000292.
International Search Report and Written Opinion dated Jun. 6, 2012 in International Patent Application No. PCT/CA2012/050127.
International Search Report and Written Opinion dated Mar. 13, 2015 in International Application No. PCT/US2014/033380.
International Search Report and Written Opinion dated Mar. 29, 2013 in International Application No. PCT/US2012/060865.
International Search Report and Written Opinion dated Mar. 29, 2013 in International PCT Application No. PCT/US2012/060865.
International Search Report and Written Opinion dated May 14, 2015 in International Patent Application No. PCT/US2015/014581.
International Search Report and Written Opinion dated Nov. 17, 2014 in International Application No. PCT/US2014/049485.
International Search Report and Written Opinion dated Nov. 17, 2014 in International Patent Application No. PCT/US2014/049485.
International Search Report and Written Opinion dated Nov. 27, 2015 in International Patent Application No. PCT/US2015/047428.
International Search Report and Written Opinion dated Oct. 17, 2016 in International Application No. PCT/US2016/044552.
International Search Report and Written Opinion dated Sep. 18, 2014 in International Application No. PCT/US2014/34977.
International Search Report and Written Opinion dated Sep. 18, 2014 in International Patent Application No. PCT/US2014/034977.
Kaltenbrunner, M. et al., "reacTIVision: A Computer-Vision Framework for Table-Based Tangible Interaction," Proceedings of TEI, 2007, pp. 69-74.
Kashino, K., "Audio fingerprinting: Techniques and applications", Acoustical Science and Technology, The Acoustical Society of Japan, Feb. 1, 2010, vol. 66, No. 2, p. 71-76.

* cited by examiner

CLASSIFYING CONTACTS OR ASSOCIATIONS WITH A TOUCH SENSITIVE DEVICE

CROSS REFERENCES TO RELATED APPLICATIONS

This application is a continuation-in-part of, and claims priority to, U.S. application Ser. No. 14/684,407, filed on Apr. 12, 2015, and this application and U.S. application Ser. No. 14/684,407 each claim priority to U.S. Provisional Patent Application No. 62/055,416, filed on Sep. 25, 2014, each of which applications is incorporated in their entirety herein by reference. Further, cross-reference is made to the following commonly assigned and co-pending U.S. patent applications: U.S. patent application Ser. No. 14/612,089, entitled "Method and Apparatus for Classifying Finger Touch Events on a Touch Screen," filed on Feb. 2, 2015, U.S. patent application Ser. No. 13/958,427 entitled "Capture of Vibro-Acoustic Data used to Determine Touch Types," filed on Aug. 2, 2013, U.S. patent application Ser. No. 13/780,494, entitled "Input Tools Having Vibro-Acoustically Distinct Regions and Computing Device For Use With Same," filed on Feb. 28, 2013, U.S. patent application Ser. No. 13/849,698, entitled "Method and System For Activating Different Interactive Functions Using Different Types of Finger Contact," filed on Mar. 25, 2013, U.S. patent application Ser. No. 14/219,919, entitled "Method and Device for Sensing Touch Inputs," filed on Mar. 19, 2014, U.S. patent application Ser. No. 13/887,711 entitled "Using Finger Touch Types to Interact with Electronic Devices," filed on May 6, 2013 and U.S. patent application Ser. No. 14/191,329 entitled "Using Capacitive Images for Touch Type Classification," filed on Feb. 26, 2014, each of which applications is incorporated in their entirety herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to touch surface technology, e.g., classifying contacts or associations with a touch sensitive device.

BACKGROUND

Various electronic devices today typically can be operated by a user interacting with a touch screen. This feature is particularly a characteristic of the recent generation of smart phones. Typically, touch display screens can respond to finger contact to activate the touch display screen for further processes. Contact also may be made with the touch display screen using tools such as a stylus, other parts of the hand such as the palm and various parts of the finger.

The above-described description is merely intended to provide a contextual overview relating to touch sensitive devices, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

Various electronic devices today typically can be operated by a user interacting with a touch display screen of an electronic device. This feature is particularly a characteristic of the recent generation of smart phones. A touch display screen can respond to finger contact to activate the display to enable access to applications, functions, or features of the electronic device and/or to enable further processes to be performed. Contact may also be made with the touch display screen using tools, such as a stylus, or other parts of the hand, such as the palm and/or various parts of the finger. Smartphone manufacturers continuously develop new techniques to improve smartphone user experience.

In accordance with a non-limiting, example implementation, a method can comprise analyzing, by a system comprising a processor, characteristics of touch screen data associated with a touch sensitive surface that is associated with a device and motion data of at least one axis associated with the device. The method also can comprise, based at least in part on at least one result of the analyzing, determining, by the system, a contact classification for an object with respect to the touch sensitive surface to facilitate determining a contact state of the object in relation to the touch sensitive surface.

In accordance with another non-limiting, example implementation, a system can comprise a memory that stores executable components, and a processor, operatively coupled to the memory, that executes the executable components. The executable components can include an object classification component configured to analyze touch surface information associated with a touch sensitive surface that is associated with a device and motion information of at least one axis associated with the device, wherein the object classification component is further configured to determine a contact classification for an object with respect to the touch sensitive surface, based at least in part on at least one result of the analyzing, to facilitate determining a contact state of the object with respect to the touch sensitive surface.

In accordance with still another non-limiting, example implementation, a machine-readable medium can comprise executable instructions that, when executed by a processor, facilitate performance of operations. The operations can comprise examining characteristics of frame data associated with a touch sensitive surface that is associated with a device and motion data associated with at least one axis that is associated with the device. The operations also can include, based at least in part on at least one result of the examining, determining a contact classification for an object with respect to the touch sensitive surface to facilitate determining a contact state of the object with respect to the touch sensitive surface.

The following description and the annexed drawings set forth certain illustrative aspects of the specification. These aspects are indicative, however, of but a few of the various ways in which the principles of the specification may be employed. Other advantages and enhanced features of the specification will become apparent from the following detailed description of the specification when considered in conjunction with the drawings.

BRIEF DESCRIPTION OF THE DRAWINGS

The patent or application file contains at least one drawing executed in color. Copies of this patent or patent application publication with color drawings will be provided by the Office upon request and payment of the necessary fee. Numerous aspects, implementations, objects, and advantages of the disclosed subject matter will be apparent upon consideration of the following detailed description, taken in conjunction with the accompanying drawings, in which like reference characters can refer to like parts throughout, and in which.

DETAILED DESCRIPTION

Figure 1:
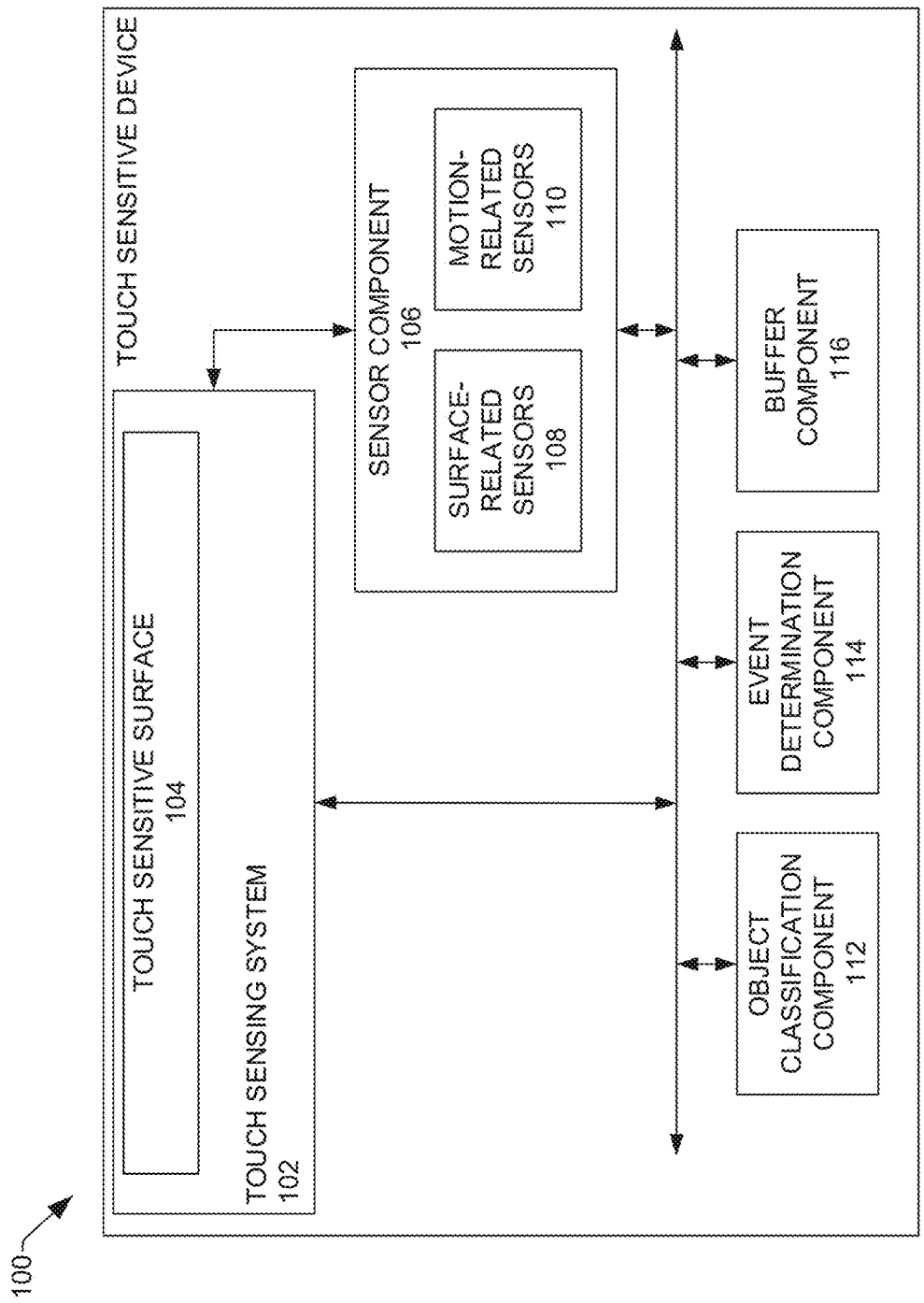
FIG. 1 illustrates a block diagram of an example touch sensitive device that can determine a classification of an object and a contact state of the object with respect to a touch sensitive surface of the touch sensitive device, in accordance with various aspects and embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Various electronic devices today typically can be operated by a user interacting with a touch screen. This feature is particularly a characteristic of the recent generation of smart phones. Typically, touch display screens can respond to finger contact to activate the touch display screen for further processes. Contact also may be made with the touch display screen using tools such as a stylus, other parts of the hand such as the palm and various parts of the finger.

A user may use an electronic device, such as a mobile phone (e.g., smart phone), with a touch display screen to make a phone call by placing the phone against the user's ear and/or part of the user's face, which can cause the user's ear and/or face to come in contact with the touch display screen. This touching of the touch display screen by the user's ear and/or face may result in the touch display screen receiving touch input from the user's ear and/or face, which can result in the touch display screen unintentionally and undesirably being activated and/or the mobile phone unintentionally and undesirably performing operations based on the input received by the touch display screen, even though the user was not intending the interact with the touch display screen.

The disclosed subject matter can employ techniques that can enable improved classification of objects associated with a touch sensitive surface of a touch sensitive device. The disclosed subject matter can comprise an object classification component that can analyze touch surface data (e.g., touch surface or touch screen data) associated with a touch sensitive surface associated with a device and motion data of one or more axes associated with the touch sensitive device. The object classification component can determine a contact classification for an object(s) with respect to the touch sensitive surface, based at least in part on at least one result of the analyzing, to facilitate determining a contact state of the object(s) with respect to the touch sensitive surface. The disclosed subject matter also can comprise an event determination component that can be associated with (e.g., communicatively connected to) the object classification component. The event determination component can control functions associated with the touch sensitive surface based at least in part on the contact classification or the contact state of the object(s), wherein the functions can comprise, for example, enabling a touch sensitive function of the touch sensitive surface of a display screen of the device, disabling the touch sensitive function of the touch sensitive surface of the display screen, switching the display screen on (e.g., to an on state), and/or switching the display screen off (e.g., to an off state).

These and other aspects and embodiments of the disclosed subject matter are described with regard to the figures.

FIG. 1 illustrates a block diagram of an example touch sensitive device 100 that can determine a classification of an object and a contact state of the object with respect to a touch sensitive surface of the touch sensitive device, in accordance with various aspects and embodiments of the disclosed subject matter. The touch sensitive device 100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, an electronic gaming device, an electronic workstation, a television, an Internet protocol (IP) television, a set-top box, a device (e.g., touch sensitive device) in or integrated with a vehicle, a touch pad, a track pad, or other type of device.

The touch sensitive device 100 can comprise a touch sensing system 102 that can comprise or be associated with a touch sensitive surface 104 that can sense when an object(s) (e.g., finger(s) of a user, ear of the user, face of the user, or stylus) has been brought into contact with the touch sensitive surface 104 or is in proximity to (e.g., is hovering over and/or in proximity to) the touch sensitive surface 104. The touch sensitive surface 104 can have a size and shape that can be coextensive with or can correspond to, or at least can be substantially coextensive with or can substantially correspond to, the size and shape of a presentation area of a display screen of the touch sensitive device.

The touch sensitive device 100 also can include a sensor component 106 that can comprise a set of sensors, wherein respective sensors of the set of sensors can sense respective conditions (e.g., contact or hover conditions, motion conditions of the device 100, . . . ) of or associated with the touch sensitive device 100. The set of sensors of the sensor component 106 can comprise surface-related sensors 108 that can be part of or associated with the touch sensing system 102 and the touch sensitive surface 104. The surface-related sensors 108 can be configured to sense when an object(s) is in contact with the touch sensitive surface 104 or is in proximity to (e.g., is hovering over and/or in proximity to) the touch sensitive surface 104 and generate sensor data, such as touch surface data (e.g., touch surface or touch screen data), relating to contact with or proximity to the touch sensitive surface 104 by the object(s), as more fully described herein. The sensor data can be employed to facilitate determining a contact classification relating to a contact or an association (e.g., hover) of an object(s) with respect to the touch sensitive surface 104 and/or a contact state of the object(s) in relation to the touch sensitive surface 104, as more fully described herein.

The set of sensors of the sensor component 106 also can include motion-related sensors 110 that can be configured to sense motion associated with the touch sensitive device 100 and generate motion data relating to the sensed motion associated with the touch sensitive device 100, wherein the motion data can be employed to facilitate determining a contact classification relating to a contact or an association (e.g., hover) of an object(s) with respect to the touch sensitive surface 104 and/or a contact state of the object(s) in relation to the touch sensitive surface 104, as more fully described herein.

In some embodiments, the touch sensitive device 100 can comprise an object classification component 112 that can analyze touch surface data associated with the touch sensitive surface 104 and the motion data of at least one axis (e.g., one axis, two axes, three axes, . . . , six axes, . . . ) associated with the device 100, wherein the touch surface data can be received by the object classification component 112 from the surface-related sensors 108), and the motion data can be received by the object classification component 112 from the motion-related sensors 110. The object classification component 112 can determine a contact classification or contact state for an object(s) with respect to the touch sensitive surface 104, based at least in part on the results of analyzing the touch surface data and the motion data, as more fully described herein.

The contact classifications that the object classification component 112 can make can comprise, for example, a no touch state, a head state, a finger state, a head-hovering state, and a finger-hovering state. The no touch state can indicate that an object is not in contact with and is not hovering in proximity to the touch sensitive surface 104. The head state can indicate that the object(s) is a face, a head, or an ear of a user and such object(s) is in contact with the touch sensitive surface. The finger state can indicate that the object(s) is a finger(s) or a hand of the user and such object(s) is in contact with the touch sensitive surface. The head-hovering state can indicate that the object(s) is the face, the head, or the ear of the user, and such object(s) is hovering over the touch sensitive surface 104 in proximity to the touch sensitive surface 104 and is not in contact with the touch sensitive surface 104. The finger-hovering state can indicate that the object(s) is the finger(s) or the hand of the user, and such object(s) is hovering over the touch sensitive surface 104 in proximity to the touch sensitive surface 104 and is not in contact with the touch sensitive surface 104. It is to be appreciated and understood that the object classification component 112 also can make other types of contact classifications for objects with respect to the touch sensitive surface 104. For example, the object classification component 112 can further comprise contact classifications that can distinguish between a finger of the user and a stylus and or can distinguish between a finger(s) and a hand of the user.

The touch sensitive device 100 further can comprise an event determination component 114 that can be associated with (e.g., communicatively connected to) the object classification component 112, the touch sensing system 102, the sensor component 106, a display screen (not shown in FIG. 1) of the touch sensitive device 100, and/or other components of the touch sensitive device 100. As more fully described herein, the event determination component 114 can control functions associated with the touch sensitive surface 104 based at least in part on (e.g., in response to) the contact classification or the contact state of the object(s) with respect to the touch sensitive device 100, wherein the functions can comprise, for example, enabling a touch sensitive function of the touch sensitive surface 104 (e.g., of a display screen) of the touch sensitive device 100, disabling the touch sensitive function of the touch sensitive surface 104 (e.g., of the display screen), switching (e.g., transitioning) the display screen (e.g., touch display screen) of the touch sensitive device 100 on (e.g., to an on state), and/or switching the display screen off (e.g., to an off state).

For example, in response to a determination that the contact state is a head state (e.g., head or ear of a user) or a head-hovering state (e.g., head or ear of the user in sufficiently close proximity to, but not in actual physical contact with, the touch sensitive surface 104), the event determination component 114 can disable a touch sensitive function of the touch sensitive surface 104 to reject the head contact or head hovering of the user such that the head contact or head hovering does not engage or select a touch sensitive function of the touch sensitive surface 104 (e.g., does not enable selection of a button or control associated with the touch sensitive surface 104 as presented on the display screen) and/or can control operation of the display screen (e.g., touch display screen) to have the display screen transition to or remain in an off state (e.g., a dark display screen). As another example, in response to a determination that the contact state is a finger state (e.g., finger(s) of a user) or a finger-hovering state (e.g., finger(s) of the user in sufficiently close proximity to, but not in actual physical contact with, the touch sensitive surface 104), the event determination component 114 can enable a touch sensitive function(s) of the touch sensitive surface 104 to allow the finger(s) of the user to engage or select the touch sensitive function(s) of the touch sensitive surface 104 (e.g., enables selection of a button or control associated with the touch sensitive surface 104 as presented on the display screen) and/or can control operation of the display screen to have the display screen transition to or remain in an on state (e.g., a lit display screen).

Figure 2:
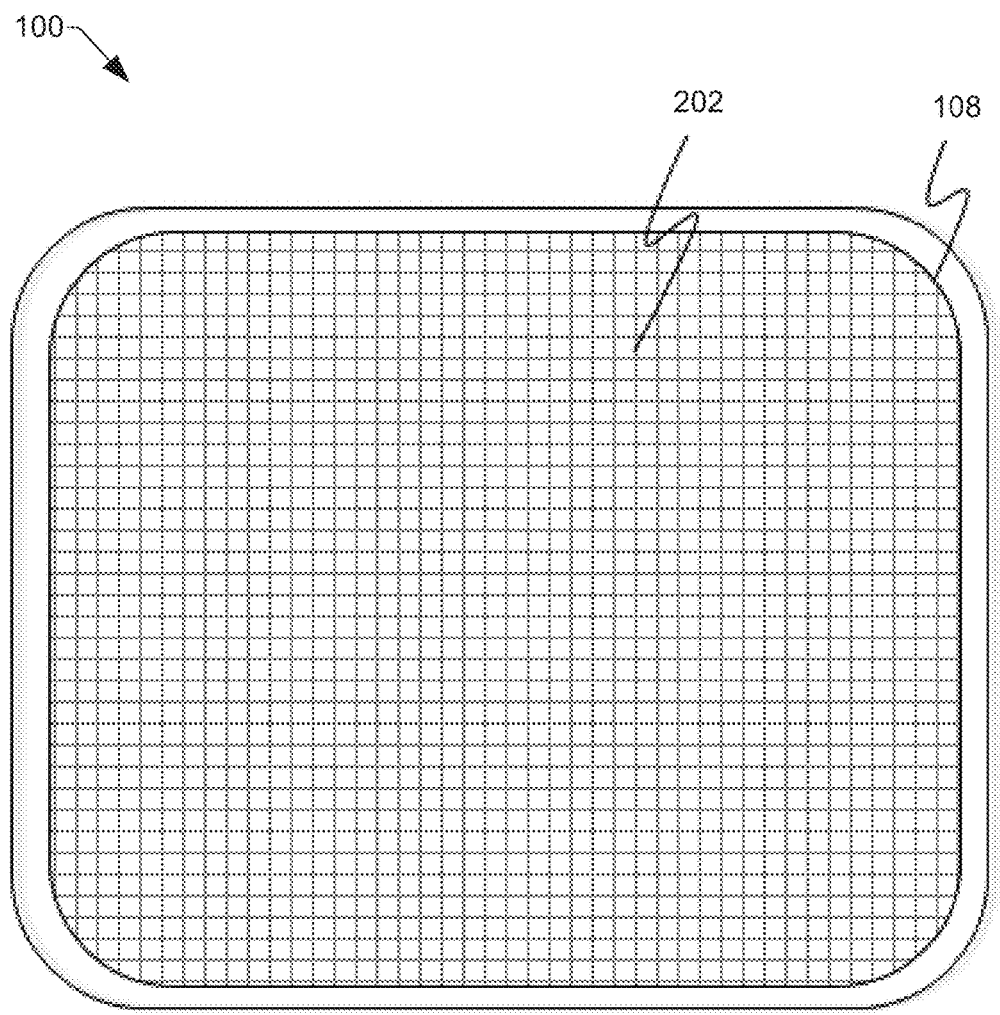
FIG. 2 depicts a diagram of a top view of an example touch sensitive device, including a touch sensitive surface, in accordance with various aspects and embodiments of the disclosed subject matter.

With further regard to the touch sensitive surface 104, referring to FIG. 2 (along with FIG. 1), FIG. 2 depicts a diagram of the example touch sensitive device 100, including the touch sensitive surface 104, in accordance with various aspects and embodiments of the disclosed subject matter. The touch sensitive surface 104 can comprise or be associated with the surface-related sensors 108. In some embodiments, the surface-related sensors 108 can be distributed in various locations associated with the touch sensitive surface 104 to form a sensor array 202, wherein respective surface-related sensors 108 can be associated with respective portions of the touch sensitive surface 104. For example, the surface-related sensors 108 can be distributed to in various locations associated with the touch sensitive surface 104 to form a grid (e.g., an x, y grid). It is to be appreciated and understood that such a grid formation is merely one example formation that can be employed for distributing the surface-related sensors 108 of the sensor array 202 at various locations associated with the touch sensitive surface 104, and, in accordance with other embodiments of the disclosed subject matter, the surface-related sensors 108 can be distributed in other formations (e.g., uniform or non-uniform formations) with respect to the touch sensitive surface 104.

When an object(s) is brought into contact with, or is in sufficiently close proximity to, a location(s) on the touch sensitive surface 104, one or more surface-related sensors 108 of the sensor array 202 that are associated with that location on the touch sensitive surface 104 can sense such contact of the object(s) with the that location(s) on the touch sensitive surface 104 or sense such proximity of the object(s) to that location(s) on the touch sensitive surface 104. In response to the one or more surface-related sensors 108 sensing or detecting the object(s) in contact with or in proximity to that location(s) on the touch sensitive surface 104, the one or more surface-related sensors 108 can generate signals (e.g., sensor data) and can communicate the signals to the object classification component 112 for analysis and evaluation (e.g., to facilitate determining which of the surface-related sensors 108 is in contact with the object(s) or in proximity to the object(s)).

In some implementations, the touch sensing system 102 or object classification component 112 can sweep the surface-related sensors 108 of the sensor array 202 or can otherwise poll the surface-related sensors 108 of the sensor array 202 to facilitate obtaining respective sensor data (e.g., respective touch surface data) from respective surface-related sensors 108 of the sensor array 202, to facilitate enabling the object classification component 112 to determine which portion(s) of the touch sensitive surface 104 is in contact with or in proximity to the object(s) at a given time (e.g., a given moment or period of time). For example, the touch sensing system 102 or object classification component 112 can sweep the surface-related sensors 108 of the sensor array 202 or can otherwise poll the surface-related sensors 108 of the sensor array 202 every $\frac{1}{30}^{th}$ of a second, every $\frac{1}{60}^{th}$ of a second, every $\frac{1}{100}^{th}$ of a second, or at another desired rate or periodicity. The object classification component 112 (or touch sensing system 102) can process and/or organize (e.g., arrange) the sensor data obtained from the surface-related sensors 108 of the sensor array 202 to generate frame data in the form of x, y dimensional data that can represent a respective contact states of respective surface-related sensors 108 at the given time, wherein respective frame data associated with the respective surface-related sensors 108 can be or can comprise the respective sensor data of the respective surface-related sensors 108 or the respective frame data can be determined based at least in part on the respective sensor data.

Figure 3:
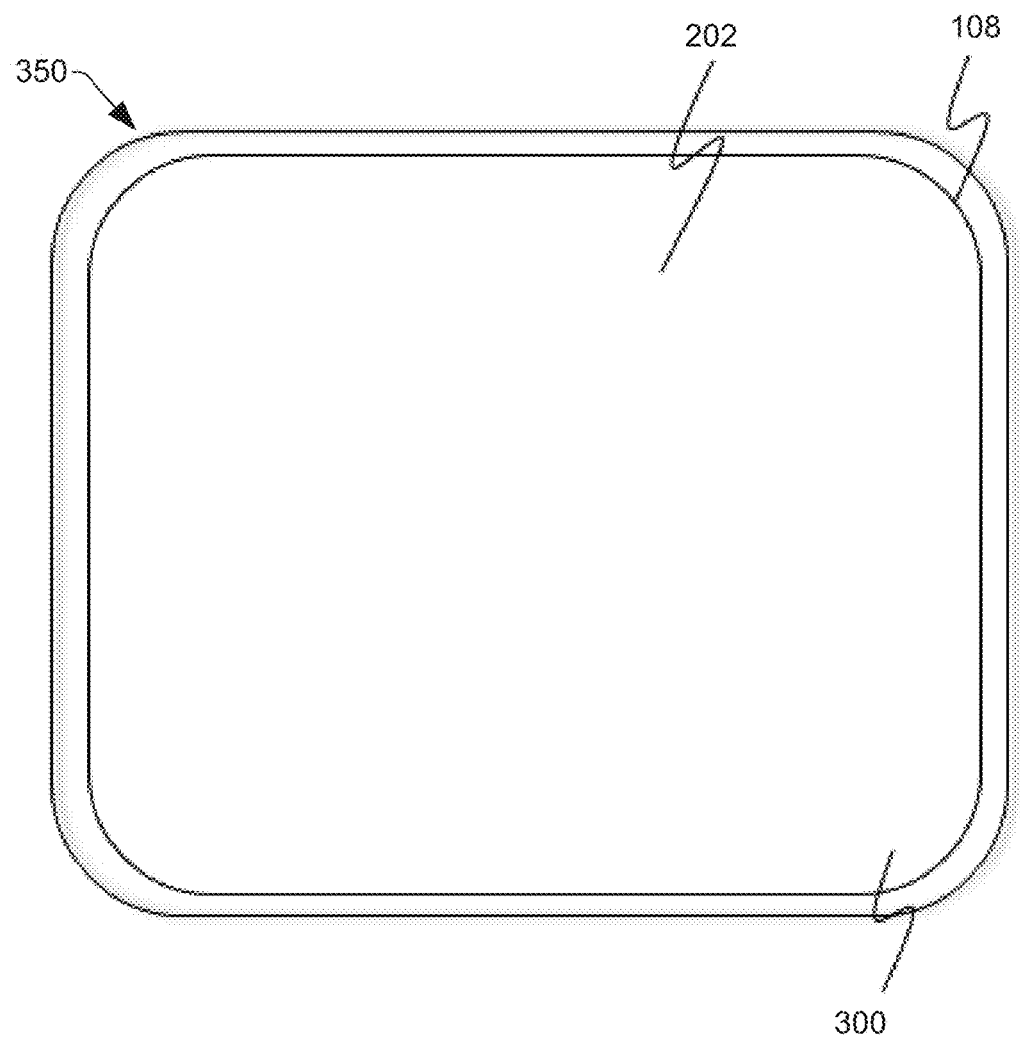
FIG. 3 presents a diagram of an example frame image as part of a visual representation of a top view of an example touch sensitive device, the frame image comprising or representing frame data associated with the touch sensitive surface, in accordance with various aspects and embodiments of the disclosed subject matter.

Frame data can be conceptually understood as providing an image or frame image that can have higher-density portions representing areas of the touch sensitive surface 104 that are in contact with (or in proximity to) an object(s) and other lower-density portions representing areas of the touch sensitive surface 104 that are not in contact with (or in proximity to) an object(s). Turning briefly to FIG. 3 (along with FIGS. 1 and 2), FIG. 3 presents a diagram of an example frame image 300 as part of a visual representation 350 of a top view of an example touch sensitive device 100, the frame image 300 comprising or representing frame data associated with the touch sensitive surface 104, in accordance with various aspects and embodiments of the disclosed subject matter. With respect to the example frame image 300, the surface-related sensors 108 of the sensor array 202 have not detected an object in contact with or in proximity to the surface-related sensors 108 and have correspondingly generated signals (e.g., sensor data) indicating that no object has been detected in contact with or in proximity to the surface-related sensors 108. In this example frame image 300, as no objects are detected in contact with or in proximity to the touch sensitive surface 104, the frame image 300 can have the appearance illustrated in FIG. 3 with no higher-density portions (e.g., no darker colored regions) being shown in the frame image 300.

However, when objects are brought into contact with or in proximity to the touch sensitive surface 104, a portion of the surface-related sensors 108 of the sensor array 202 that are located in the portion(s) of the touch sensitive surface 104 that is in contact with or proximity to the objects can detect such objects, and can generate sensor data representing such detection in response. The portion of the surface-related sensors 108 can communicate the sensor data to report that the objects are in contact with or proximity to the portion(s) of the touch sensitive surface 104 associated with the portion of the surface-related sensors 108. and a contrast pattern emerges in a frame image representative of such a state.

Figure 4:
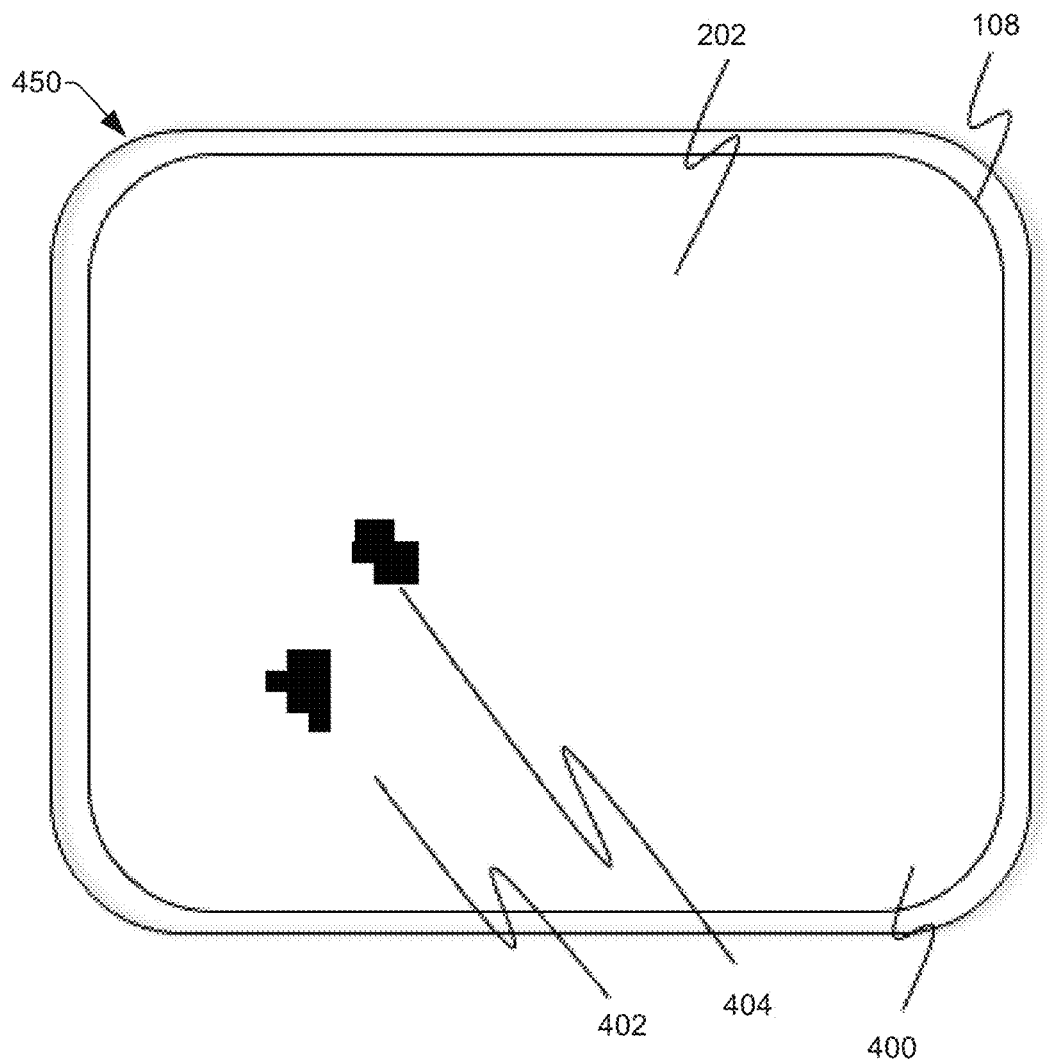
FIG. 4 depicts a diagram of an example frame image as part of a visual representation of a top view of an example touch sensitive device, wherein the example frame image can include or represent frame data relating to a contact with the touch sensitive surface, in accordance with various aspects and embodiments of the disclosed subject matter.

Referring briefly to FIG. 4 (along with FIGS. 1 and 2), FIG. 4 depicts a diagram of an example frame image 400 as part of a visual representation 450 of a top view of an example touch sensitive device 100, wherein the example frame image 400 can include or represent frame data relating to a contact with the touch sensitive surface 104, in accordance with various aspects and embodiments of the disclosed subject matter. The frame image 400 represents a frame associated with the touch sensitive surface 104 at a time during which two fingers of a user are in contact with (e.g., are pressed against) portions of the touch sensitive surface 104.

In this example, the touch sensitive surface 104 has a sensor array 202 of surface-related sensors 108 that can be read to indicate the binary states of contact or no contact. In the event that a contact is made with the touch sensitive surface 104, such contact either can be sufficient to cross (e.g., exceed) a threshold for detection of contact by an object (e.g., finger) at each surface-related sensor 108 or it is not sufficient to cross the threshold for detection of contact. In this example, a frame image, such as the example frame image 400, can be conceptually understood to include either an indication of contact or an indication of no contact and can include blobs 402 and 404 defined by a pattern of full density areas where certain surface-related sensors 108 of the sensor array 202 sense contact with another object(s) (e.g., two fingers of the user). For instance, in response to the two fingers coming into contact with portions of the touch sensitive surface 104, the certain surface-related sensors 108, which are associated with the locations of the portions of the touch sensitive surface 104, can sense the contact with the objects (e.g., the two fingers of the user) and can generate sensor data indicating such contact with the objects. The object classification component 112 can receive the sensor data, and can analyze the sensor data. Based at least in part on the results of analyzing the sensor data, the object classification component 112 can determine and generate the frame image 400, which can include higher-density portions (e.g., darker colored regions), as represented by the blobs 402 and 404, at locations of the frame image 400 that can correspond to the locations of the two fingers on the touch sensitive surface 104, and lower-density portions (e.g., light or white colored regions) at other locations of the frame image 400 that can correspond to the other locations on the touch sensitive surface 104 where no contact with an object is indicated. While the example frame image 400 relates to the issue of whether there is contact or no contact with the touch sensitive surface 104 by an object, in accordance with various other embodiments, the disclosed subject matter can sense, identify, and distinguish between relative intensities of contact between an object and a touch sensitive surface 104, and/or can sense, identify, and distinguish between contact of an object with the touch sensitive surface 104, hovering of an object in proximity to (without being in contact with) the touch sensitive surface 104, and no contact of an object with or hovering of an object in proximity to the touch sensitive surface 104, as more fully described herein.

For instance, in some implementations, the sensor array 202 of surface-related sensors 108 can be capable of detecting or determining a level of intensity of contact of an object with the touch sensitive surface 104, wherein the level of intensity of contact can relate to, for example an amount of pressure applied by an object on the touch sensitive surface 104, an intensity of a resistance experienced at the point of contact of the object with the touch sensitive surface 104, an intensity of a capacitance experienced at the point of contact of the object with the touch sensitive surface 104, and/or another type(s) of intensity relating to contact of an object with one or more surface-related sensors 108 of the sensor array 202.

Figure 5:
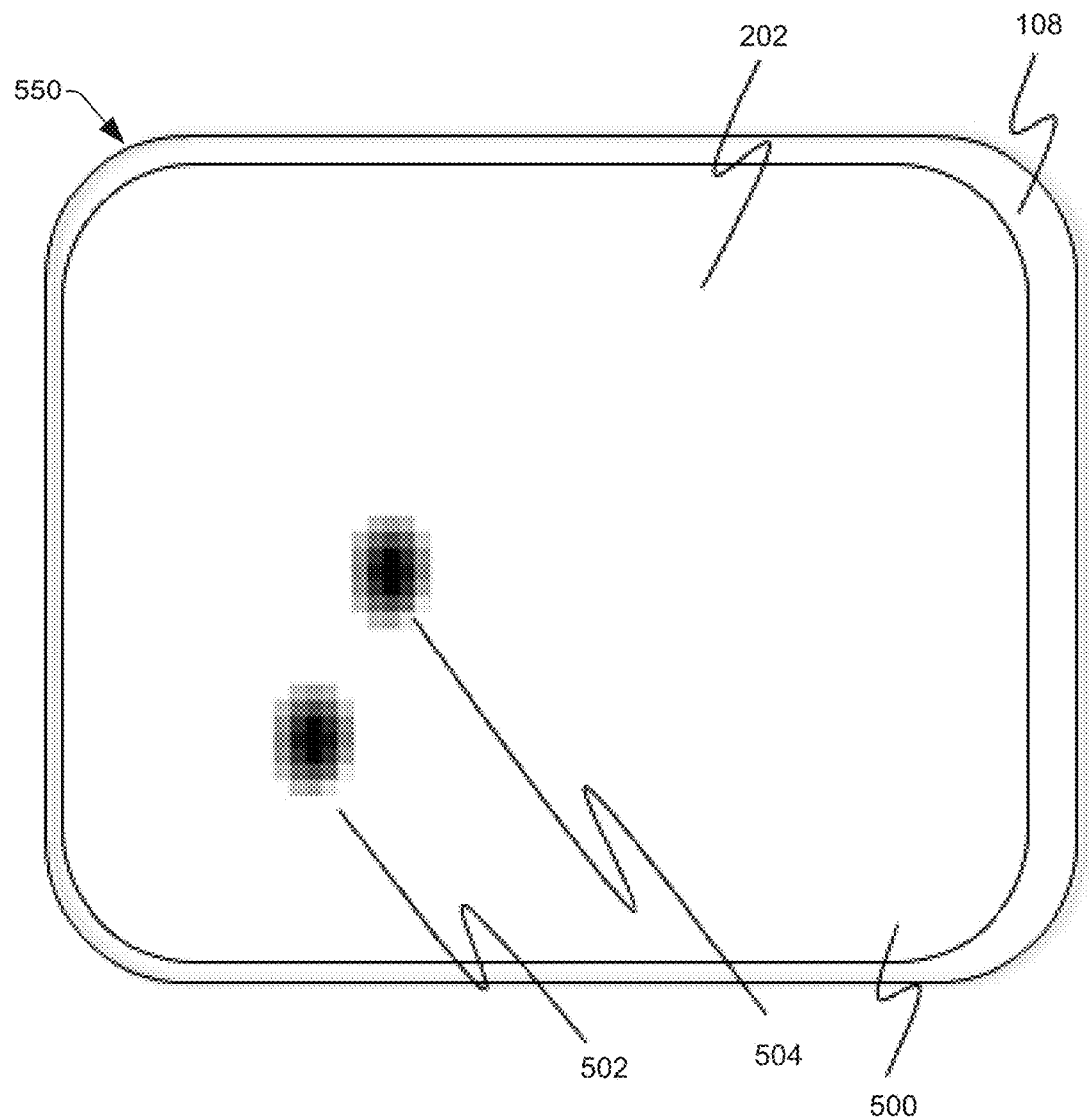
FIG. 5 presents a diagram of an example frame image as part of a visual representation of a top view of an example touch sensitive device, wherein the example frame image can comprise or represent frame data relating to relative intensities of a contact with the touch sensitive surface, in accordance with various aspects and embodiments of the disclosed subject matter.

Turning briefly to FIG. 5 (along with FIGS. 1 and 2), FIG. 5 presents a diagram of an example frame image 500 as part of a visual representation 550 of a top view of an example touch sensitive device 100, wherein the example frame image 500 can comprise or represent frame data relating to relative intensities of a contact with the touch sensitive surface 104, in accordance with various aspects and embodiments of the disclosed subject matter. The frame image 500 represents a frame associated with the touch sensitive surface 104 at a time during which two fingers of a user are in contact with portions of the touch sensitive surface 104. In this example, the touch sensitive surface 104 can comprise a sensor array 202 that can include surface-related sensors 108 that can be read to indicate no contact or relative states of intensity of contact with the touch sensitive surface 104.

In the event that contact is made with the touch sensitive surface 104, the intensity of contact information presented in a frame image, such as the example frame image 500, can be conceptually understood to be reflected in the frame image as grayscale image data, wherein blobs 502 and 504 can represent the relative intensities of contact of two fingers of the user with respective portions of the touch sensitive surface 104, as the contact by the two fingers is sensed by certain surface-related sensors 108 of the sensor array 202. For instance, in response to the two fingers coming into contact with the portions of the touch sensitive surface 104, the certain surface-related sensors 108, which can be associated with the locations of the portions of the touch sensitive surface 104, can sense the contact, including the relative intensities of contact, with the objects (e.g., the two fingers of the user) and can generate sensor data indicating such contact with the objects. The respective surface-related sensors of the certain surface-related sensors 108 can generate respective sensor data that can indicate the respective and relative intensities of the contact of the objects (e.g., the two fingers) with the portions of the touch sensitive surface 104.

The object classification component 112 can receive the respective sensor data, and can analyze the respective sensor data. Based at least in part on the results of analyzing the respective sensor data, the object classification component 112 can determine and generate the frame image 500, which can include respective and relative higher-density portions (e.g., respective grayscale colored regions), as represented by the respective grayscale information of the blobs 502 and 504, at locations of the frame image 500 that can correspond to the locations of the two fingers on the touch sensitive surface 104, and lower-density portions (e.g., light or white colored regions) at other locations of the frame image 400 that can correspond to the other locations on the touch sensitive surface 104 where no contact with an object is indicated.

It is to be appreciated and understood that the objects that can come into contact with the touch sensitive surface 104 is not limited to fingers of the user. For example, mobile phones, PDAs, electronic tablets, and electronic gaming devices also can be held against an ear or face of a user at times so as to enable the user to better hear the sound produced by the device or to hear the sound produced by the device more confidentially, and/or to otherwise interact with the device. This can create a variety of different contacts with the touch sensitive surface 104.

Figure 6:
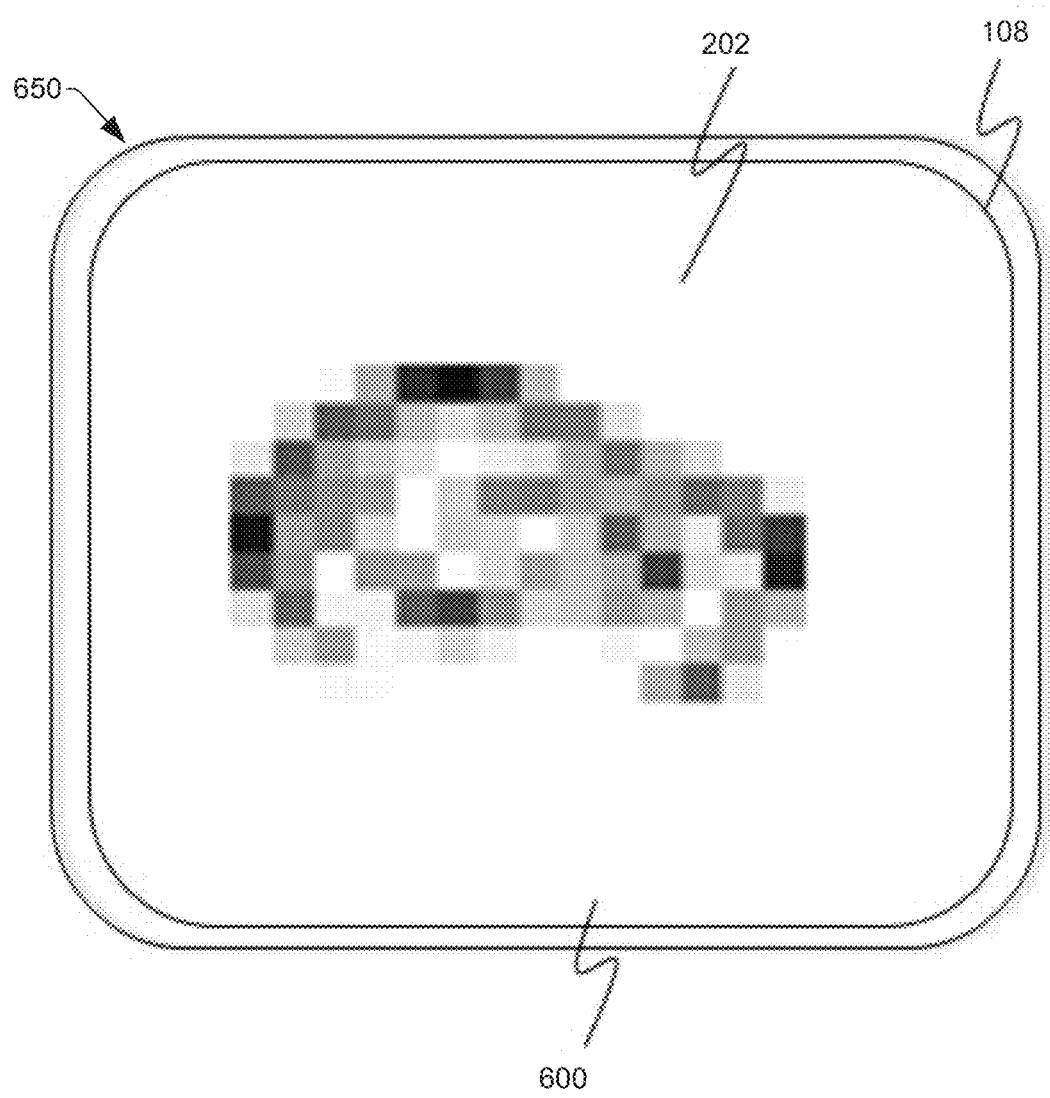
FIG. 6 illustrates a diagram of an example frame image as part of a visual representation of a top view of an example touch sensitive device, wherein the frame image can comprise or represent frame data that can be captured or generated when certain surface-related sensors of a sensor array detect relative intensities of contact of an ear of a user with the touch sensitive surface, in accordance with various aspects and embodiments of the disclosed subject matter.

Referring briefly to FIG. 6 (along with FIGS. 1 and 2), FIG. 6 illustrates a diagram of an example frame image 600 as part of a visual representation 650 of a top view of an example touch sensitive device 100, wherein the frame image can comprise or represent frame data that can be captured or generated when certain surface-related sensors 108 of the sensor array 202 detect relative intensities of contact of an ear of the user with the touch sensitive surface 104, in accordance with various aspects and embodiments of the disclosed subject matter. The frame image 600 represents a frame associated with the touch sensitive surface 104 at a time during which the ear of the user is in contact with portions of the touch sensitive surface 104. In this example, the touch sensitive surface 104 can comprise or be associated with a sensor array 202 that can include the surface-related sensors 108, which can be read to indicate no contact or relative states of intensity of contact with the touch sensitive surface 104. Based at least in part on the results of analyzing the respective sensor data from respective surface-related sensors of the certain surface-related sensors 108 that indicate respective intensities of contact of the ear with respective portions of the touch sensitive surface 104, the object classification component 112 can generate the frame image 600 comprising the grayscale colored region 602 that can present respective grayscale information illustrating respective intensities of contact of the ear of the user with the respective portions of the touch sensitive surface 104.

As can be observed from the example frame image 600, it may be challenging for a touch sensitive device to determine whether this frame image represents a pattern of one or more finger contacts with the touch sensitive surface or whether this pattern of contacts represents contact with an ear or other physical features of the user. The accuracy and efficiency with which a touch sensitive device (e.g., touch sensitive device 100) can discriminate between such different types of contact can have significant consequences on the use, activation, usability, and functionality of the device.

Figure 7:
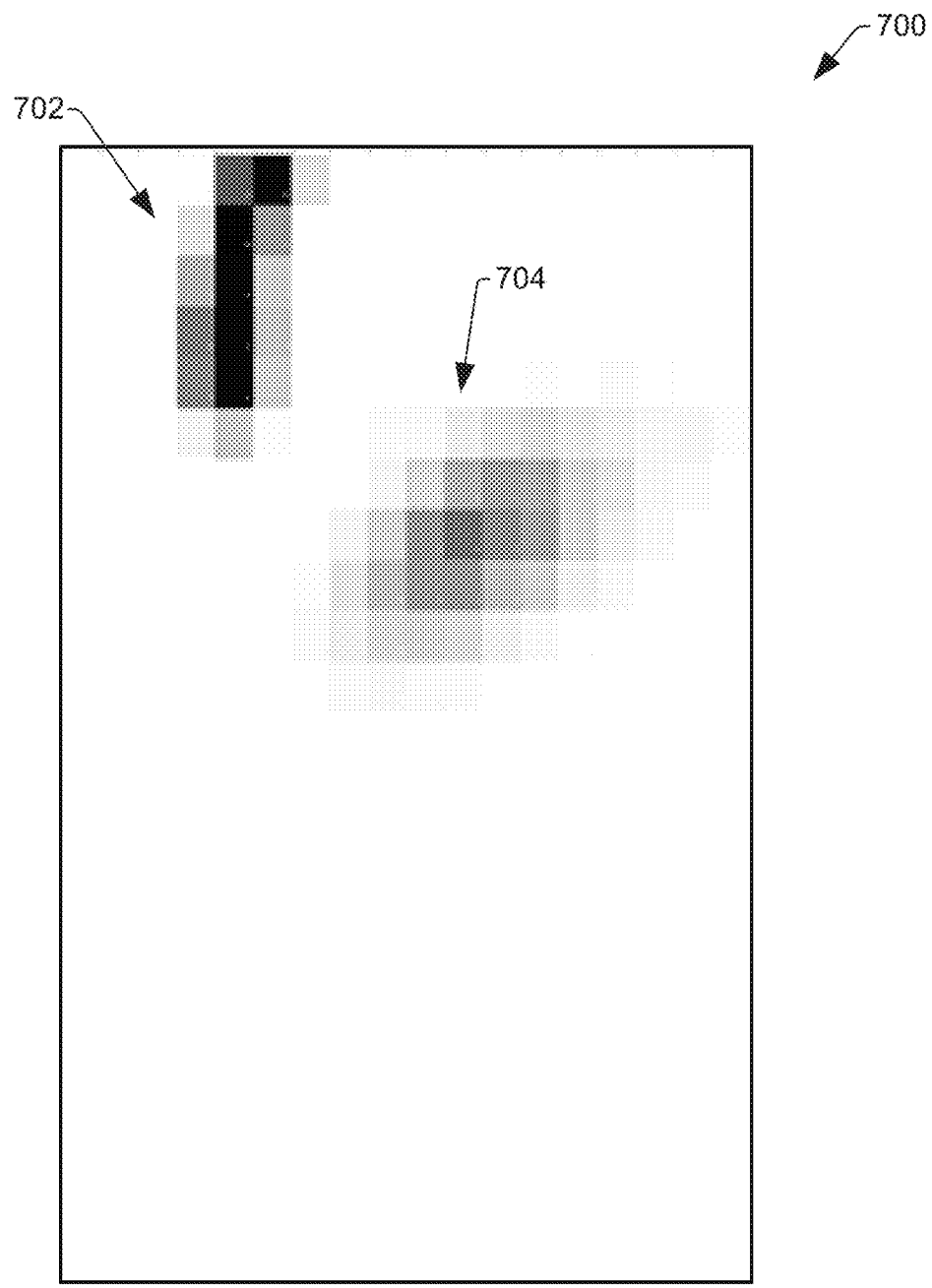
FIG. 7 presents a diagram of an example frame image that can be generated based at least in part on capacitance data (e.g., mutual capacitance data) when certain surface-related sensors of a sensor array detect relative intensities of contact of an ear of a user with the touch sensitive surface, in accordance with various aspects and embodiments of the disclosed subject matter.

Turning briefly to FIG. 7 (along with FIGS. 1 and 2), FIG. 7 presents a diagram of an example frame image 700 that can be generated based at least in part on capacitance data (e.g., mutual capacitance data) when certain surface-related sensors 108 (e.g., capacitive sensors) of the sensor array 202 detect relative intensities of contact of an ear of the user with the touch sensitive surface 104, in accordance with various aspects and embodiments of the disclosed subject matter. The frame image 700 represents a frame associated with the touch sensitive surface 104 at a time during which the ear of the user is in contact with portions of the touch sensitive surface 104. In this example, the touch sensitive surface 104 can comprise or be associated with a sensor array 202 that can include the surface-related sensors 108, which can comprise certain surface-related sensors 108, such as capacitive sensors, that can sense capacitance levels associated with the touch sensitive surface 104. The certain surface-related sensors 108 (and/or other sensors 108) can sense no contact, relative states of intensity of contact with the touch sensitive surface 104, and/or relative proximity of an object (e.g., ear, or portion of the ear, of the user) to the touch sensitive surface 104 without touching the touch sensitive surface. As a result of the sensing, the certain surface-related sensors 108 (and/or other sensors 108) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object (e.g., ear, or portion thereof, of the user) with the touch sensitive surface 104 or respective proximity of the object, or portion thereof, to the touch sensitive surface 104.

The object classification component 112 can receive the sensor data from the certain surface-related sensors 108. Based at least in part on the results of analyzing the respective sensor data (e.g., mutual capacitance data) from respective surface-related sensors of the certain surface-related sensors 108 that indicate respective intensities of contact of the ear with respective portions of the touch sensitive surface 104 and/or respective proximity of the ear, or portion thereof, to the touch sensitive surface 104, the object classification component 112 can generate the frame image 700 comprising the grayscale colored region 702 and grayscale colored region 704 that can present respective grayscale information (e.g., corresponding to respective higher-density portions of the frame image 700) illustrating respective intensities of contact of respective portions of the ear of the user with the respective portions of the touch sensitive surface 104 and/or respective proximities of respective portions of the ear of the user to the touch sensitive surface 104. The grayscale colored region 702 can indicate the upper part of the user's ear is in contact with the portion of the touch sensitive surface 104 that can correspond to the location of the grayscale colored region 702 depicted in the frame image 700. The grayscale colored region 704 can indicate the ear lobe of the user's ear is in contact with (or at least in proximity to) another portion of the touch sensitive surface 104 that can correspond to the location of the grayscale colored region 704 depicted in the frame image 700. For instance, the portions 706 of the grayscale colored region 704 may indicate that the portion (e.g., a portion of the ear lobe) of the user's ear is in proximity to, but is not in physical contact with, the touch sensitive surface 104.

Similar to the example frame image 600 of FIG. 6, as can be observed from the example frame image 700, it may be challenging for a touch sensitive device to determine whether the frame image 700 represents a pattern of one or more finger contacts with the touch sensitive surface or whether this pattern of contacts represents contact with an ear or other physical features of the user. As disclosed, the accuracy and efficiency with which a touch sensitive device (e.g., touch sensitive device 100) can discriminate between such different types of contact can have significant consequences on the use, activation, usability, and functionality of the device.

Figure 8:
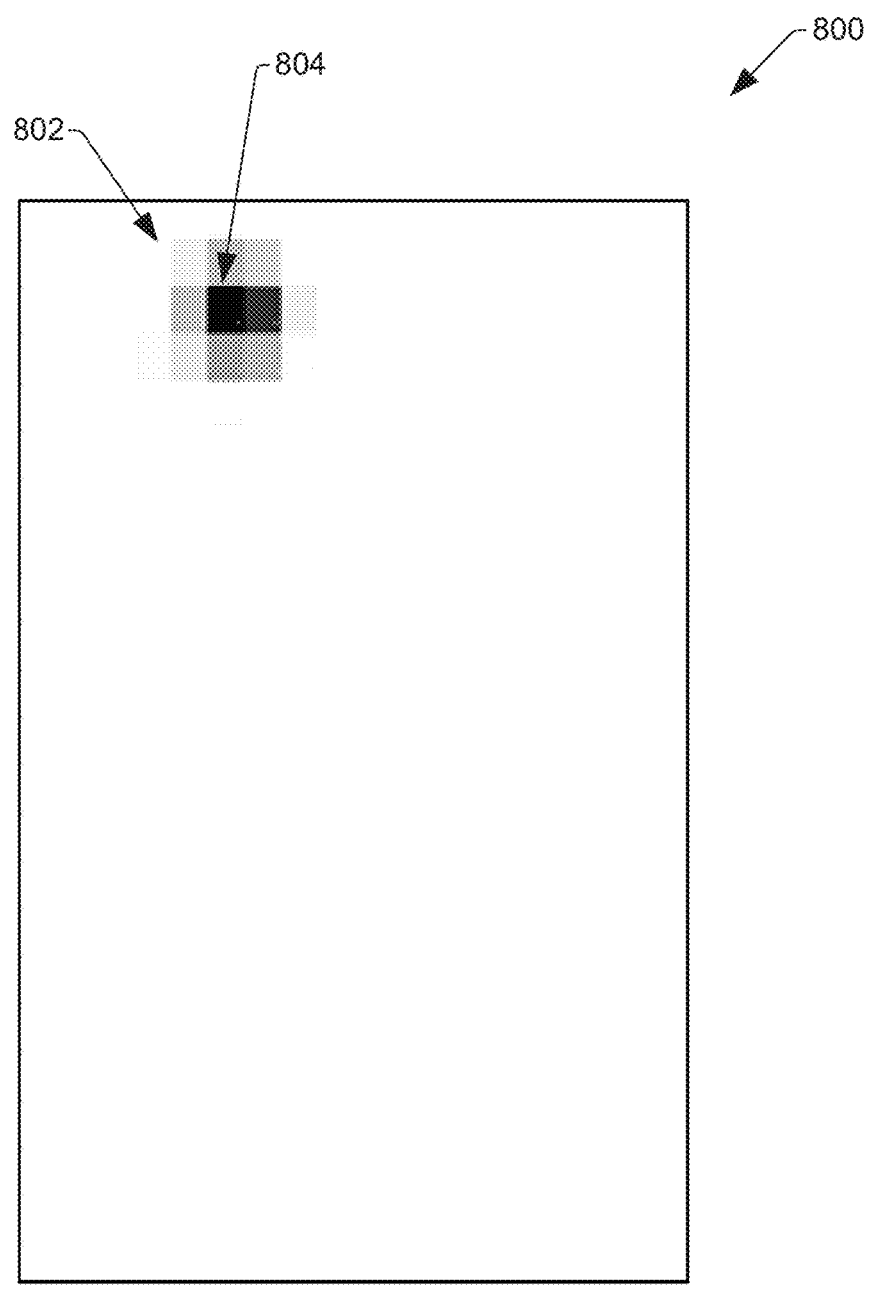
FIG. 8 illustrates a diagram of an example frame image that can be generated based at least in part on capacitance data (e.g., mutual capacitance data) when certain surface-related sensors of a sensor array detect relative intensities of contact of a finger of a user with the touch sensitive surface, in accordance with various aspects and embodiments of the disclosed subject matter.

Referring briefly to FIG. 8 (along with FIGS. 1 and 2), FIG. 8 illustrates a diagram of an example frame image 800 that can be generated based at least in part on capacitance data (e.g., mutual capacitance data) when certain surface-related sensors 108 (e.g., capacitive sensors) of the sensor array 202 detect relative intensities of contact of a finger of a user with the touch sensitive surface 104, in accordance with various aspects and embodiments of the disclosed subject matter. The frame image 800 represents a frame associated with the touch sensitive surface 104 at a time during which a finger of a user is in contact with a portion of the touch sensitive surface 104. In this example, the touch sensitive surface 104 can comprise the sensor array 202, which can include the surface-related sensors 108, which can comprise certain surface-related sensors 108, such as capacitive sensors, that can sense capacitance levels associated with the touch sensitive surface 104. The certain surface-related sensors 108 (and/or other sensors 108) can sense no contact, relative states of intensity of contact with the touch sensitive surface 104, and/or relative proximity of an object (e.g., finger, or portion of the finger, of the user) to the touch sensitive surface 104 without touching the touch sensitive surface. As a result of the sensing, the certain surface-related sensors 108 (and/or other sensors 108) can generate sensor data, such as capacitance data (e.g., mutual capacitance data), that can correspond to the respective amounts of capacitance associated with respective portions of the touch sensitive surface 104 and can indicate respective levels of contact (e.g., no contact or respective states of intensity of contact) of an object (e.g., finger, or portion of the finger, of the user) with the touch sensitive surface 104 or respective proximity of the object, or portion thereof, to the touch sensitive surface 104.

The object classification component 112 can receive and analyze the sensor data from the certain surface-related sensors 108. Based at least in part on the results of analyzing the respective sensor data (e.g., mutual capacitance data) from respective surface-related sensors of the certain surface-related sensors 108 that indicate respective intensities of contact of the ear with respective portions of the touch sensitive surface 104 and/or respective proximity of the finger, or portion thereof, to the touch sensitive surface 104, the object classification component 112 can generate the frame image 800 comprising the grayscale colored region 802 that can present respective grayscale information (e.g., corresponding to respective higher-density portions of the frame image 800) illustrating respective intensities of contact of respective portions of the finger of the user with the respective portions of the touch sensitive surface 104 (and/or at least respective proximities of respective portions of the finger of the user to the touch sensitive surface 104). For instance, the grayscale colored region 804 can indicate that the user's finger is in contact with the portion of the touch sensitive surface 104 that can correspond to the location of the grayscale colored region 802 depicted in the frame image 800. As can be seen from the frame image 800, the contact of the user's finger with the touch sensitive surface 104 can be strongest or hardest at a location of the touch sensitive surface 104 that can correspond to the location of subregion 806 (e.g., the darkest colored subregion) on the frame image 800.

The ability to accurately discriminate between such different types of contact (e.g., ear (e.g., upper ear, ear lobe), finger(s), another object(s)) can therefore one of the challenging aspects of the design of touch sensitive devices. The disclosed subject matter can overcome deficiencies of other techniques with regard to distinguishing between different types of contact with a touch sensitive surface, and can present touch sensitive devices and techniques (e.g., contact classification techniques) that can provide improved and accurate discrimination between and classification of different types of contact with or proximity to a touch sensitive surface, including, for example, distinguishing between single-point finger contact, multi-point finger contact, single-point head contact, multi-point head contact, and/or other types of contact (or proximity) of a body part of a user or another type of object with (or to) a touch sensitive surface.

In some embodiments, the object classification component 112 can accurately classify and discriminate between one or more contacts of one or more objects with the touch sensitive surface 104 based at least in part on the results of analyzing the pattern of contacts against or in proximity to the touch sensitive surface 104. For instance, the object classification component 112 can analyze a frame image using pattern recognition tools and techniques to determine whether the two-dimensional image provided by touch sensitive surface 104 has an appearance associated with a particular type of contact. For example, palm touch contacts with the touch sensitive surface may appear as relatively large irregular blobs, while fingers in contact with the touch sensitive surface can tend to appear as relatively smaller ellipsoids. The object classification component 112 can recognize and use the differences in shape and size of such different types of contact with the touch sensitive surface 104 to distinguish between and respectively identify palm touch contacts and finger touch contacts with, or proximity of a palm or finger(s) to, the touch sensitive surface 104 (e.g., through use of various classification techniques, such as machine learning), as more fully described herein.

In accordance with various embodiments, the object classification component 112 can accurately classify and discriminate between one or more contacts of (or proximity of) one or more objects with (or to) the touch sensitive surface 104, and can determine a contact classification of the one or more objects with respect to the touch sensitive surface 104, based at least in part on the results of analyzing touch surface data (e.g., surface-related sensor data) associated with the touch sensitive surface 104 (e.g., the pattern of contacts against (or in proximity to) the touch sensitive surface 104) and motion data relating to motion of the touch sensitive device 100, in accordance with defined classification criteria, as more fully described herein. The contact classifications that the object classification component 112 can make can comprise, for example, a no touch state, a head state, a finger state, a head-hovering state, a finger-hovering state, and/or one or more other types of contact classifications, as more fully described herein.

In some embodiments, the sensor component 106 can comprise one or more motion-related sensors 110 that can be employed to detect motion of the touch sensitive device 100 about or along one or more axes (e.g., x-axis, y-axis, and/or z-axis) and can generate sensor data (e.g., motion-related sensor data) that can correspond to the motion of the touch sensitive device 100 detected by the one or more motion-related sensors 110. For example, a multi-axis (e.g., two or three axis) motion-related sensor can generate first motion data relating to motion of the touch sensitive device along a first axis (e.g., x-axis), second motion data relating to motion of the touch sensitive device along a second axis (e.g., y-axis), and/or third motion data relating to motion of the touch sensitive device along a third axis (e.g., z-axis).

The one or more motion-related sensors 110 can comprise, for example, one or more of an accelerometer(s), a gyroscope(s), an inertial measurement unit (IMU), and/or another type(s) of motion-related sensor. Respective motion-related sensors 110 (e.g., accelerometer, gyroscope, IMU, and/or other type of motion-related sensor) can be single-axis motion-related sensors or multiple-axis (e.g., two-axis or three-axis) motion related sensors. The one or more motion-related sensors 110 can monitor and sense motion of the touch sensitive device 100 at a desired sensing rate (e.g., a second or sub-second rate). For example, a motion-related sensor 110 can monitor and sense motion of the touch sensitive device 100 along one or more axes every $\frac{1}{30}^{th}$ of a second, every $\frac{1}{60}^{th}$ of a second, every $\frac{1}{100}^{th}$ of a second, or at another desired sensing rate. In certain embodiments, the motion-related sensors 110 can include one or more vibro-acoustic sensors that can detect and/or measure movement or vibrations of the touch sensitive device 100. The one or more vibro-acoustic sensors can generate motion data, comprising vibro-acoustic data, based at least in part on the detected or measured movement or vibrations of the touch sensitive device 100, and can provide such motion data to the object classification component 112 for analysis.

In some embodiments, as motion data is generated by the motion-related sensors 110, that motion data can be stored in a buffer component 116 (e.g., buffer memory) for a desired amount of time. For instance, the buffer component 116 can store motion data (and/or touch surface data) that can cover a defined period of time (e.g., the last second, the last two seconds, the last three seconds, or another desired period of time). As an example, in response to determining that the touch sensitive device 100 is in an in-call state, the object classification component 112 (or another component, such as a processor, of the touch sensitive device) can have the buffer component 116 store the motion data, the touch surface data, or other desired data (e.g., orientation data, touch data, . . . ) to facilitate analysis of such data by the object classification component 112.

With regard to employing touch surface data and motion data to classify contact or association with the touch sensitive surface 104, the object classification component 112 can analyze touch surface data (e.g., surface-related sensor data) received from the surface-related sensors 108. In some embodiments, as part of the analysis, the object classification component 112 can identify and extract features related to contact or association (e.g., hovering) of an object(s) with the touch sensitive surface 104 from the touch surface data. The features can comprise, for example, characteristics, shapes, dimensions, spectral centroid, spectral density, spherical harmonics, total average spectral energy, and/or log spectral band ratios related to the contact or association of the object(s) with the touch sensitive surface 104, with respect to the time domain or frequency domain, respectively. The object classification component 112 can utilize the features (e.g., extracted features) to generate a frame image, comprising frame data, of the contact or association of the object(s) with the touch sensitive surface 104. In other embodiments, the object classification component 112 can analyze the touch surface data without extracting features relating to contact or association (e.g., hovering) of the object(s) with the touch sensitive surface 104 from the touch surface data.

Based at least in part on the results of analyzing such touch surface data, the object classification component 112 can determine at least an initial classification (e.g., initial contact classification) of the contact of an object(s) with the touch sensitive surface 104 in accordance with the defined classification criteria, as more fully described herein. For instance, based at least in part on the results of analyzing the touch surface data, the object classification component 112 can determine that the touch surface data is indicative of a particular contact classification and/or a particular contact state of an object(s) with the touch sensitive surface 104. The object classification component 112 can perform such determination regarding contact classification and/or contact state based at least in part on the results of analyzing the raw touch surface data (without extracting features from the touch surface data) or based at least in part on the results of analyzing the features extracted from the touch surface data.

The object classification component 112 also can analyze other sensor data, such as motion data (e.g., motion-related sensor data) received from the motion-related sensors 110. In connection with performing the analysis, the object classification component 112 can retrieve the motion data that is stored in the buffer component 116, wherein such motion data can cover a defined period of time. In some embodiments, as part of the analysis, the object classification component 112 can identify and extract features related to contact or association (e.g., hovering) of an object(s) with the touch sensitive surface 104 from the motion data. The object classification component 112 can utilize the features (e.g., extracted features) to generate a frame image, comprising frame data, of the contact or association of the object(s) with the touch sensitive surface 104. In certain embodiments, the object classification component 112 can perform an integrated analysis of the touch surface data and the motion data, wherein the object classification component 112 can generate a frame image, comprising frame data, of the contact or association of the object(s) with the touch sensitive surface 104 based at least in part on the features extracted from the touch surface data and the motion data as part of the analysis. In other embodiments, the object classification component 112 can analyze the motion data (and the touch surface data) without extracting features relating to contact or association (e.g., hovering) of the object(s) with the touch sensitive surface 104 from the motion data (or the touch surface data).

The object classification component 112 can determine a classification of the contact or association (e.g., hovering) of an object(s) with the touch sensitive surface 104 based at least in part on the results of analyzing the motion data, in accordance with the defined classification criteria, as more fully described herein. For example, based at least in part on the results of analyzing the motion data, the object classification component 112 can determine that the motion data is indicative of the particular contact classification and/or the particular contact state of an object(s) with the touch sensitive surface 104 (or, in some instances, may be indicative of a different contact classification or different contact state from that determined based on the touch surface data).

In some implementations, the analysis of the motion data by the object classification component 112 can be used by the object classification component 112 to facilitate verifying or confirming the initial contact classification derived from the analysis of the touch surface data (e.g., surface-related sensor data). For example, if the initial contact classification based on the touch surface data is that there is contact by an object(s) with the touch sensitive surface 104, and such contact or association is a finger of the user, and if the analysis of the motion data indicates that there is a finger in contact with the touch sensitive surface 104, the object classification component 112 can determine that the motion data analysis confirms the initial contact classification, and can determine that the contact state associated with the touch sensitive surface 104 is a finger touch of the touch sensitive surface. If, however, the initial contact classification based on the touch surface data is that there is contact with the touch sensitive surface 104, and such contact is two fingers of the user, and if the analysis of the motion data indicates that an ear of the user is in contact with the touch sensitive surface 104, the object classification component 112 can determine that the motion data analysis does not confirm the initial contact classification determined using the touch surface data, and can determine that no contact classification or contact state can be determined based on such sensor data, and/or can determine that other types of sensor data are to be analyzed, and/or can determine that additional touch surface data and/or motion data are to be collected and analyzed, to facilitate determining a contact classification and contact state associated with the touch sensitive surface 104.

In other implementations, if the initial contact classification attempt based on the touch surface data was inconclusive or ambiguous, the analysis of the motion data by the object classification component 112 can be used by the object classification component 112 to facilitate determining a classification of the contact or association of an object(s) with the touch sensitive surface 104, in accordance with the defined classification criteria. In still other implementations, the object classification component 112 can determine a classification of the contact or association of an object(s) with respect to the touch sensitive surface 104 and the contact state associated with the touch sensitive surface 104 based on the results of analyzing the motion data, without having to analyze touch surface data or other types of sensor data, in accordance with the defined classification criteria.

In some embodiments, the object classification component 112 can comprise a classification engine (e.g., trained classification engine) that can identify and/or distinguish between different types of contact or association (e.g., hovering) with the touch sensitive surface 104 based at least in part on the results of analyzing touch surface data and/or the motion data relating to motion of the touch sensitive device 100. The classification engine of the object classification component 112 can be trained by applying positive examples of touch surface data relating to finger(s) contacts (e.g., single-point finger contacts, multi-point finger contacts) or associations (e.g., hovering finger(s)) with the touch sensitive surface 104 and positive examples of touch surface data relating to ear and/or facial contacts (e.g., upper ear contacts, ear lobe contacts, cheek contacts, . . . ) or associations with the touch sensitive surface 104 to the classification engine to train the classification engine to identify and distinguish between various different types of contacts or associations with the touch sensitive surface 104. The positive examples of touch surface data can comprise, for example, positive examples of patterns of contact or association relating to finger(s) contacts or associations with the touch sensitive surface 104 and positive examples of patterns of contact or association relating to ear and/or facial contacts with the touch sensitive surface 104.

The classification engine of the object classification component 112 also can be trained by applying positive examples of motion data relating to finger(s) contacts (e.g., single-point finger contacts, multi-point finger contacts) or associations (e.g., hovering) with the touch sensitive surface 104 and positive examples of motion data relating to ear and/or facial contacts (e.g., upper ear contacts, ear lobe contacts, cheek contacts, . . . ) or associations with the touch sensitive surface 104 to the classification engine to train the classification engine to identify and distinguish between various different types of contacts or associations with the touch sensitive surface 104. The positive examples of motion data can comprise, for example, positive examples of patterns of motion of the touch sensitive device 100 relating to finger(s) contacts or associations with the touch sensitive surface 104 and positive examples of patterns of motion of the touch sensitive device 100 relating to ear and/or facial contacts or associations with the touch sensitive surface 104.

The classification engine can be updated and refined over time to enhance classifications of contacts or associations of objects with the touch sensitive surface 104. For example, the object classification component 112 can receive updates relating to contact classification to apply to the classification engine to refine and enhance classifications of contacts or associations of objects with the touch sensitive surface 104 by the classification engine. In some embodiments, during operation of the touch sensitive device 100, the object classification component 112 can train, update, refine, and/or enhance the classification engine to refine and enhance classifications of contacts or associations of objects with the touch sensitive surface 104 by the classification engine.

Figure 9:
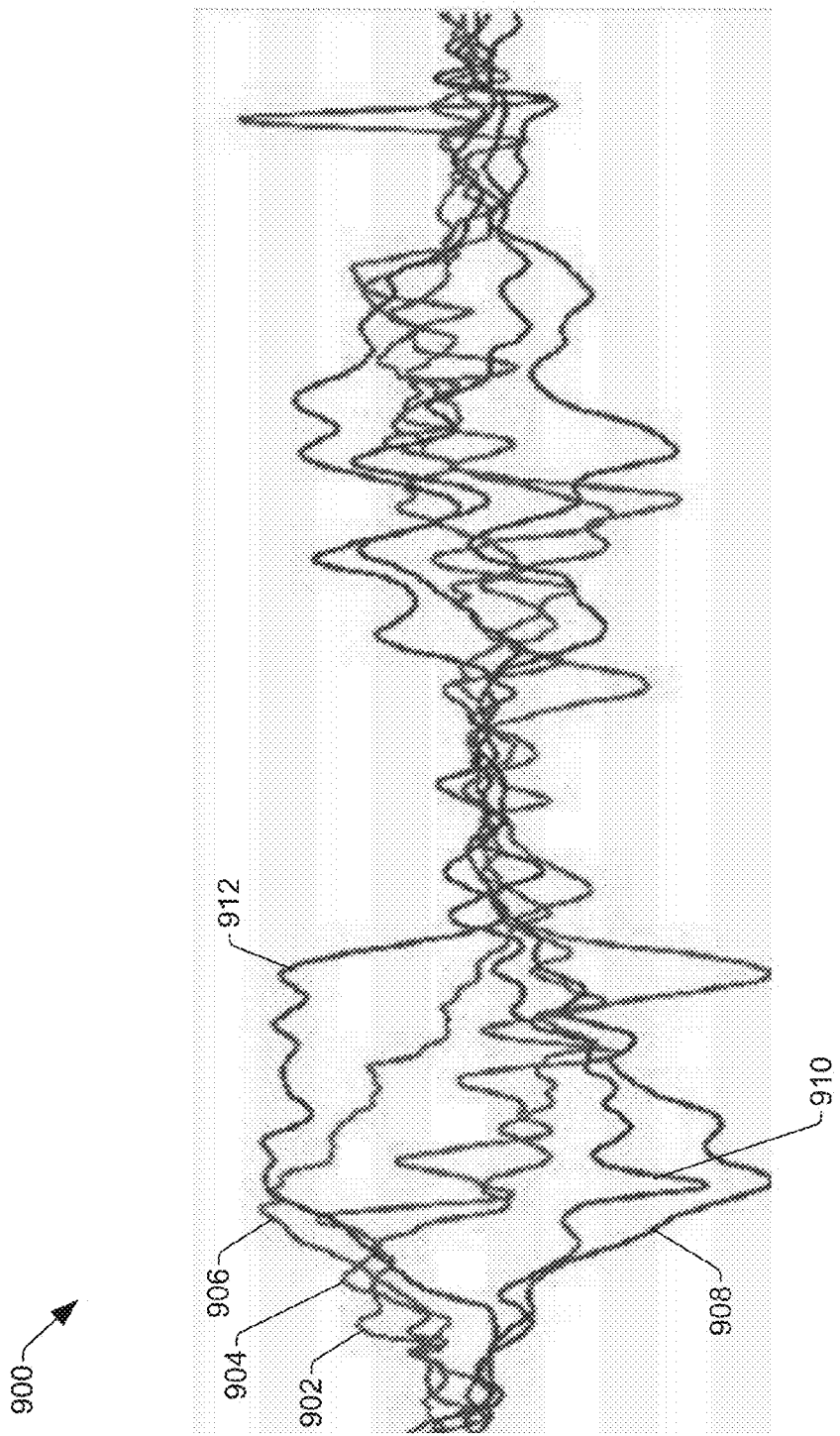
FIG. 9 depicts a diagram of an example graph that can represent motion data relating to an ear of a user touching the touch sensitive surface when certain sensors of the sensor component detect certain motion of the touch sensitive device, in accordance with various aspects and embodiments of the disclosed subject matter.

Turning briefly to FIG. 9 (along with FIG. 1), FIG. 9 depicts a diagram of an example graph 900 that can represent motion data relating to an ear of the user touching the touch sensitive surface 104 when certain sensors (e.g., motion-related sensors 110) of the sensor component 106 detect certain motion of the touch sensitive device 100, in accordance with various aspects and embodiments of the disclosed subject matter. The motion data presented in the example graph 900 can comprise respective motion data along six respective axes associated with the touch sensitive device 100 for a defined period of time (e.g., 2.5 seconds or other desired amount of time that can be less than or greater than 2.5 seconds), as such respective motion data was obtained by a three-axis accelerometer and a three-axis gyroscope and stored in the buffer component 116. For instance, the motion data can comprise first accelerometer data 902 along a first axis, second accelerometer data 904 along a second axis, and third accelerometer data 906 along a third axis, of the accelerometer; and the motion data also can comprise first gyroscope data 908 along a first axis, second gyroscope data 910 along a second axis, and third gyroscope data 912 along a third axis, of the gyroscope.

The object classification component 112, employing the classification engine, can analyze the motion data (e.g., motion data presented in example graph 900). Based at least in part on the results of the analysis of the motion data, the object classification component 112 can determine that there is contact of an object with the touch sensitive surface 104 and that the object is an ear of the user, or at least can determine that the motion data analysis results are indicative of the ear of the user being in contact with the touch sensitive surface 104.

Figure 10:
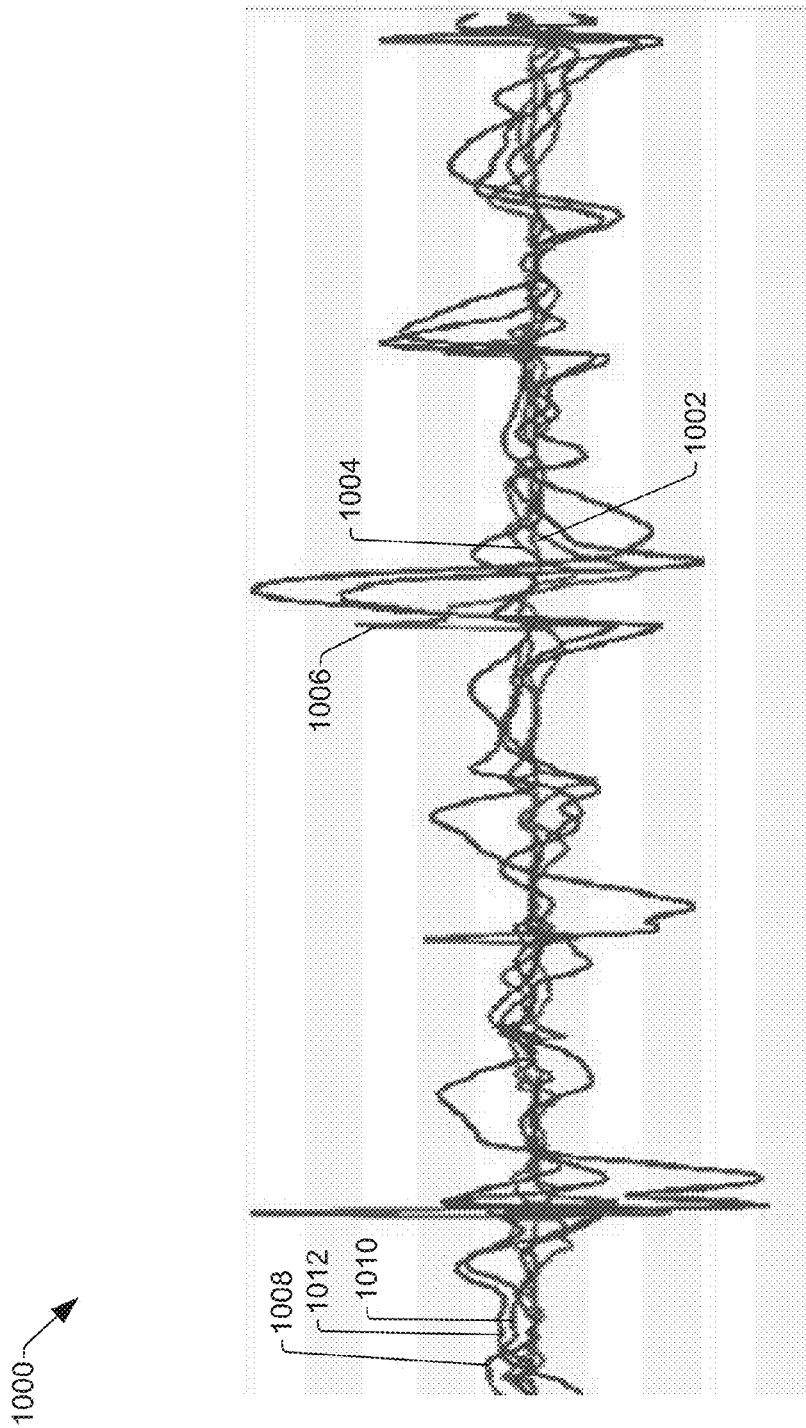
FIG. 10 illustrates a diagram of an example graph that can represent motion data relating to a finger of the user touching the touch sensitive surface when certain sensors of a sensor component detect a particular motion of the touch sensitive device, in accordance with various aspects and embodiments of the disclosed subject matter.

Referring briefly to FIG. 10 (along with FIGS. 1 and 9), FIG. 10 illustrates a diagram of an example graph 1000 that can represent motion data relating to a finger of the user touching the touch sensitive surface 104 when certain sensors (e.g., motion-related sensors 110) of the sensor component 106 detect a particular motion of the touch sensitive device 100, in accordance with various aspects and embodiments of the disclosed subject matter. The motion data presented in the example graph 1000 can comprise respective motion data along six respective axes associated with the touch sensitive device 100 for a defined period of time (e.g., 2.5 seconds), as such respective motion data was obtained by a three-axis accelerometer and a three-axis gyroscope and stored in the buffer component 116. In the example graph 1000, the motion data can comprise first accelerometer data 1002 along a first axis, second accelerometer data 1004 along a second axis, and third accelerometer data 1006 along a third axis, of the accelerometer; and the motion data also can comprise first gyroscope data 1008 along a first axis, second gyroscope data 1010 along a second axis, and third gyroscope data 1012 along a third axis, of the gyroscope.

The object classification component 112, employing the classification engine, can analyze the motion data (e.g., motion data presented in example graph 1000). Based at least in part on the results of the analysis of such motion data, the object classification component 112 can determine that there is contact of an object with the touch sensitive surface 104 and that the object is a finger of the user, or at least can determine that the motion data analysis results are indicative of the finger of the user being in contact with the touch sensitive surface 104.

As can readily be ascertained when observing the motion data relating to ear contact, as presented in example graph 900, and the motion data relating to finger contact, as presented in example graph 1000, the motion data relating to an ear contact with the touch sensitive surface 104 can be significantly different than the motion data relating to a finger contact with the touch sensitive surface 104. It is to be appreciated and understood that, even in instances where motion data relating to ear contact and motion data relating to finger contact would appear (e.g., to a user) to be relatively similar (e.g., in a graph), the object classification component 112 (e.g., employing the classification engine) can be sufficiently trained to identify and distinguish between instances of ear contact (or association) with the touch sensitive surface 104 and instances of finger contact (or association) with the touch sensitive surface 104. It also is to be appreciated and understood that motion data can indicate that there is no contact or association (e.g., no hovering) with the touch sensitive surface 104 or can indicate that a different type of contact with the touch sensitive surface 104, other than a finger or ear (or face), has occurred, and the object classification component 112 (e.g., employing the classification engine) can identify and distinguish between instances of no contact or association with the touch sensitive surface 104, finger contact or association with the touch sensitive surface 104, ear (or face) contact or association with the touch sensitive surface 104, or a different type of contact or association with the touch sensitive surface 104, in accordance with the defined classification criteria.

As disclosed herein, the object classification component 112 can utilize one or more axes of motion data to facilitate determining contact classifications of an object(s) with respect to the touch sensitive surface. The number of axes of motion data utilized by the object classification component 112 can be determined based at least in part on a number of factors, in accordance with the defined classification criteria. The factors can comprise, for example, the type(s) and/or number of motion-related sensors 110 employed by the touch sensitive device 100, the amount of resources and/or time available to the object classification component for a contact classification at the time the analysis of motion data (and/or other data (e.g., touch surface data)) is being performed, a confidence level of a contact classification made using the touch surface data (and/or other sensor data), and/or one or more other factors.

For example, if a touch sensitive device employs a single-axis accelerometer and no other type of motion-related sensor, only one axis of motion data can be available for analysis by the object classification component; if a touch sensitive device employs a two-axis accelerometer and no other type of motion-related sensor, only up to two axes of motion data can be available for analysis by the object classification component 12; and if a touch sensitive device employs a three-axis accelerometer and no other type of motion-related sensor, only up to three axes of motion data can be available for analysis by the object classification component. As another example, if a touch sensitive device employs a three-axis accelerometer and a three-axis gyroscope, up to six axes of motion data can be available for analysis by the object classification component, whereas if only a three-axis accelerometer is used and no three-axis gyroscope is employed (or alternatively if only a three-axis gyroscope is used and no three-axis accelerometer is employed), only up to three axes of motion data can be available for analysis by the object classification component.

With regard to resources and time available to the object classification component 112 for classification, when analyzing data, such as touch surface data and motion data associated with the touch sensitive device 100, there may be some instances where the amount of available resources (e.g., processing resources) and/or time is relatively lower. In such instances, even if the object classification component 112 has motion data associated with a higher number (e.g., six, five, or four, . . . ) of axes available for analysis, given the relatively lower amount of resources or time available at that particular time, when desirable (e.g., when in accordance with the applicable defined classification criteria), the object classification component 112 can utilize and analyze motion data associated with a lower number (e.g., one, two, three, . . . ) of axes (or axis) in determining a contact classification of an object(s) with respect to the touch sensitive surface 104. In instances when there are sufficient resources and time available, the object classification component 112 can use and analyze all or a desired portion motion data associated with all or a desired number of available axes to determine a contact classification of an object(s) with respect to the touch sensitive surface 104, in accordance with the defined classification criteria.

With regard to confidence level as a factor, in some implementations, the object classification component 112 can perform an analysis (or a relatively quicker preliminary analysis) on the touch surface data to determine an initial contact classification (or preliminary contact classification) for an object(s) with respect to the touch sensitive surface 104, wherein, as part of the analysis, the object classification component 112 also can determine a confidence level in the accuracy of the initial (or preliminary) contact classification. Based at least in part on the confidence level in the accuracy of the initial (or preliminary) contact classification, the object classification component 112 can determine the amount of motion data (e.g., the number of axes of motion data) to analyze to determine (e.g., make a final determination of) a contact classification for an object(s) with respect to the touch sensitive surface 104, in accordance with the defined classification criteria (e.g., criteria relating to confidence levels in accuracy of contact classifications and/or resources and time).

For example, if the object classification component 112 determines that the confidence level in the accuracy of the initial (or preliminary) contact classification is relatively high (e.g., satisfies (e.g., meets or exceeds) a defined threshold confidence level in accuracy), the object classification component 112 can determine that a relatively lower amount of motion data (e.g., a lower number of axes of motion data) is to be analyzed to determine, verify, or confirm a contact classification for the object(s) with respect to the touch sensitive surface 104, in accordance with the defined classification criteria. In this way, the object classification component 112 can determine the contact classification for the object(s) with respect to the touch sensitive surface 104 with a desirably (e.g., sufficiently or suitably) high level of confidence in the accuracy of such contact classification without undesirably (e.g., unnecessarily) utilizing the additional resources and time to analyze all or a larger portion of the available motion data (e.g., all or a larger number of axes of motion data) in connection with determining such contact classification.

If, however, the object classification component 112 determines that the confidence level in the accuracy of the initial (or preliminary) contact classification is relatively low (e.g., does not satisfy (e.g., does not meet or exceed) the defined threshold confidence level in accuracy), the object classification component 112 can determine that a relatively higher amount of motion data (e.g., all or a relatively higher number of axes of motion data) is to be analyzed to determine, verify, or confirm a contact classification for the object(s) with respect to the touch sensitive surface 104, in accordance with the defined classification criteria. In this way, the object classification component 112 can analyze all or at least a relatively higher amount of the available motion data to attempt to determine or verify a contact classification for the object(s) with respect to the touch sensitive surface 104 to a higher level of confidence in the accuracy of the contact classification than the accuracy confidence level achieved through analysis of the touch surface data alone.

It is to be appreciated and understood that typically, or at least it is more likely that, the performance and determination of contact classification for an object(s) with respect to the touch sensitive surface 104 by the object classification component 112 can be desirably enhanced (e.g., increasingly improved and/or more accurate) by using motion data associated with a higher number of axes than by using motion data associated with a lower number of axes or not using motion data at all.

In accordance with various other embodiments, additionally or alternatively, the object classification component 112 can utilize other information (e.g., supplemental information) to facilitate classifying and discriminating between one or more contacts of one or more objects with the touch sensitive surface 104, as more fully described herein. For example, the object classification component 112 (or another component of the touch sensitive device 100) can monitor and analyze vibro-acoustic data relating to movement or vibrations associated with the touch sensitive device 100, wherein the vibro-acoustic data can provide information that can facilitate classifying and distinguishing (e.g., disambiguating) between the types of contact that objects can have with the touch sensitive surface 104 of the touch sensitive device 100. For example, one or more sensors of the sensor component 106 can sense vibrations of the device 100 or associated with the device 100, and can generate vibro-acoustic data based at least in part on such sensing. The object classification component 112 can use (e.g., analyze) the vibro-acoustic data to facilitate identifying when the touch sensitive surface 104 has been brought into contact with fingertips of a user, finger knuckles of the user, fingernails of the user, an ear of the user, a portion of a face of the user, a stylus, and/or a wide variety of other types of things.

Additionally or alternatively, the object classification component 112 can utilize orientation data relating to the orientation of the touch sensitive device 100 to facilitate determining a contact classification for an object(s) with respect to the touch sensitive surface 104. For instance, the sensor component 106 can comprise one or more sensors (e.g., motion-related sensors 110, such as an accelerometer, a gyroscope, and/or an IMU) that can sense, measure, determine, and/or facilitate determining an orientation of the touch sensitive device 100 with respect to the environment. The one or more sensors can provide sensor data (e.g., orientation data) relating to the orientation of the touch sensitive device 100 to the object classification component 112. Certain orientations of the touch sensitive device 100 and corresponding orientation data can be generally or at least often consistent with and/or can indicate that an object(s) associated with (e.g., in contact with or hovering in proximity to) the touch sensitive surface 104 is a finger(s) of a user. Other orientations of the touch sensitive device 100 and corresponding orientation data can be generally or at least often consistent with and/or can indicate that an object(s) associated with the touch sensitive surface 104 is an ear or portion (e.g., cheek) of a face of the user. The object classification component 112 can utilize the orientation data to facilitate identifying and distinguishing between different types of contact or other association (e.g., hover) with the touch sensitive surface 104.

The object classification component 112 can analyze the orientation data and other sensor data, such as touch surface data and/or motion data (and/or other sensor data). Based at least in part on the results of analyzing the orientation data, touch surface data, and/or motion data (and/or other sensor data), the object classification component 112 can determine a contact classification or contact state of an object(s) with respect to the touch sensitive surface 104, in accordance with the defined classification criteria.

Additionally or alternatively, visible light sensors and/or infrared sensors also can be included in devices (e.g., digital display devices) to detect when the head, finger, or other part of a user is positioned in close proximity to the touch sensitive surface (e.g., touch screen surface) of such device. The object classification component 112 can use and analyze sensor data produced by the visible light sensors and/or infrared sensors to facilitate discriminating between finger contact, head contact, or other contact between a part of the user and the touch sensitive surface 104 of such device 100. It is to be appreciated and understood that the object classification component 112 can accurately classify and discriminate between one or more contacts or associations (e.g., hover) of one or more objects with the touch sensitive surface 104 (e.g., accurately classify and discriminate between multi-point contacts) of the touch sensitive device 100 without the touch sensitive device 100 using or relying on using, for example, visible light sensors and/or infrared sensors.

The contact classification or state for an object(s) with respect to the touch sensitive surface 104 can be utilized to facilitate making decisions regarding the controlling of various functions of the touch sensitive surface 104 or other components of the touch sensitive device 100. The event determination component 114 can be employed to facilitate controlling functions of the touch sensitive surface 104 and/or other components of the touch sensitive device 100.

The event determination component 114 can receive, from the object classification component 112, information regarding the contact classification and/or contact state of an object(s), if any, with respect to the touch sensitive surface 104. The event determination component 114 can analyze the information regarding the contact classification and/or contact state of the object(s) with respect to the touch sensitive surface 104.

Based at least in part on the results of analyzing the information relating to the contact classification or the contact state of the object(s) with respect to the touch sensitive surface 104, the event determination component 114 can control functions associated with the touch sensitive surface 104 and/or other components of the touch sensitive device 100, in accordance with the defined classification criteria. The functions can comprise, for example, enabling a touch sensitive function of the touch sensitive surface 104 (e.g., of a display screen) of the touch sensitive device 100, disabling the touch sensitive function of the touch sensitive surface 104 (e.g., of the display screen), switching the display screen (e.g., touch display screen) of the touch sensitive device 100 on (e.g., to an on state), and/or switching the display screen off (e.g., to an off state).

For example, in response to determining that the contact classification or state (e.g., finger state or finger-hovering state) is that the object is a finger in contact with or hovering in proximity to the touch sensitive surface 104, the event determination component 114 can determining that touch functions associated with the touch sensitive surface 104 are to be enabled to allow the user to manipulate controls (e.g., buttons on touch display screen, keys of a touch screen keyboard or keypad on the touch display screen, . . . ) presented on the touch sensitive surface 104 and/or can switch (or maintain) the display screen of the touch sensitive surface 104 in an on state. As another example, in response to determining that the contact classification or state (e.g., head or ear state or head-hovering state) is that the object(s) is a portion of the user's head (e.g., ear and/or cheek) in contact with or hovering in proximity to the touch sensitive surface 104, the event determination component 114 can determining that touch functions associated with the touch sensitive surface 104 are to be disabled to prevent the user from manipulating (e.g., inadvertently manipulating controls (e.g., buttons, keys, . . . ) presented on the touch sensitive surface 104 and/or can switch (or maintain) the display screen of the touch sensitive surface 104 in an off state (e.g., to reduce power consumption).

Figure 11:
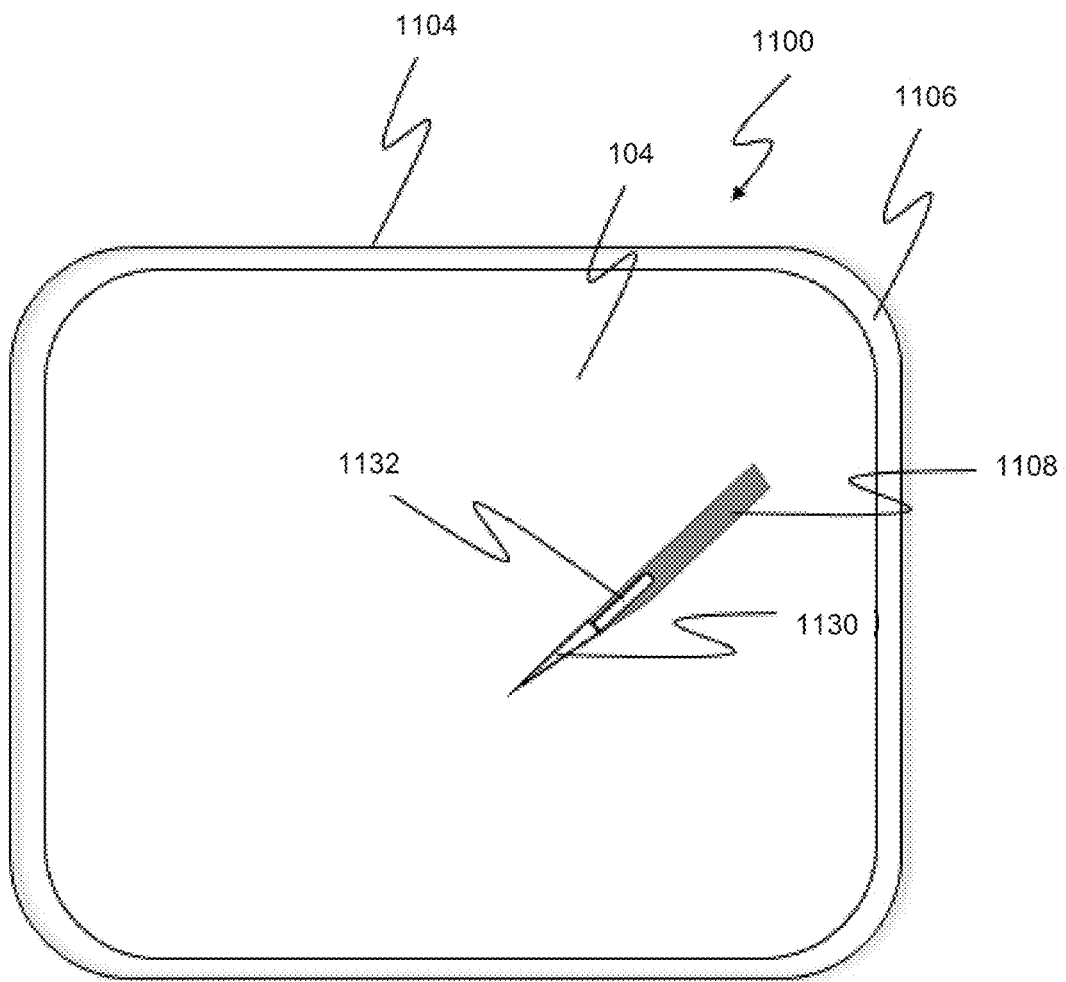
FIG. 11 depicts a diagram of a top view of an example exterior view of a touch sensitive device, in accordance with various aspects and embodiments of the disclosed subject matter.
Figure 12:
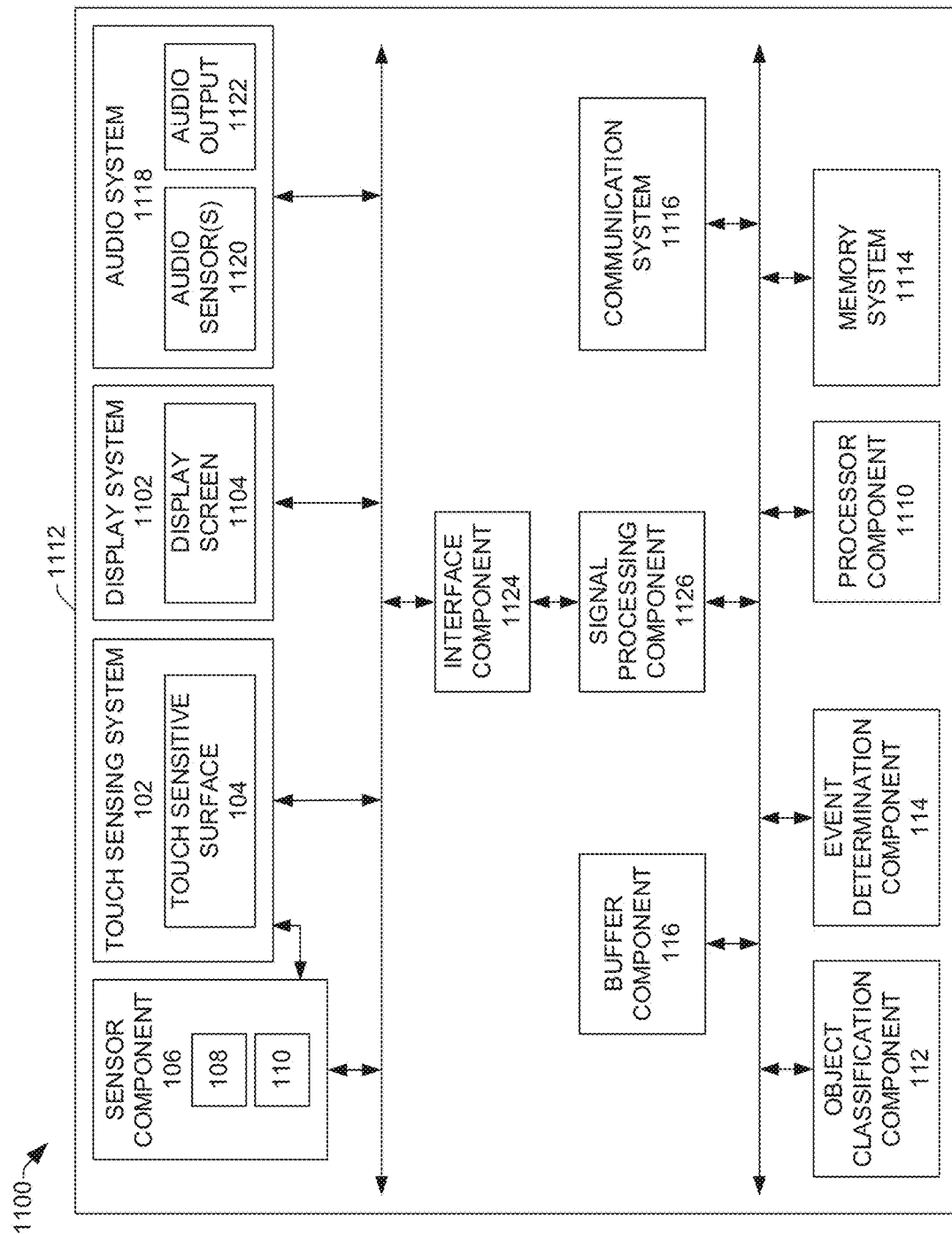
FIG. 12 illustrates a block diagram of an example touch sensitive device, in accordance with various aspects and embodiments of the disclosed subject matter.

FIG. 11 depicts a diagram of a top view of an example exterior view of a touch sensitive device 1100, and FIG. 12 illustrates a block diagram of the example touch sensitive device 1100, in accordance with various aspects and embodiments of the disclosed subject matter. The touch sensitive device 1100 can comprise the touch sensing system 102 and the touch sensitive surface 104, which can be associated with the touch sensing system 102. The touch sensitive device 1100 also can include the sensor component 106, which can comprise various sensors, including the surface-related sensors 108 and the motion-related sensors 110. The touch sensitive device 1100 further can comprise the object classification component 112 and the event determination component 114. The touch sensitive device 1100 also can include the buffer component 116, which can store (e.g., temporarily store) motion data, touch surface data, pattern data, and/or other data, as more fully described herein.

The touch sensitive device 1100 can comprise a display system 1102 that can include a display screen 1104 (e.g., touch display screen) that can present visual information, such as visual images, over a presentation area 1106 (e.g., a two-dimensional or three-dimensional presentation area). The touch sensing system 102 can include and/or provide the touch sensitive surface 104, which, at least in part, can be coextensive or can correspond to, or at least can be substantially coextensive or can substantially correspond to, the presentation area 1106.

The touch sensitive surface 104 can be adapted to detect (e.g., via the surface-related sensors 108) when an object(s) (e.g., a fingertip(s), an ear, a face, a stylus), such as an object 1108, is positioned in contact with or in proximity to, the touch sensitive surface 104, wherein the surface-related sensors 108 can generate respective signals (e.g., sensor data) from which the object classification component 112 can determine or facilitate determining a classification of the relationship of the object(s) (e.g., object 1108) with respect to the touch sensitive surface 104 (e.g., can determine which portion(s) of the touch sensitive surface 104 is in contact or in proximity to the object(s) 1108).

The touch sensitive device 1100 can take various forms including but not limited to any type of digital equipment comprising a touch sensing system 102 and a processor 1110, such as a micro-processor, micro-controller, or any other type of programmable control device, or a preprogrammed or dedicated processing or control system. In accordance with various embodiments, the touch sensitive device 1100 can be or can comprise, for example, a mobile phone (e.g., a cellular phone and/or smart phone), a computer, a display table, a personal digital assistant (PDA), an electronic tablet or notebook (e.g., a touch sensitive graphic tablet or notebook), a web pad, an electronic gaming device, an electronic workstation, a television, an Internet protocol (IP) television, a set-top box, a device (e.g., touch sensitive device) in or integrated with a vehicle, a touch pad, a track pad, or other type of device. In this regard, it will be appreciated and understood that, while the components of the touch sensitive device 1100 are illustrated in FIGS. 11 and 12 as being within a single housing 1112, this can be optional, and, in accordance with various embodiments, one or more of the various components of touch sensitive device 1100 can be located in separately housed components of the touch sensitive device 1100.

The touch sensitive surface 104 of the touch sensing system 102 can sense when an object(s) 1108 touches or is in proximity to (e.g., close enough proximity to) the touch sensitive surface 104. For instance, the touch sensitive surface can comprise or be associated with an array of sensors (e.g., an array of surface-related sensors 108) that can sense when an object is in contact with or proximity to the touch sensitive surface 104. The sensors of the touch sensing system 102 can generate signals (e.g., sensor data, such as touch surface data) from which it can be determined (e.g., by the object classification component 112) what portion of the touch sensitive surface 104 is in contact with or proximity to the object(s) 1108. The object classification component 112, for example, in conjunction with the processor 1110, can receive the signals from the touch sensing system 102 and can analyze the signals to detect strokes or other contact made by an object(s) 1108 against the touch sensitive surface 104 or detect an object(s) 1108 in proximity to the touch sensitive surface 104.

In some embodiments, the touch sensitive device 1100 further can comprise a memory system 1114. The memory system 1114 can be capable of storing and providing programming and other forms of instructions to the processor 1110 and/or other components (e.g., object classification component 112, event determination component 114, . . . ) and that can be used for other purposes. The memory system 1114 can include read only memory (ROM), random access memory (RAM) (e.g., random access semiconductor memory), and/or other types of memory or computer readable media that can be permanently installed or separably mounted (e.g., connected or interfaced) to the touch sensitive device 1100. Additionally, the touch sensitive device 1100 also can access a memory system 1114 that can be separate from the touch sensitive device 1100 by way of an optional communication system 1116 (comm. system).

With further regard to the processor 1110, the processor 1110 can operate in conjunction with other components (e.g., touch sensing system 102, touch sensitive surface 104, sensor component 106, object classification component 112, event determination component 114, . . . ) of the touch sensitive device 1100 to facilitate performing the various functions of the touch sensitive device 1100. The processor 1110 can employ one or more processors, microprocessors, or controllers that can process data, such as information relating to user data, applications, messages, message or data formatting, data conversions, touch surface data, motion, data, vibro-acoustic data, orientation data, touch data, other types of data, contact classifications, contact states, events or responsive actions, resources, and/or other information, to facilitate operation of the touch sensitive device 1100, as more fully disclosed herein, and control data flow between the touch sensitive device 1100 and other components or devices of or associated with the touch sensitive device 1100.

The memory system 1114 can comprise a data store that can store data structures (e.g., user data, metadata), code structure(s) (e.g., modules, objects, hashes, classes, procedures) or instructions, information relating to user data, applications, messages, message or data formatting, data conversions, touch surface data, motion, data, vibro-acoustic data, orientation data, touch data, other types of data, contact classifications, contact states, events or responsive actions, resources, and/or other information, to facilitate controlling operations associated with the touch sensitive device 1100. In some implementations, the processor 1110 can be functionally coupled (e.g., through a memory bus) to the memory system 1114, including the data store, in order to store and retrieve information desired to operate and/or confer functionality, at least in part, to the touch sensing system 102, touch sensitive surface 104, sensor component 106, object classification component 112, event determination component 114, etc., and/or substantially any other operational aspects of the touch sensitive device 1100.

The touch sensitive device 1100 also can comprise one or more other components (e.g., one or more other optional components) such as, for example, an audio system 1118 that can comprise an audio sensor(s) 1120, such as a microphone(s) and or a connection to a microphone(s), and an audio output 1122, such as a speaker(s) or a connection to a speaker(s). The touch sensitive device 1100 also can include, as illustrated, an interface component 1124 (e.g., interface unit), a signal processing component 1126 (e.g., signal processing unit), and a database component 1128.

With further regard to the sensors of the sensor component 106, the sensors can take any of a variety of forms and can comprise generally any known device for sensing conditions inside or outside of the touch sensitive device 1100. The sensors of the sensor component 106 can, without limitation, comprise or take the form of acoustic sensors, accelerometers, gyroscopes, light sensors, range finders, thermometers, Hall effect sensors, switches (e.g., 2-way, 4-way switch, 6-way switch, 8-way switch), mouse and trackball systems, a joystick system, a voice recognition system, a video-based gesture recognition system or other such systems, radio frequency identification (RFID) and near field communication sensors, bar code sensors, position sensors, and/or other sensors that can be used to detect conditions that can be useful in governing operation or performing functions of image or presence sensing, and can convert this sensed information into a form that can be used by the object classification component 112 and the processor 1110 in controlling (e.g., governing) operation of the touch sensitive device 1100. The sensors also can comprise biometric sensors that can be adapted to detect characteristics of a user or entity for security and affective imaging purposes.

Alternatively or additionally, sensors of the sensor component 106 can include accelerometers, vibration sensors, ultrasonic sensors, piezoelectric devices, and/or other sensing circuits or systems that can sense vibrations or sounds that can be indicative of contact between an object 1108 and the touch sensitive surface 104.

The sensors of the sensor component 106 also can comprise pressure sensors that can sense an amount of pressure applied by an object 1108 against the touch sensitive surface 104. In some embodiments, the touch sensitive surface 104 can be of a type that can sense not only which portion of the touch sensitive surface 104 has been contacted by an object 1108, but also can sense an amount of pressure applied against the touch sensitive surface 104. One or more of various sensors and sensing technologies can be employed that can sense different levels of pressure against the touch sensitive surface 104.

In still other embodiments, the sensors of the sensor component 106 can include one or more sensors 1130 (e.g., a force sensor) that can optionally be incorporated in or on object 1108 (e.g., stylus) and that can sense conditions indicative of an amount of force applied between the object 1108 and the touch sensitive surface 104. In such embodiments, a force sensor 1130 can take the form of, for example and without limitation, a piezoelectric sensor, a stress sensor, a strain sensor, a compression sensor, a deflection sensor, or a resiliently biased sensing system that can sense force (e.g., sense an amount of force) based at least in part on an extent of deflection movement of a contact surface against the force of the resilient member and that can generate a signal (e.g., sensor data, such as force data) that can be indicative of the amount of force applied by or through an indicator against the touch sensitive surface 104.

Such a force sensor 1130 can be directly connected to the interface component 1124 by way of a wired connection or a wireless connection, such as by an optional wireless communication module 1132 that can be capable of communication with the communication system 1116.

In certain embodiments, force sensing can be achieved by providing an object 1108, such as a stylus as illustrated in FIG. 11, that can have a rounded flexible tip such as a rubber or metallic mesh tip that can be arranged in a resilient manner to flatten when pressed against the touch sensitive surface 104 thereby increasing the amount of surface area of the tip of the object 1108 in contact with the touch sensitive surface 104. In such embodiments, the size of the area of the tip of the object 1108 in contact with the touch sensitive surface 104 can be an effective proxy for the amount of force applied by a user against the touch sensitive surface 104, and, in this regard, a touch sensitive surface 104 that is capable of sensing area of the tip of the object 1108 that is in contact with the touch sensitive surface 104 can be used for this purpose by the disclosed subject matter. The disclosed subject matter (e.g., the touch sensitive surface 104) can achieve similar results, with proper calibration, using a fingertip of the user or another object 1108.

The communication system 1116 can take the form of any optical, radio frequency, or other circuit or system that can convert data into a form that can be conveyed to an external device by way of an optical signal, radio frequency signal, or other form of wired or wireless signal. The communication system 1116 can be used for a variety of purposes including, but not limited to, sending and receiving instruction sets and exchanging data with remote sensors or memory systems.

With further regard to the interface component 1124, the interface component 1124 can receive signals (e.g., sensor data, audio signals, and/or other data), for example, from the touch sensing system 102, the audio system 1118, and/or other sensors of the sensor component 106, or any components thereof. The interface component 1124 can process these signals for use by the object classification component 122, the processor 1110, the signal processing component 1126 (e.g., taking the form of a signal processor or signal processing circuit), and/or another component(s) of the touch sensitive device 1100.

The interface component 1124 can, for example, be connected to outputs (e.g., output ports) from the touch sensing system 102, the audio system 1118, and/or sensors of the sensor component 106. If signals from an output are in analog form, the interface component 1124 can include analog to digital converters that can convert such analog signals into digital signals that can be used by the object classification component 112, the processor, 1110, the signal processing component 1126, and/or another component(s) of the touch sensitive device 1100. The interface component 1124 also can include amplifiers, filters, including, but not limited to, noise filters, band pass/band reject filters or couplings, breakers, fusible links, and/or other systems that can protect other components of the touch sensitive device 1100 from potential damage.

In some embodiments, the touch sensitive device 1100 can utilize multiple sources of vibro-acoustic signals with one or more sensors (e.g., one or more sensors for in-air acoustics, and one or more sensors for mechanical vibrations, also referred to as structural acoustics). The touch sensitive device 1100 can utilize one or more types of audio sensors 1120 or other types of sensors of the sensor component 106, wherein such audio sensors or other types of sensors can include, but are not limited to, for example:

piezoelectric bender elements;
piezoelectric film;
accelerometers (e.g., linear variable differential transformer (LVDT), potentiometric, variable reluctance, piezoelectric, piezoresistive, capacitive, servo (force balance), MEMS);
displacement sensors;
velocity sensors;
vibration sensors;

gyroscopes;
proximity sensors;
electric microphones;
hydrophones;
condenser microphones;
electret condenser microphones;
dynamic microphones;
ribbon microphones;
carbon microphones;
piezoelectric microphones;
fiber optic microphones;
laser microphones;
liquid microphones; and/or
MEMS microphones.

Many touchscreen computing devices can include microphones and accelerometers (e.g., for voice and input sensing). Such microphones and accelerometers can be utilized by the device (e.g., touch sensitive device 1100) without having to employ additional sensors or can work in concert with other sensors (e.g., specialized sensors performing particular or specified functions).

To this end, the interface component 1124 can receive signals (e.g., sensor data) from the audio sensor 1120 or another sensor of the sensor component 106 that can sense vibrations, and can prepare the signals for use by the signal processing component 1126 or another component of the touch sensitive device 1100. For example, the interface component 1124 can convert such signals from analog form into corresponding digital signals, and can provide the digital signals, which can be a digital signal representative of conditions sensed by audio sensor 1120 and the other sensor of the sensor component 106, to the signal processing component 1126 or the other component.

The interface component 1124 also can receive signals (e.g., control signals or instructions) from the processor 1110, the signal processing component 1126, the object classification component 112, and/or the event determination component 114, and can use these signals to control operation of the touch sensitive surface 104, the display system 1102, including the display screen 1104, the audio system 1118, and/or the communication system 1116. In this regard, the interface component 1124 can include display drivers, audio output systems, including amplifiers, and the like. It will be appreciated and understood that some or all of the functions ascribed to the interface component 1124 can be performed by hardware or programs that can be integrated within the touch sensing system 102, the display system 1102, the audio system 1118, the sensors of the sensor component 106, the object classification component 112, the event determination component 114, or the communication system 1116.

The signal processing component 1126 can receive signals from the interface component 1124, which can be in digital form, and can prepare the signals for further processing. The signal processing component 1126 can perform sampling, quantization, and/or encoding processes, and, as desired, also can be used in converting analog signals into a digital signal (e.g., if a received signal is in analog form). The signal processing component 1126 can transmit the digital signals (e.g., the signal-processed digital signals) to the processor 1110, the object classification component 112, and/or another component of the touch sensitive device 1100.

As more fully disclosed herein, the object classification component 112 and/or the processor 1110 (e.g., operating in conjunction with the object classification component 112) can determine a contact classification or contact state for an object(s) with respect to the touch sensitive surface 104 based at least in part on touch surface data associated with the touch sensitive surface 104, motion data relating to motion of the touch sensitive device 1100, and/or other data (e.g., orientation data, touch data, . . . ). In some embodiments, the event determination component 114 (e.g., event determining unit) can determine that an event with respect to the touch sensitive surface 104 and/or touch sensitive device 1100 has occurred based at least in part on the contact classification of the object(s), and the event determination component 114 and/or the processor 1110 can use this event determination to control operation of the touch sensitive device 1100 (e.g., the touch sensitive surface 104 of the touch sensitive device 1100). For example, the event determination component 114 can control operation of the touch sensitive surface 104 (e.g., enable or disable a touch function(s) of the touch sensitive surface 104) and/or the display screen 1104 (e.g., turn the display screen 1104 to an on state or an off state) based at least in part on the determined event, in accordance with the defined classification criteria, as more fully described herein. In certain embodiments, the database component 1128 also can be provided, wherein program software and other data can be stored in the database component 1128 (and/or a data store of the memory system 1114).

In accordance with various embodiments and aspects of the disclosed subject matter, at least some of functions of the interface component 1124, the signal processing component 1126, the object classification component 112, the event determination component 114, the database component 1128, and/or another component(s) of the touch sensitive device 1100 can be or can comprise program modules to control or communicate with other hardware components or components for executing software, which can be included, for example, in the touch sensitive device 1100, wherein such other components can include, for example, and without limitation, the processor 1110, the memory system 1114, the interface component 1124, and/or the signal processing component 1126. The program modules can be included in the touch sensitive device 1100 in the form of operating systems, application program modules, or other program modules, wherein they can be physically stored in a variety of storage devices (e.g., data stores). Further, the program modules also can be stored in a remote storage device that can communicate with the touch sensitive device 1100 by way of the communication system 1116. Meanwhile, such program modules can include, but are not limited to, routines subroutines, programs, objects, components, data structures, and the like, for performing specific tasks or executing specific abstract data types as described herein, in accordance with the disclosed subject matter. Such program modules also can be expressed in terms of configurations of hardware adapted to perform the functions associated with such modules.

The object classification component 112 can analyze the signals (e.g., digital signals) transmitted from the signal processing component 1126 or other component (e.g., a sensor(s)). Based at least in part on the results of the analysis, the object classification component 112 can determine whether an object(s) 1108 has been brought into contact with, or in proximity to, the touch sensitive surface 104, and can classify the type of object(s) 1108 brought into contact with, or in proximity to, the touch sensitive surface 104, in accordance with the defined classification criteria.

In general, when the object classification component 112 characterizes such an object, the object classification component 112 can receive a signal having frame information in the form of x,y coordinate values with each of the x,y coordinate values representing which portions of the touch sensitive surface 104 are in contact with the object 1108. The touch sensitive surface 104 (e.g., sensors of or associated with the touch sensitive surface 104) can obtain such x,y coordinate values by sampling the touch sensitive surface 104 at a specified (e.g., predetermined) rate, such as, for example, 100 times per second, 60 times per second, 30 times per send, or at another desired sampling or sensing rate. In one such embodiment, the positions of the touch sensitive surface 104, if any, that are in contact with, or in proximity to, the object 1108 can be sensed (e.g., by respective sensors associated with the respective positions) at a desired sampling or sensing rate, and frame data can be generated (e.g., by the object classification component 112, respective sensors, and/or another component), wherein the frame data can represent an x-coordinate value and a y-coordinate map indicative of the positions of contact or hovering between the object 1108 and the touch sensitive surface 104. In some embodiments, the frame data also can comprise respective intensity values that can be determined (e.g., by the object classification component 112, respective sensors, and/or another component) for and assigned to respective x-y coordinate values.

The object 1108 can comprise any object that can come in contact with or be in proximity to the touch sensitive surface 104 and that can be detected by the touch sensitive surface 104 (e.g., sensors of or associated with the touch sensitive surface 104). Although listed in singular form as "object" 1108, it will be appreciated that for the purposes of this disclosure an "object" can comprise any combination of items that can be brought into contact with or in proximity to the touch sensitive surface 104 during a frame, wherein the items of the object 1108 can include, but not limited to, fingers of a user, combinations of different parts of the fingers, indicators including styluses or pens (e.g., utilized by the user), different parts of a body of the user, such as a head, ear, cheek bone, mouth, face, skin, beard or hair, hats, headgear, and/or head wrappings, or combinations thereof.

In certain embodiments, an object 1108 can take the form of an electronic pen, stylus, or other tool with or without electric circuits therein, which may or may not belong to the touch sensitive device 1100, except when an object 1108 is a body part of the user, such as the user's finger, ear, etc. An object 1108 can be made of various materials, such as, for example, metal, wood, plastic, rubber, and/or glass. An object 1108 also can comprise body parts of a user, such as fingers, hands, arms, head, and/or neck of the user. When an object 1108 is the user's finger, each of the specific parts of the finger can be or become the object 1108, in accordance with the disclosed subject matter, because fingers usually can be constituted by various parts such as finger tips, finger nails, knuckles, and finger joints.

The object classification component 112 can analyze and use the x,y coordinate data (e.g., frame data), which can represent respective portions of the touch sensitive surface 104 in contact with an object 1108 and/or any intensity data from the frame data. Based at least in part on the results of analyzing the frame data (e.g., the x,y coordinate data and/or the intensity data), the object classification component 112 can classify the nature of the contact(s) or hovering sensed by the touch sensitive surface 104 (e.g., the object classification component 112 can determine the contact classification and contact state with respect to the object 1108 and the touch sensitive surface 104).

Figure 13:
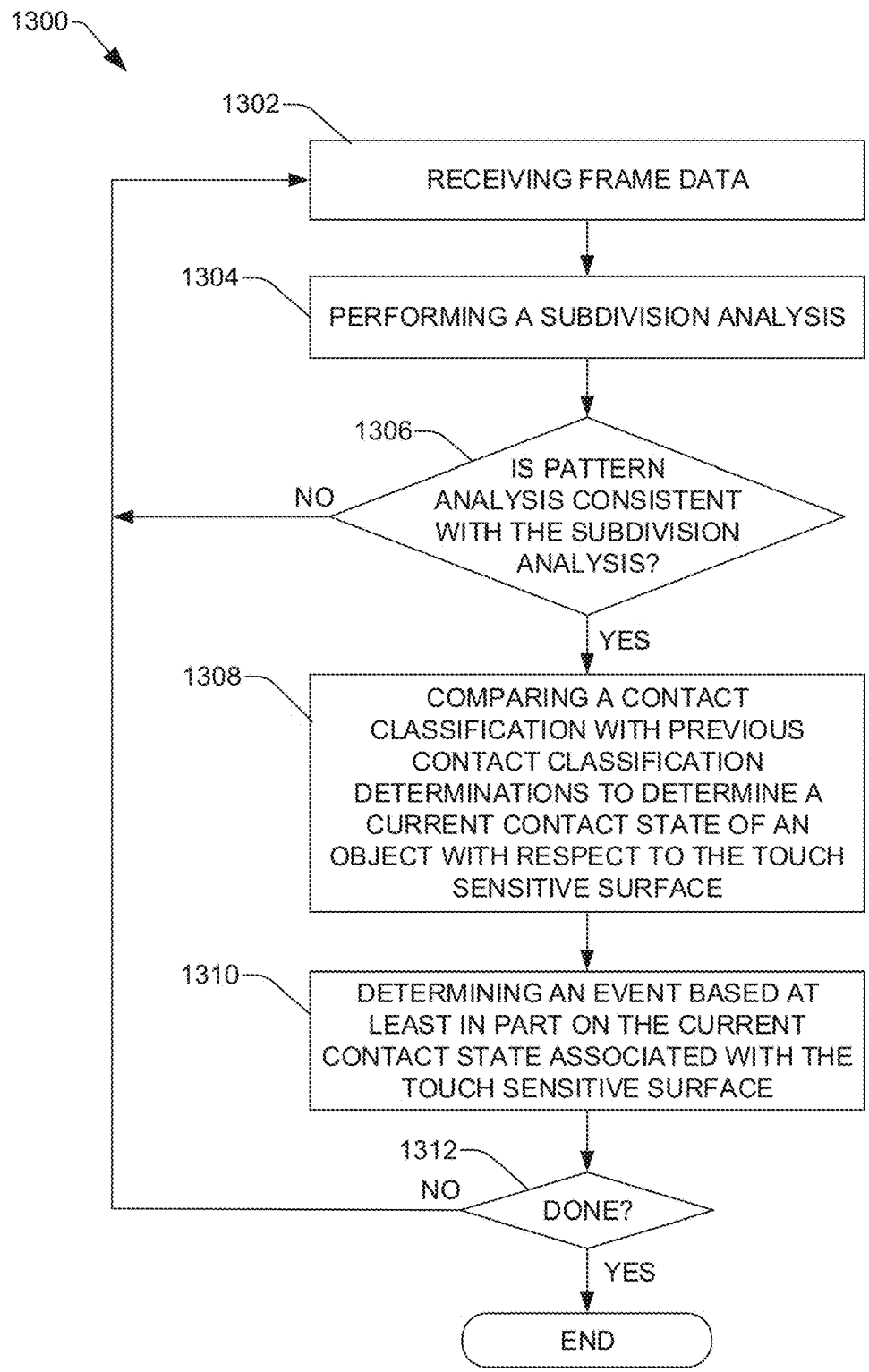
FIG. 13 illustrates a flow diagram of an example method for classifying contacts against or in proximity to a touch sensitive surface of a touch sensitive device, in accordance with various aspects and embodiments of the disclosed subject matter.
Figure 14:
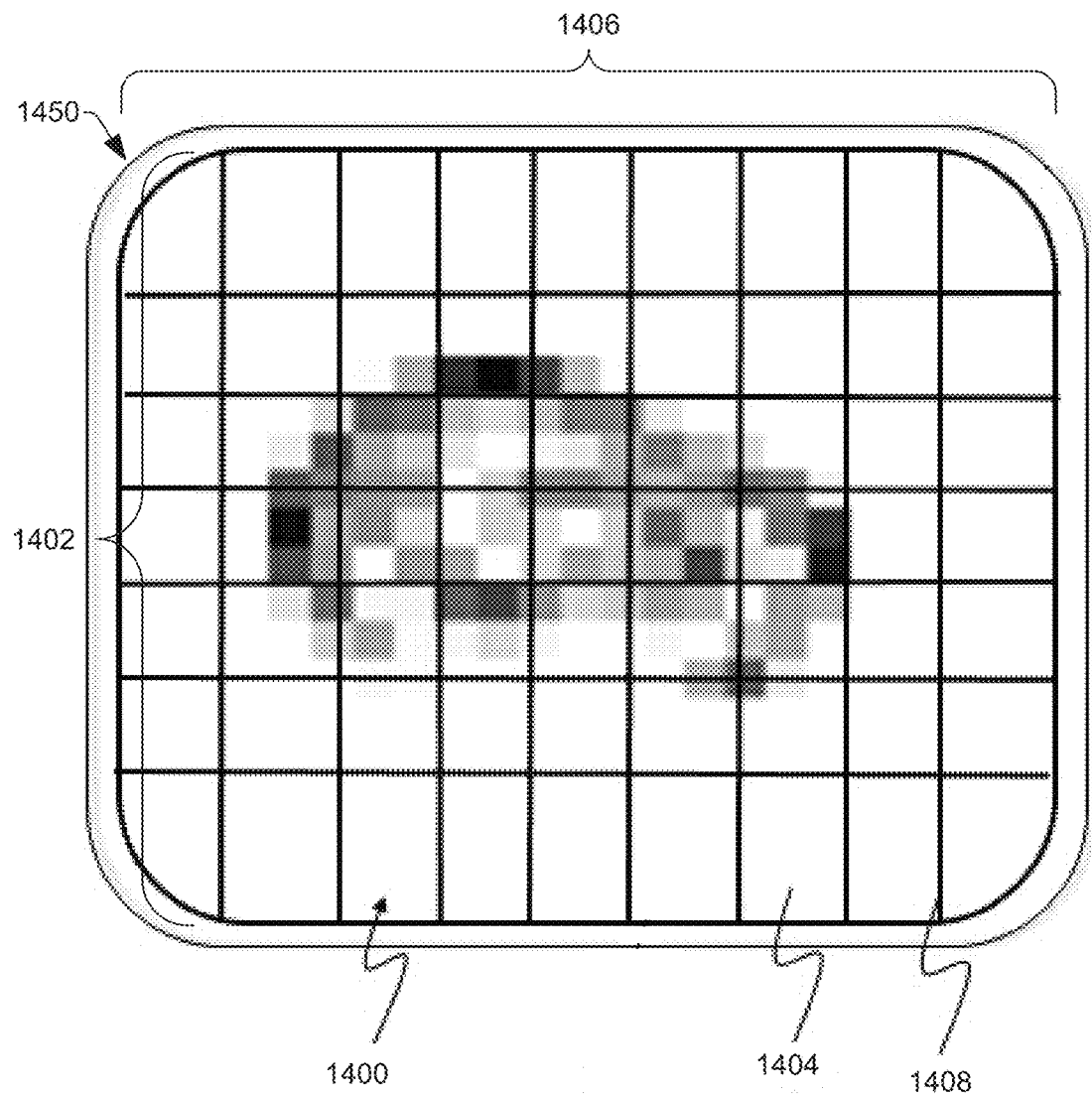
FIG. 14 depicts a diagram of an example frame image as part of a visual representation of a top view of an example touch sensitive device, wherein the frame image can comprise or represent certain frame data relating to an example sensing of an object in contact with a touch sensitive surface, in accordance with various aspects and embodiments of the disclosed subject matter.

The operation of the object classification component 112, with regard to various aspects and embodiments of the disclosed subject matter, can be illustrated with reference to FIGS. 13-17 (along with FIGS. 11 and 12). FIG. 13 illustrates a flow diagram of an example method 1300 for classifying contacts against or in proximity to the touch sensitive surface 104 of the touch sensitive device 1100, in accordance with various aspects and embodiments of the disclosed subject matter. As is shown in FIG. 13, at reference numeral 1302, frame data associated with the touch sensitive surface can be received (e.g., by the object classification component 112). Turning briefly to FIG. 14 (along with FIGS. 11-13), FIG. 14 depicts a diagram of an example frame image 1400 as part of a visual representation 1450 of a top view of the example touch sensitive device 1100, wherein the example frame image 1400 can comprise or represent certain frame data relating to an example sensing of an object in contact with the touch sensitive surface 104, in accordance with various aspects and embodiments of the disclosed subject matter. In this example, the frame data depicted in the image 1400 was sensed, for example and without limitation, when an object (e.g., 1108), such as an ear of the user is in contact with the touch sensitive surface 104.

In the touch sensitive device 1100, the object classification component 112 can receive the frame data representing x,y coordinates of each portion of the touch sensitive surface 104 that is in contact with (or in proximity to (if such is the case)) another surface (of an object 1108), and the object classification component 112 can perform a method (e.g., method 1300) for classifying a type of contact (or hovering). The object classification component 112 can supply the contact classification, determined by the object classification component 112, to the event determination component 114 for further processing or action, as more fully described herein.

With further regard to the method 1300 of FIG. 13, in some embodiments, at reference numeral 1304, to facilitate determining the contact classification (e.g., performed by the object classification component 112), a subdivision analysis can be performed. In the subdivision analysis, the object classification component 112 can divide (e.g., partition, segregate) the frame data into respective subdivisions comprising respective portions of the frame data. The object classification component 112 can analyze each subdivision to identify or determine characteristics of the portion of the frame data associated with the subdivision that may or may not indicate consistency with the determined classification (e.g., determined contact classification). There can be various forms for such subdivisions. These subdivisions can be demarcated for the purposes of the following description of the disclosed subject matter in terms of bounding areas, and a variety of bounding area shapes can be usable, for example, as determined by the object classification component 112, in accordance with the defined classification criteria. In accordance with various embodiments, the bounding area shapes can be mutually exclusive, that is, defined so that no portion of a bounding area overlaps a portion of another bounding area, or bounding area shapes can be defined so that the bounding areas can at least in part overlap with each other.

The example image 1400 of FIG. 14 illustrates one example of frame data 1402, wherein respective portions of the frame data 1402 can be in respective bounding areas 1404 of a pattern 1406 of bounding areas 1404, wherein the pattern 1406 of bounding areas 1404 can be used by the object classification component 112 when the object classification component 112 performs a subdivision analysis on the frame data 1402, in accordance with various aspects and embodiments of the disclosed subject matter. In the example frame image 1400 of FIG. 14, the object classification component 112 can utilize a generally uniformly patterned array 1408 of bounding areas 1404 to subdivide the frame data 1402 among the respective bounding areas 1404 of the array 1408. However, it is to be appreciated and understood that the pattern 1406 does not have to be uniform in nature.

Figure 15:
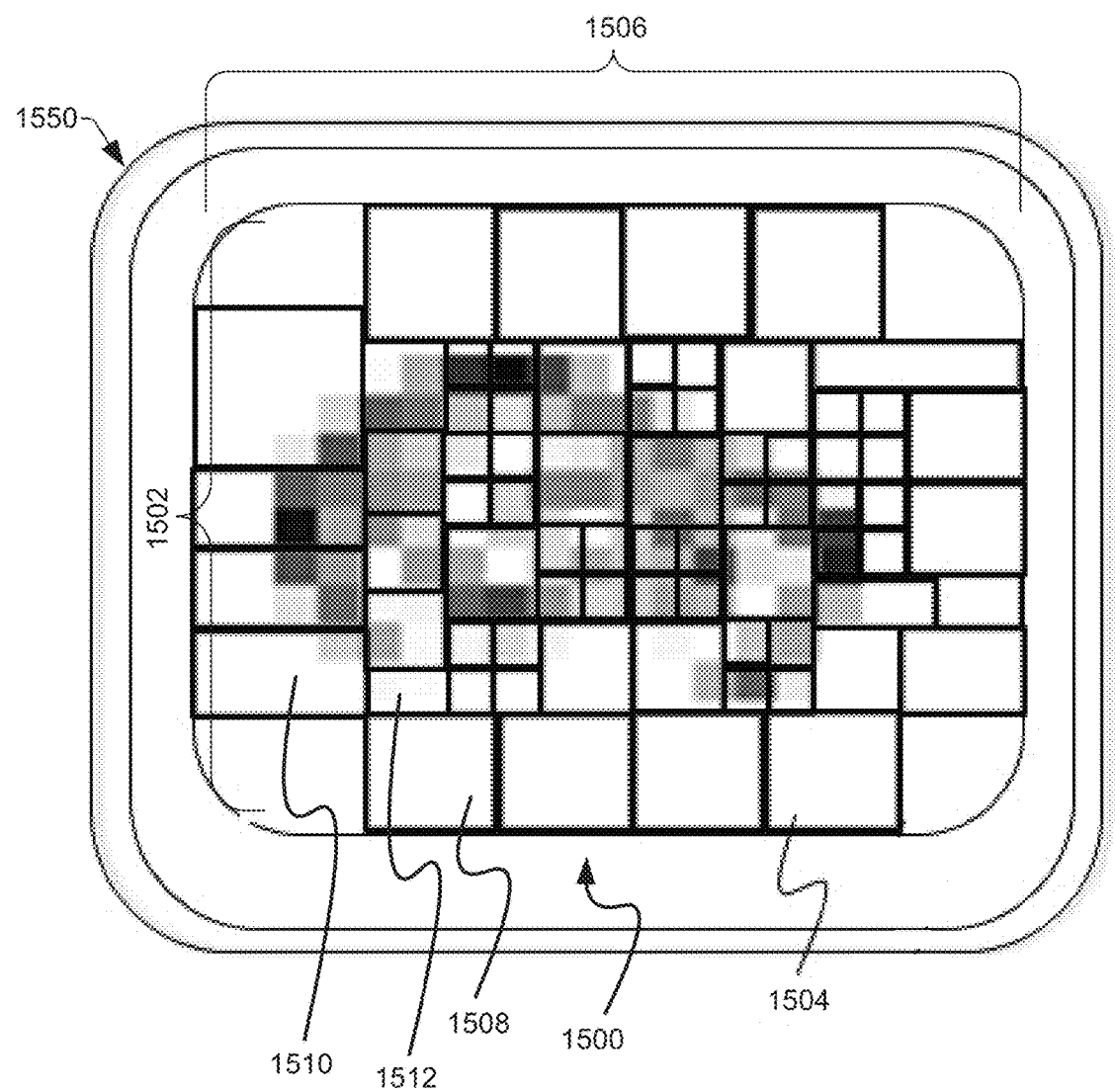
FIG. 15 presents a diagram of an example frame image as part of a visual representation of a top view of an example touch sensitive device, wherein the example frame image can comprise or represent certain frame data subdivided among non-uniform bounding areas, wherein the frame data relates to an example sensing of an object in contact with a touch sensitive surface, in accordance with various aspects and embodiments of the disclosed subject matter.

Referring briefly to FIG. 15 (along with FIGS. 11-13), FIG. 15 presents a diagram of an example frame image 1500 as part of a visual representation 1550 of a top view of the example touch sensitive device 1100, wherein the example frame image 1500 can comprise or represent certain frame data subdivided among non-uniform bounding areas, wherein the frame data relates to an example sensing of an object in contact with the touch sensitive surface 104, in accordance with various aspects and embodiments of the disclosed subject matter. For example, as shown in the example frame image 1500 of FIG. 15, the example frame image 1500 can comprise or represent certain frame data 1502, which, in this example, can depict an object (e.g., an ear of a user) in contact with (or in proximity to) the touch sensitive surface 104.

The object classification component 112 can divide (e.g., subdivide) respective portions of the frame data 1502 into respective bounding areas 1504 (e.g., respective subdivisions) in the form of a pattern 1506 of bounding areas 1504. The bounding areas 1504 can be non-uniform in size, wherein the bounding areas 1504 of the pattern 1506 can be differently sized, and wherein there can be virtually any desired number of different sizes for the bounding areas 1504 in the pattern 1506. In this example frame image 1500, the pattern 1506 of bounding areas 1504 can include a first bounding area 1508 of a first size, a second bounding area 1510 of a second size, a third bounding area 1512 of a third size, and so on. The object classification component 112 can use the pattern 1506 of bounding areas 1504 to perform a subdivision analysis on the frame data 1502 to facilitate determining a contact classification or contact state with respect to the contact (or hovering) of an object with the touch sensitive surface 104, in accordance with various aspects and embodiments of the disclosed subject matter.

Figure 16:
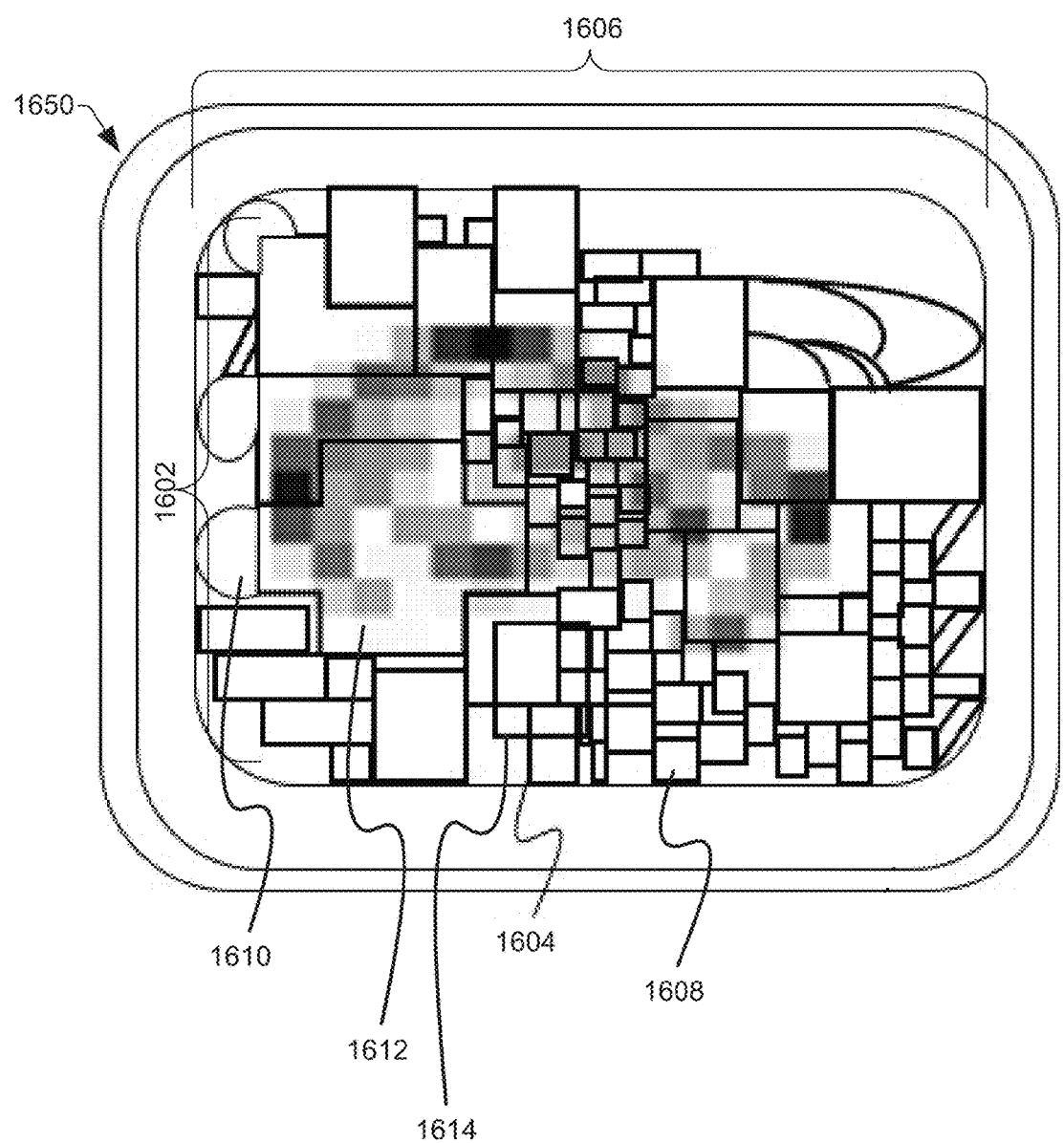
FIG. 16 illustrates a diagram of an example frame image as part of a visual representation of a top view of a touch sensitive device, wherein the example frame image can comprise or represent certain frame data subdivided among non-uniform variously shaped bounding areas, wherein the frame data relates to an example sensing of an object in contact with a touch sensitive surface, in accordance with various aspects and embodiments of the disclosed subject matter.

Turning briefly to FIG. 16 (along with FIGS. 11-13), FIG. 16 illustrates a diagram of an example frame image 1600 as part of a visual representation 1650 of a top view of the touch sensitive device 1100, wherein the example frame image 1600 can comprise or represent certain frame data subdivided among non-uniform variously shaped bounding areas, wherein the frame data relates to an example sensing of an object in contact with the touch sensitive surface 104, in accordance with various aspects and embodiments of the disclosed subject matter. For example, as shown in the example frame image 1600 of FIG. 16, the example frame image 1600 can comprise or represent certain frame data 1602, which, in this example, can depict an object (e.g., an ear of a user) in contact with (or in proximity to) the touch sensitive surface 104.

The object classification component 112 can divide (e.g., subdivide) respective portions of the frame data 1602 into respective bounding areas 1604 (e.g., respective subdivisions) in the form of a pattern 1606 of bounding areas 1604. The pattern 1606 of bounding areas 1604 can have respective bounding areas 1604 that can be shaped and size in any of a variety of configurations, in accordance with the defined classification criteria. For instance, the bounding areas 1604 can be non-uniform in size and shape, wherein the bounding areas 1604 of the pattern 1606 can be differently sized and/or differently shaped, and wherein there can be virtually any desired number of different sizes and/or different shapes for the bounding areas 1604 in the pattern 1606. As illustrated in the frame image 1600, the pattern 1606 of bounding areas 1604 can comprise, for example, a first bounding area 1608 having a first size and first shape, a second bounding area 1610 having a second size and a second shape, a third bounding area 1612 having a third size and a third shape, and so on. In some implementations, some bounding areas 1604 of the pattern 1606 of bounding areas 1604 can overlap other bounding areas 1604, as depicted at 1614. The object classification component 112 can use the pattern 1606 of bounding areas 1604 to perform a subdivision analysis on the frame data 1602 to facilitate determining a contact classification or contact state with respect to the contact (or hovering) of an object with the touch sensitive surface 104, in accordance with various aspects and embodiments of the disclosed subject matter.

Figure 17:
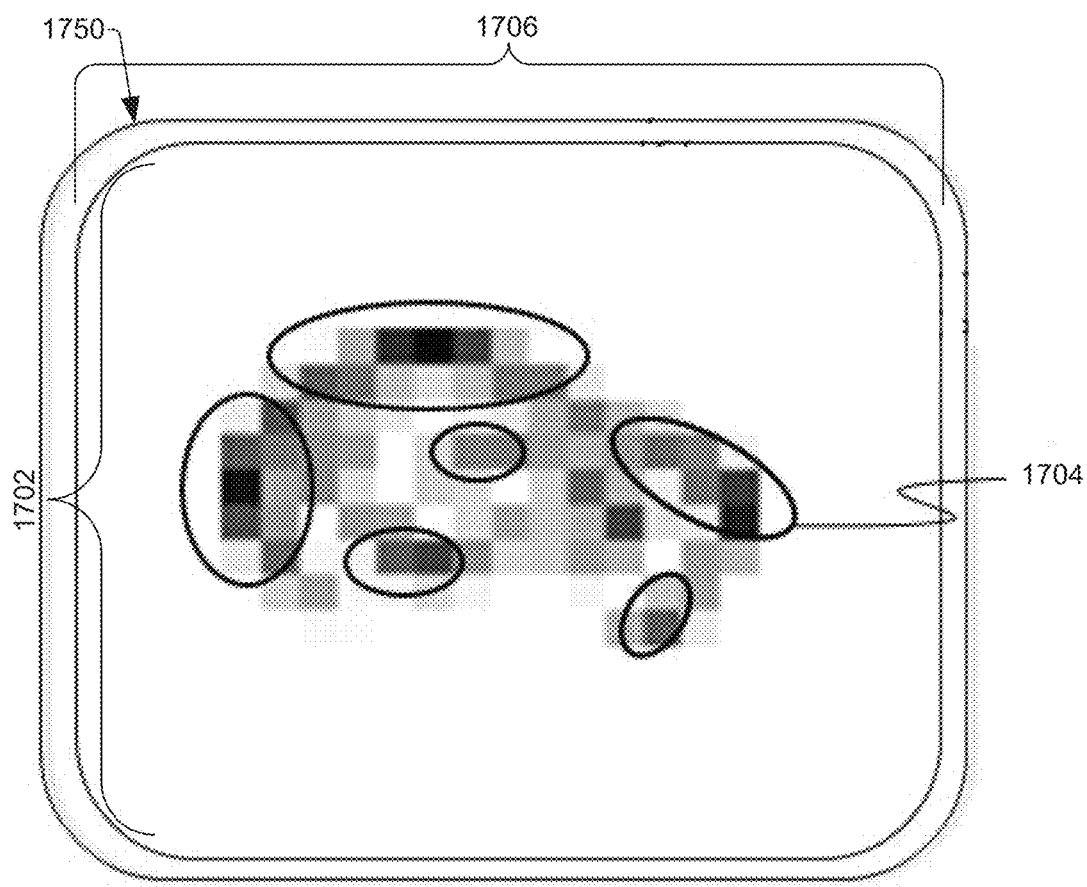
FIG. 17 depicts a diagram of an example frame image as part of a visual representation of a top view of an example touch sensitive device, wherein the example frame image can comprise or represent certain frame data associated with contact or association of an object with a touch sensitive surface, wherein the example frame image can be subdivided to form variously shaped bounding areas that can be determined based at least in part on the frame data, in accordance with various aspects and embodiments of the disclosed subject matter.

Referring briefly to FIG. 17 (along with FIGS. 11-13), FIG. 17 depicts a diagram of an example frame image 1700 as part of a visual representation 1750 of a top view of the example touch sensitive device 1100, wherein the example frame image 1700 can comprise or represent certain frame data associated with contact or association of an object with the touch sensitive surface 104, wherein the example frame image 1700 can be subdivided to form variously shaped bounding areas that can be determined based at least in part on the frame data, in accordance with various aspects and embodiments of the disclosed subject matter. The frame data can relate to an example sensing of an object in contact with the touch sensitive surface 104. For example, as illustrated in the example frame image 1700 of FIG. 17, the example frame image 1700 can comprise or represent certain frame data 1702, which, in this example, can depict an object (e.g., an ear of a user) in contact with (or in proximity to) the touch sensitive surface 104.

The object classification component 112 can divide (e.g., subdivide) respective portions of the frame data 1702 into respective bounding areas 1704 (e.g., respective subdivisions) in the form of a pattern 1706 of bounding areas 1704. The object classification component 112 can determine the bounding areas 1704 based at least in part on the frame data 1702 (e.g., the distribution of the frame data 1702 in the frame image 1700). For instance, the object classification component 112 can determine the number of bounding areas 1704 and the respective shapes of the respective bounding areas 1704 based at least in part on the distribution or concentration of the frame data 1702 in the frame image 1700, wherein the pattern 1706 can delineate different bounding areas 1704 around respective concentrated portions of contact (or hovering) with the touch sensitive surface 104. The object classification component 112 can use the pattern 1706 of bounding areas 1704 to perform a subdivision analysis on the frame data 1702 to facilitate determining a contact classification or contact state with respect to the contact (or hovering) of an object with the touch sensitive surface 104, in accordance with various aspects and embodiments of the disclosed subject matter.

It is to be appreciated and understood that derivatives of all the aforementioned boundary arrangements can be used (first and second order) by the object classification component 112. For instance, any desired combination of the respective types of subdivisioning of frame data can be employed by the object classification component 112. For example, with respect to frame data represented in an image, the object classification component 112 can determine some bounding areas for some portions of the image based at least in part on the frame data (e.g., the distribution or concentration of the frame data), and, with regard to other portions of the image, the object classification component 112 can determine other bounding areas (e.g., substantially uniform bounding areas; or variously shaped and/or sized bounding areas).

In some embodiments, the object classification component 112 can employ a predetermined pattern of bounding areas to subdivide the frame data to facilitate performing a subdivision analysis on the frame data. Alternatively, the object classification component 112 can dynamically determine a pattern of bounding areas to subdivide the frame data, based at least in part on a mode of operation of the touch sensitive device 1100, to facilitate performing a subdivision analysis on the frame data, in accordance with the defined classification criteria (e.g., classification criteria relating to subdivision analysis of frame data).

The object classification component 112 can perform the subdivision analysis on the frame data by analyzing the respective portions of frame data within the respective subdivisions defined by the bounding areas of the pattern of bounding areas to determine a potential contact type for each subdivision (at reference numeral 1304). This can be done, for example, by the object classification component 112 determining whether there is a pattern analysis of the frame data that is consistent with the subdivision analysis. The object classification component 112, as part of this pattern analysis, can use a desired pattern identification method or technique to identify or locate patterns of touch indicative of touch with certain objects, such as by identifying patterns within the subdivisions of the pattern of bounding areas. The object classification component 112 can determine a contact classification for the object in contact with, or in proximity to, the touch sensitive surface 104, in response to determining that a pattern analysis is consistent with the subdivision analysis. In some embodiments, the object classification component 112 can determine the contact classification based at least in part on touch intensity of the contact (e.g., touch) of the object with the touch sensitive surface 104. The object classification component 112 (or another component of the touch sensitive device 1100) can determine (e.g., compute) touch intensity of a contact of an object with the touch sensitive surface 104 in a variety of manners.

For example, the object classification component 112 (or another component of the touch sensitive device 1100) can determine a touch intensity of a contact of an object with the touch sensitive surface 104 based at least in part on one or more defined threshold values relating to touch intensity. For instance, if the object classification component 112 determines that the touch intensity of the contact is above a defined threshold value, the object classification component 112 can determine that the touch (e.g., contact) has a high intensity. If, however, the object classification component 112 determines that the touch intensity of the contact is below the defined threshold value, the object classification component 112 can determine that the touch (e.g., contact) has a low intensity.

In some embodiments, the object classification component 112 can employ more than one defined threshold value, wherein, for example, the object classification component 112 can determine whether the touch intensity of a contact of an object with the touch sensitive surface 104 is above a first defined threshold value relating to a high touch intensity, is below a second defined threshold value relating to a low touch intensity, or is between (or at one of) the first defined threshold value and the second defined threshold value. The object classification component 112 can determine that a touch intensity above the first defined threshold value is a high intensity, a touch intensity below the second defined threshold value is a low intensity, and a touch intensity between (or at one of) the first defined threshold value and the second defined threshold value is a medium intensity.

Alternatively, the object classification component 112 can determine a touch intensity of a contact of an object with the touch sensitive surface 104 as a continuous numerical value, for example, between 0.0 and 100.0. In such case, the object classification component 112 can determine the number of types of the touch intensities of contact according to a number of criteria (e.g., defined classification criteria relating to touch intensity) to distinguish the magnitude of the amplitude intensity of a contact of an object with the touch sensitive surface 104.

Since the touch intensity potentially can change radically depending on the object 1108 that has applied the touch to the touch sensitive surface 104, it can be advantageous for the object classification component 112 to determine, and the object classification component 112 can determine, an object type criteria in order to facilitate distinguishing the magnitude of the amplitude of the digital sound/vibration signal with respect to the individual types of objects (e.g., 1108) and facilitate determining a contact classification of an object with respect to the touch sensitive surface 104. The object classification component 112 can make such determination of the object type criteria in any of a variety of ways. For example, such discrimination can be performed (e.g., by the object classification component 112) at least in part by using vibro-acoustic data such as is described in a commonly assigned and co-pending U.S. patent application Ser. No. 14/612,089, entitled "Method and Apparatus for Classifying Touch Events on a Touch Sensitive Surface," filed on Feb. 2, 2015, and incorporated by reference herein in its entirety. U.S. patent application Ser. No. 14/612,089 in part describes an apparatus for classifying touch events having a touch sensitive surface configured to generate a touch event when an object or finger touches the touch sensitive surface, wherein the touch event entails a mechanical vibration generated upon contact with the surface, a touch detector configured to detect the onset of a touch, and a touch event classifier configured to classify the touch event to identify the object used for the touch event. The object classification component 112 can employ such techniques to facilitate determining the object type criteria for an object and facilitate determining a contact classification of an object with respect to the touch sensitive surface 104.

Additionally, such a determination of the object type criteria also can be performed (e.g., by the object classification component 112) at least in part using the techniques described in commonly assigned and co-pending "Capture of Vibro-Acoustic Data used to Determine Touch Types," U.S. patent application Ser. No. 13/958,427, filed on Aug. 2, 2013 and incorporated herein by reference in its entirety. U.S. patent application Ser. No. 13/958,427 describes in part a method for interaction between a user and an electronic device having a touch sensitive surface. In this method, a touch event trigger can be received that can indicate an occurrence of a physical touch event on the touch-sensitive surface. Touch data produced by the touch event can be accessed and vibro-acoustic data for a vibro-acoustic signal produced by the physical touch event can be accessed for a time window that begins at a time that is prior to receipt of the touch event trigger, and a touch type for the touch event can be determined based on the touch data and the vibro-acoustic data. The object classification component 112 can employ such method and techniques to facilitate determining the object type criteria for an object and facilitate determining a contact classification of an object with respect to the touch sensitive surface 104.

In some embodiments, such a determination of the object type criteria can be performed (e.g., by the object classification component 112) at least in part using the techniques described in commonly assigned and co-pending U.S. patent application Ser. No. 14/219,919, entitled "Method and Device for Sensing Touch Inputs", filed on Mar. 19, 2014 and incorporated herein by reference in its entirety. U.S. patent application Ser. No. 14/219,919 describes, in part, a method for sensing touch inputs to digital equipment in which a sound/vibration signal that is generated by a touch can be sensed, and the sensed sound/vibration signal can be digitally processed. Here, the type of touch means as well as a touch intensity of such touch can be determined based on features derived from time and frequency domain representations of the processed sound/vibration signal. The object classification component 112 can employ such method and techniques to facilitate determining the object type criteria for an object and facilitate determining a contact classification of an object with respect to the touch sensitive surface 104.

In certain embodiments, the object classification component 112 can determine touch intensity of contact of an object with the touch sensitive surface 104 based at least in part on vibro-acoustic differences between contact made by the object with the touch sensitive surface 104 when different parts of an input tool contact the touch sensitive surface 104. One example of such techniques for determining touch intensity of contact of an object with a touch sensitive surface can be found in commonly assigned and co-pending U.S. patent application Ser. No. 13/780,494, entitled "Input Tools Having Vibro-Acoustically Distinct Regions and Computing Device For Use With Same," filed on Feb. 28, 2013, and incorporated herein by reference in its entirety. U.S. patent application Ser. No. 13/780,494 describes in part an input tool for interacting with a touch screen, the input tool comprising: a body in the form of a stylus, the body having one or more vibro-acoustically distinct regions, wherein each vibro-acoustically region can produce a discrete vibro-acoustic signal when it touches a surface of the touch screen, and the vibro-acoustic signal can be used to detect what region of the input tool was used. Such vibro-acoustic signals also can be used (e.g., by the object classification component 112) to discriminate between different types of finger contacts, such as contact with the knuckle, fingernail, and/or fingertip, as is described in commonly assigned and co-pending U.S. patent application Ser. No. 13/849,698, entitled "Method and System For Activating Different Interactive Functions Using Different Types of Finger Contact," filed on Mar. 25, 2013, and incorporated by reference in its entirety.

Finger touch type determinations (e.g., by the object classification component 112) with respect to the touch sensitive surface 104 can, for example, result in execution (e.g., by the object classification component 112, event determination component 114, and/or processor 1110) of a first action for a first finger touch type and/or a second action for a second finger touch type. For example, U.S. patent application Ser. No. 13/887,711, entitled "Using Finger Touch Types to Interact with Electronic Devices," filed on May 6, 2013, and incorporated by reference in its entirety describes such an application with respect to respective actions being performed for respective finger touch type determinations.

The object classification component 112 also can perform touch intensity analysis with regard to an object in contact with or in proximity to the touch sensitive surface 104 based at least in part on capacitive data obtained from one or more sensors of or associated with the touch sensitive surface 104. For example, the commonly assigned and co-pending U.S. patent application Ser. No. 14/191,329, entitled "Using Capacitive Images for Touch Type Classification," filed on Feb. 26, 2014, describes in part a method of interaction between a user and an electronic device having a touch sensitive surface. In one aspect of this, a capacitive image can be accessed, wherein the capacitive image can comprise capacitive image data that can correspond to respective capacitances at respective locations on the touch sensitive surface, wherein the respective capacitances can vary in response to a physical touch by an object on the touch-sensitive surface. The capacitive image data can be processed and a touch type can be determined for the physical touch based at least in part on the processed capacitive image data. It also can be useful to, where possible or appropriate to do so, have the object classification component 112 maintain heuristic data regarding such objects.

Sensors (e.g., surface-related sensors 108) of the sensor component 106 and/or the object classification component 112 can generate or determine touch intensity data relating to the intensity of the touching of an object 1108 with the touch sensitive surface 104 based at least in part the touch intensity between the object 1108 and the touch sensitive surface 104, which in turn can be determined, for example, based at least in part on the capacitance, resistance, or shear force measurements obtained (e.g. by the sensors of the sensor component 106) in connection with the contact of the object 1108 with the touch sensitive surface 104. Additionally or alternatively, sensors (e.g., surface-related sensors 108) of the sensor component 106 and/or the object classification component 112 can generate or determine touch intensity data based at least in part sensed variations in an amount of force applied against the touch sensitive surface 104, which can be sensed (e.g., by the sensors) in the various ways described herein and/or any other techniques for sensing force applied against a surface.

In some implementations, the object classification component 112 can transmit object characterization information (e.g., to the event determination component 114, processor 1110, or another component), wherein the object characterization information can relate to characteristics of the object 1108, including the relationship (e.g., contact or hovering) between the object 1108 and the touch sensitive surface 104. Furthermore, the object classification component 112 can transmit touch intensity data that can characterize an amount of force or other touch intensity information that can characterize the intensity of a touch applied by or through an object 1108 during contact with the touch sensitive surface 104. This can be done in one embodiment by providing touch intensity data that corresponds to each element of touch intensity data or by sampling, mathematically processing or otherwise processing force to characterize the amount of force or applied during the period in which frame data is obtained.

The analysis of frame data performed in each subdivision (e.g., by the object classification component 112) in connection with determining a contact classification for an object 1108 with the touch sensitive surface 104 can take a variety of forms including:

average (e.g., determining an average amount of force applied by an object 1108 to the touch sensitive surface 104 during the time period, based at least in part on the results of analyzing the frame data);

standard deviation (e.g., determining a standard deviation associated with the amounts of force applied by an object 1108 to the touch sensitive surface 104 during the time period, based at least in part on the results of analyzing the frame data);

standard deviation (normalized by overall amplitude) (e.g., determining a standard deviation that can be normalized by overall amplitude, based at least in part on the results of analyzing the frame data);

variance (e.g., determining a variance of the amounts of force applied by an object 1108 to the touch sensitive surface 104 during the time period, based at least in part on the results of analyzing the frame data);

skewness kurtosis sum (e.g., determining a skewness kurtosis sum relating to an amount of force or touch intensity applied by an object 1108 to the touch sensitive surface 104 during the time period, based at least in part on the results of analyzing the frame data);

absolute sum (e.g., determining an absolute sum of an amount of force or touch intensity applied by an object 1108 to the touch sensitive surface 104 during the time period, based at least in part on the results of analyzing the frame data);

root mean square (RMS) (e.g., determining an RMS value relating to an amount of force or touch intensity applied by an object 1108 to the touch sensitive surface 104 during the time period, based at least in part on the results of analyzing the frame data);

crest factor (e.g., determining a crest factor with respect to an amount of force or touch intensity applied by an object 1108 to the touch sensitive surface 104 during the time period, based at least in part on the results of analyzing the frame data);

dispersion entropy power sum (e.g., determining a dispersion entropy power sum with respect to an amount of force or touch intensity applied by an object 1108 to the touch sensitive surface 104 during the time period, based at least in part on the results of analyzing the frame data);

centroid (center of mass) (e.g., determining a centroid with respect to an amount of force or touch intensity applied by an object 1108 to the touch sensitive surface 104 during the time period, based at least in part on the results of analyzing the frame data);

coefficient of variation zero-crossings (e.g., determining a coefficient of variation zero-crossings with respect to an amount of force or touch intensity applied by an object 1108 to the touch sensitive surface 104 during the time period, based at least in part on the results of analyzing the frame data); and/or template match scores for a set of known exemplar signals (e.g., determining template match scores for a set of known exemplar signals in connection with an amount of force or touch intensity applied by an object 1108 to the touch sensitive surface 104 during the time period, based at least in part on the results of analyzing the frame data) using the following methods:

convolution, inverse filter matching technique, sum-squared difference (SSD), and/or elastic matching.

In some embodiments, the touch sensing system 102, alone or in combination with other components (e.g., sensors, object classification component 112, processor 1110, . . . ) of the touch sensitive device 1100, can generate additional data that can be of use in determining contact classifications or contact states with regard to objects and the touch sensitive surface 104, wherein such additional data can include but is not limited to:

a location of touch contact of the object 1108 with the touch sensitive surface 104 (two-dimensional (2D), or three-dimensional (3D) in the case of curved glass or other non-planar geometry), a size of touch contact of the object 1108 with the touch sensitive surface 104 (some touch technologies of the disclosed subject matter can provide an ellipse of the touch contact with major and minor axes), a rotation of the touch contact of the object 1108 with the touch sensitive surface 104, a shape of touch of the touch contact of the object 1108 with the touch sensitive surface 104 (some touch technologies of the disclosed subject matter can provide the actual shape of the touch, and not just a circle or ellipse), a surface area (e.g., in squared mm or pixels) of the touch contact of the object 1108 with the touch sensitive surface 104, a pressure of the touch of the object 1108 with the touch sensitive surface 104 (which can be available on and determined using the touch sensing system 102), a shear of touch (which can be available on and determined using the touch sensing system 102), ("shear stress (which also can be called "tangential force") can arise from a force vector perpendicular to the surface normal of a touchscreen (e.g., parallel to the touch sensitive surface). This can be similar to normal stress—what is commonly called pressure—which can arise from a force vector parallel to the surface normal."), a number of touch contacts of the object 1108 with the touch sensitive surface 104, a capacitance of a touch of the object 1108 with the touch sensitive surface 104 (if using a capacitive touch screen), a swept frequency capacitance of touch of the object 1108 with the touch sensitive surface 104 (if using a swept frequency capacitive touch screen), and/or a swept frequency impedance of touch of the object 1108 with the touch sensitive surface 104 (if using a swept frequency capacitive touch screen).

In some embodiments, the object classification component 112 can determine or define a pattern of bounding areas in the frame data by transforming the bounding areas into a frequency domain representation (e.g., using a Fast Fourier Transform (FFT) or a similar function). For example, with respect to frame data relating to contact or association (e.g., hovering) of an object 1108 with the touch sensitive surface 104, the object classification component 112 and/or another component (e.g., processor 1110) can extract the following features from the frequency domain representation of the bounding areas:

spectral centroid, spectral density, spherical harmonics, total average spectral energy, and/or log spectral band ratios.

To facilitate determining contact classifications or contact states with respect to a contact or association of an object 1108 with the touch sensitive surface 104, the object classification component 112 can use any number of approaches, including, but not limited to, basic heuristics, decision trees, a Support Vector Machine, Random Forest, Naive Bayes, elastic matching, dynamic time warping, template matching, k-means clustering, K-nearest neighbors algorithm, neural network, Multilayer perceptron, multinomial logistic regression, gaussian mixture models, and/or AdaBoost.

In some embodiments, the object classification component 112 can combine results obtained from performing several different classifying techniques through, for example, a voting scheme or through analysis of a pattern from which it can be determined what portions of the touch sensitive surface 104 were in contact with, or in proximity to, an object 1108 during a time period.

Based at least in part on the results of the analysis of the pertinent data associated with the frame data, the object classification component 112 can determine whether the pattern analysis classification is consistent with the results of the subdivision analysis (at reference numeral 1306). If, at reference numeral 1306, it is determined that the pattern analysis classification is not consistent with the results of the subdivision analysis, a subsequent frame can be received and analyzed (the method 1300 can return to reference numeral 1302, and can proceed from there to reference numeral 1304, and thereafter, in accordance with the method 1300). For instance, the object classification component 112 can obtain and analyze a subsequent frame, comprising subsequent frame data, to facilitate determining a contact classification with respect to an object, as more fully described herein.

If, however, at reference numeral 1306, the object classification component 112 determines that the pattern analysis classification is consistent with the results of the subdivision analysis, the frame contact can be determined to be consistent with the pattern analysis or other classification, and any further analysis (if any), such as a refined analyses of the frame data, which may or may not be performed once it is determined that the object 1108 is in contact with or in proximity to the touch sensitive surface 104, can be determined.

Once that a classification has been determined for the object 1108 in contact with touch sensitive device 1100, an event may be determined (e.g., by the event determination component 114) based at least in part on the classification. In order to reduce the chance or risk of false positive mode changes (e.g., switching to ear use), a number of strategies can be followed, with two exemplary strategies being described herein. The embodiments of FIG. 13 illustrate the first of these two exemplary strategies.

In such embodiments, the object classification component 112 or the event determination component 114 can use frame data from more than one time period to assist in the classification. For instance, at reference numeral 1308, a contact classification (e.g., a frame contact classification) can be compared with previous contact classification determinations to determine a current contact state of an object 1108 with respect to the touch sensitive surface 104. In accordance with reference numeral 1308 of the method 1300, the object classification component 112 or the event determination component 114 can compare a contact classification with previous contact classification determinations to determine a current contact state of an object 1108 with respect to the touch sensitive surface 104.

For example, the touch sensitive surface 104 (e.g., sensors of or associated with the touch sensitive surface 104) can capture the touch image and/or frame data at a particular frame rate (e.g., 30 frames per second or another desired frame rate). The object classification component 112 or event determination component 114 can individually analyze the respective frame data captured during these respective frames and determine respective classifications (e.g., "ear (or head) touching" or "no contact") of the respective frames based at least in part on the respective frame data. Although any contact or association (e.g., hover) in any given frame data potentially may have a lower classification confidence level, a more robust (e.g., a more confident) classification result typically can be achieved by using a small voting window. For example, if the last 10 touch screen frames had the following classification result—"ear (or head), ear (or head), no contact, ear (or head), no contact, ear (or head), ear (or head), ear (or head), ear (or head), no contact"—the result would be an "ear (or head)" classification (6 out of the last 10 classification results). Similarly, there can be predetermined patterns classification changes over time for a contact that can be identified (e.g., by the object classification component 112 or event determination component 114) and used for contact classification purposes (e.g., by the object classification component 112 or event determination component 114). For example, it can be expected that there will be a rate of "no contact" determinations during an ear (or head) contact. For example, if it is expected that three out of ten classifications of contacts or associations (e.g., hover) during a period where an ear is held against the touch sensitive surface 104 (e.g., touch screen) will show no contacts or if it is expected that at least one out of five frames will show no contacts, the reliability of an ear (or head) contact classification in the above example can be enhanced by the presence of the "no contact" determinations.

The contact classification determination made can be termed a current contact state, and, at reference numeral 1310 of the method 1300, an event can be determined, based at least in part on the current contact state associated with the touch sensitive surface 104. For instance, the event determination component 114 can utilize the current contact state relating to contact (or no contact) or association (e.g., hovering) of an object 1108 with respect to the touch sensitive surface 104 (and/or associated display screen 1104) to determine an event, based at least in part on the current contact state associated with the touch sensitive surface 104. The event can be an action (e.g., a response action) that can be performed by the event determination component 114, the processor 1110, the touch sensitive surface 104, the touch sensing system 102, the display screen 1104, the display system 1102, or another component of the touch sensitive device 1100, as appropriate. The event can comprise, for example, enabling a touch function(s) of the touch sensitive surface 104 (or associated display screen 1104), disabling a touch function(s) of the touch sensitive surface 104 (or associated display screen 1104), turning the display screen 1104, or a portion of the display screen 1104, on, or turning the display screen 1104, or a portion of the display screen 1104, off.

In certain embodiments, the object classification component 112 (and/or the event determination component 114) can determine and produce a classification confidence in a contact classification determined by the object classification component 112 (and/or the event determination component 114). To yield more robust behavior, the mode (e.g., function mode of touch functions of the touch sensitive surface 104, display mode or power mode of the display screen 1104) of the touch sensitive device 1100 can switch (e.g., will only switch) in response to the object classification component 112 or the event determination component 114 determining that a contact classification(s) has a high confidence level that satisfies a defined threshold confidence (e.g., high confidence threshold) level relating to confidence in the contact classification. If it is determined (e.g., by the object classification component 112 or the event determination component 114) that the contact classification(s) being produced has a low confidence level that does not satisfy (e.g., is below) the defined threshold (e.g., high confidence threshold) classification level and/or is below a specified low confidence threshold level, the event determination component 114 can maintain the touch sensitive device 1100 in its current mode (e.g., can maintain the touch sensitive surface 104 and/or display screen 1104 in their respective current modes). At reference numeral 1312, the method 1300 can terminate, or the method 1300 can continue by proceeding to reference numeral 1302 to receive further frame data and proceed from that point.

In certain embodiments, to facilitate avoiding "flickering" between two or more modes of the touch sensitive device 1100 (e.g., rapidly and undesirably switching between operation modes of the touch sensitive surface 104 and/or the display screen 1104), the event determination component 114 can utilize a hysteresis function that can facilitate controlling switching between operation modes of the touch sensitive surface 104 and/or the display screen 1104.

Figure 18:
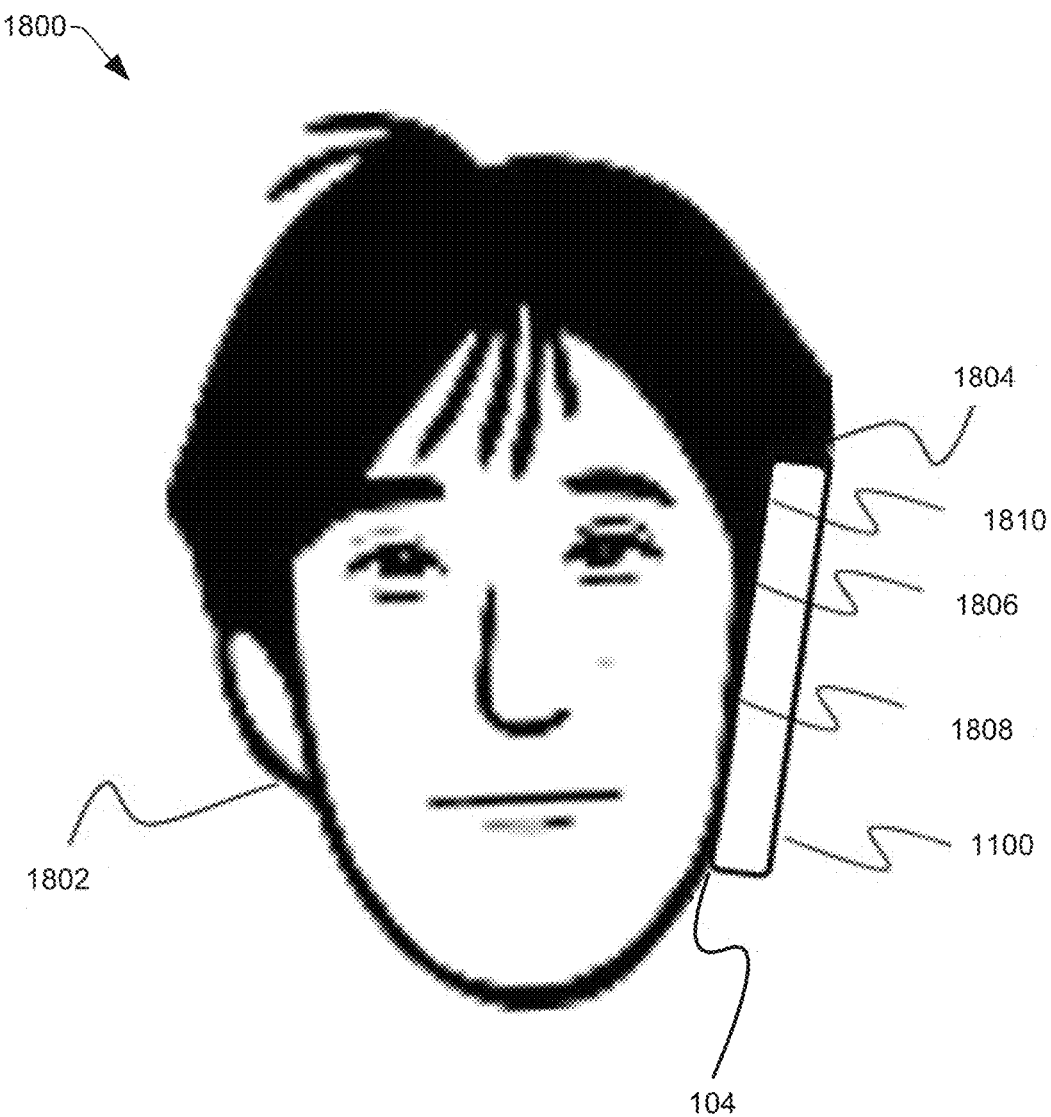
FIG. 18 illustrates a diagram of an example scenario of a user having a touch sensitive device against the side of the user's head.

It will be appreciated that there can be a variety of different contact classifications and that more than one contact classification may be found in received frame data. Consider, for example, the scenario illustrated in FIGS. 18 and 19. FIG. 18 illustrates a diagram of an example scenario 1800 of a user having a touch sensitive device 1100 against the side of the user's head. As is shown in the image of the example scenario 1800 of FIG. 18, it is not uncommon for a user 1802 to hold a touch sensitive device 1100 (e.g., a cellular phone) against the user's head 1804, such that contact between the touch sensitive surface 104 and the head 1804 can exist in more than one place. As shown in the image of the example scenario 1800, there can be several different contacts between head 1804 and the touch sensitive surface 104, including an ear contact 1806, a cheek contact 1808, and possibly a hair and/or head contact 1810.

Figure 19:
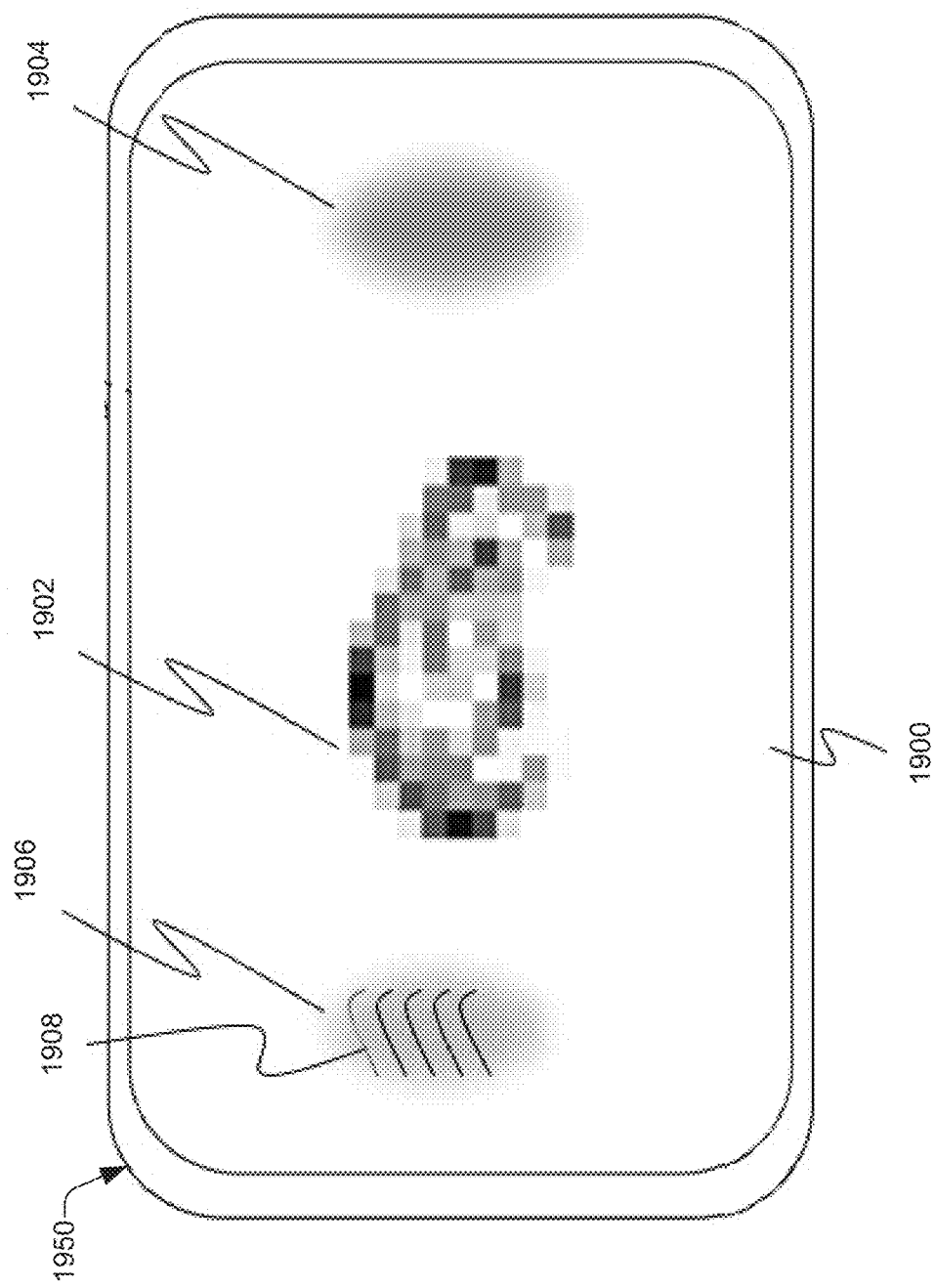
FIG. 19 illustrates a diagram of an example frame image as part of a visual representation of a top view of a touch sensitive device, wherein the example frame image can comprise or represent frame data that can be determined during a time period when frame data for a frame is acquired by a touch sensing system and an object classification component, in accordance with various aspects and embodiments of the disclosed subject matter.

FIG. 19 illustrates a diagram of an example frame image 1900 as part of a visual representation 1950 of a top view of the touch sensitive device 1100, wherein the example frame image 1900 can comprise or represent frame data that can be determined during a time period when frame data for a frame is acquired by the touch sensing system 102 and object classification component 112, in accordance with various aspects and embodiments of the disclosed subject matter. With regard to the frame image 1900 of FIG. 19, the ear contact 1806 of FIG. 18 can yield a contact pattern 1902 that can correspond to the ear contact 1806, the cheek contact 1808 can provide a relatively uniform contact pattern 1904 that can have an ovular shape and can correspond to the cheek contact 1808, and the hair or head contact 1810 can yield a contact pattern 1906 that can have some uniformity, but potentially can be influenced by the presence of elongate striations 1908 due to contact with hair of the user.

It will be appreciated that each of contact patterns 1902, 1904, and 1906 can provide a signature that viewed collectively or individually can be capable of being classified (e.g., by the object classification component 112) or that can be capable of being used (e.g., by the object classification component 112) to corroborate a classification.

It is to be appreciated and understood that there can be many different variations of this. For example, a user may wear glasses that wrap around the rear of the ear and therefore are supported by the ear in ways that potentially can adjust the contact pattern sensed by the sensors (e.g., surface-related sensors 108) of or associated with the touch sensitive surface 104 when the touch sensitive device 1100 (e.g., phone) is held up against an ear of the user. Similarly, the user may wear headgear that at least potentially can be sensed (e.g., by the surface-related sensors 108) or piercings and/or jewelry that can be sensed (e.g., by the surface-related sensors 108) and can create particular contact patterns with the touch sensitive surface 104, wherein such contact can be, or at least potentially can be, particularly useful in determining (e.g., by the object classification component 112) when a head of a user is held against the touch sensitive surface 104 of the touch sensitive device 1100.

Figure 20:
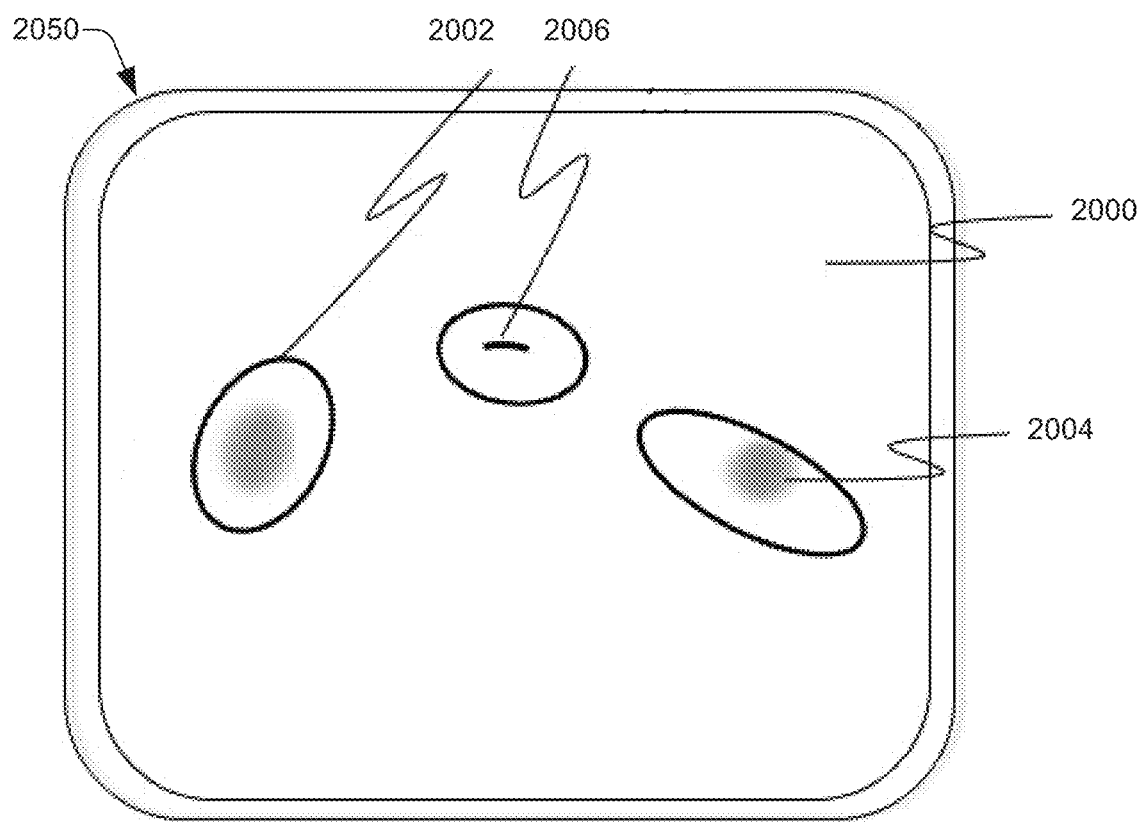
FIG. 20 presents a diagram of an example frame image as part of a visual representation of a top view of a touch sensitive device, wherein the example frame image can comprise or represent example frame data of an example contact of an object with a touch sensitive surface, in accordance with various aspects and embodiments of the disclosed subject matter.

FIG. 20 presents a diagram of an example frame image 2000 as part of a visual representation 2050 of a top view of the touch sensitive device 1100, wherein the example frame image 2000 can comprise or represent example frame data of an example contact of an object with the touch sensitive surface 104, in accordance with various aspects and embodiments of the disclosed subject matter. The example frame image 2000 can show another example further illustrating application of the techniques and principles described herein. FIG. 20 illustrates a frame image 2000 that can comprise or represent frame data having multiple contacts 2002, 2004, and 2006. In this example, the object classification component 112 can perform the contact classification process and determine the contact classification, as more fully described herein, with the frame data being classified, for example, by detecting patterns in the frame data of the frame image 2000. However, it is to be appreciated and understood that, in some instances, the pattern classification of the frame data of the frame image 2000 may not yield results that have a high confidence level. Accordingly, the object classification component 112 can apply the subdivision analysis (at reference numeral 1304 of the method 1300). In this example case, such subdivision analysis can enhance the determination of the contact classification, and can assist to make a higher confidence determination of the contact classification such as, for example, a determination (e.g., a higher confidence determination) as to whether contacts 2002 and/or 2004 are knuckle contacts or fingertip contacts associated with a finger(s) of the user, based at least in part on the subdivision analysis described herein. Similarly, a determination (e.g., a higher confidence determination) can be made (e.g., by the object classification component 112) as to whether the contact 2006 is a fingernail contact of a fingernail of the finger of the user, a stylus contact of a stylus, or another contact of another object, with the touch sensitive surface 104 based at least in part on the subdivision analyses described herein.

It is to be appreciated and understood from this disclosed subject matter that using the techniques described herein, touch sensitive devices can be provided with improved ability to interpret patterns of contact or association (e.g., hovering) of an object with respect to a touch sensitive surface.

It also is to be appreciated and understood that the ordering of and the number of method acts or operations can be changed within the spirit and scope of the disclosed subject matter.

Figure 21:
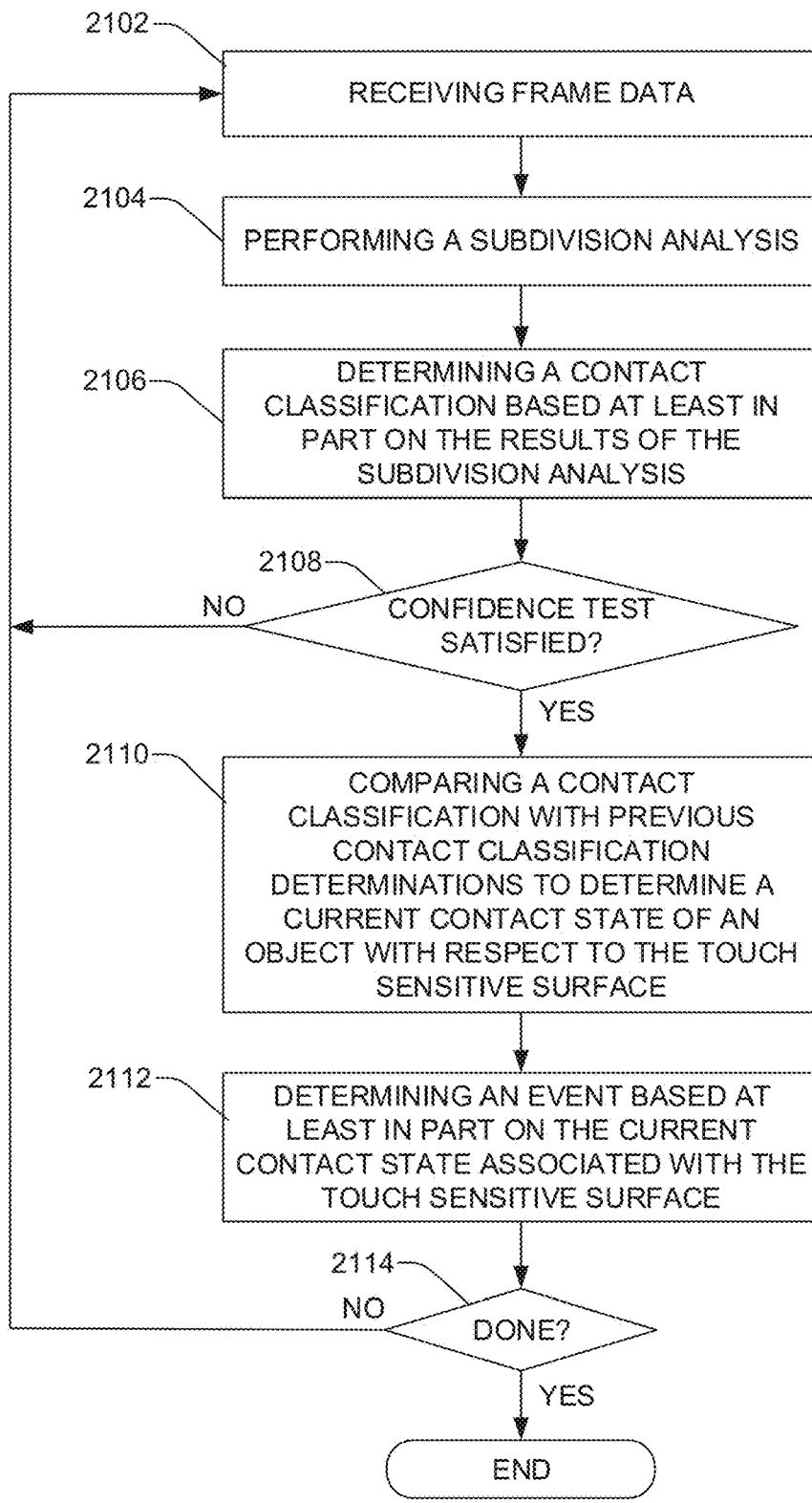
FIG. 21 illustrates a flow diagram of another example method for classifying contacts of objects with or in proximity to a touch sensitive surface of a touch sensitive device, in accordance with various aspects and embodiments of the disclosed subject matter.

FIG. 21 illustrates an example of this. FIG. 21 illustrates a flow diagram of another example method 2100 for classifying contacts of objects with or in proximity to the touch sensitive surface 104 of the touch sensitive device 1100, in accordance with various aspects and embodiments of the disclosed subject matter. At reference numeral 2102, frame data can be received. For instance, the object classification component 112 can receive or generate frame data, wherein the frame data can comprise or be generated based at least in part on sensor data (e.g., touch surface data or other sensor data) generated from sensing the touch sensitive surface 104.

At reference numeral 2104, a subdivision analysis can be performed (e.g., executed) on the frame data. The object classification component 112 can perform the subdivision analysis on the frame data, wherein the object classification component 112 can divide a frame image comprising or representing the frame data into a pattern of bounding areas, wherein respective portions of the frame data are distributed among the respective bounding areas, as more fully described herein. The object classification component 112 can analyze the subdivisions and respectively associated portions of the frame data.

For instance, as is generally described herein, as part of the subdivision analysis, the object classification component 112 can determine (e.g., identify, or compute) a number of descriptive features for each subdivision. The object classification component 112 can determine these descriptive features, for example, by analysis of the respective portions of the frame data within the respective subdivisions. Examples of the analyses can include the analyses described herein (e.g., with respect to the method 1300) and can, for example, include determining (e.g., by the object classification component 112) high intensities, such as a maximum intensity, or low intensities within a subdivision, a size or shape of the areas of intensities within a subdivision, a standard deviation of intensities within a subdivision, or any other information that can be determined based at least in part the results of analyzing the portion of frame data within a subdivision. Additionally, the object classification component 112 can determine and use characteristics of one or more subdivisions adjacent to or otherwise proximate to a subdivision being analyzed to determine (e.g., compute) descriptive features for that subdivision.

At reference numeral 2106, a contact classification regarding contact or association of an object with the touch sensitive surface 104 can be determined based at least in part on the results of the subdivision analysis. The object classification component 112 can determine one or more the contact classification regarding the contact or association of the object with the touch sensitive surface 104 based at least in part on the results of the subdivision analysis. For instance, the object classification component 112 can determine the contact classification based at least in part on the respective descriptive features determined for the respective subdivisions associated with the frame data. For example, in some instances, based at least in part on the results of the subdivision analysis, the object classification subdivision analysis can identify descriptive features for a particular subdivision that can indicate that the particular subdivision of the frame data appears to represent an ear lobe of an ear of the user.

As part of the contact classification determination, the object classification component 112 can determine whether that particular subdivision is located at or proximate to a bottom of one or more subdivisions that form a larger contact area that may appear to be part of a mid-portion of an ear of the user, when the ear is in contact with the touch sensitive surface 104. If the object classification component 112 determines that the particular subdivision is at or proximate to the bottom of one or more subdivisions that form a larger contact (or association) area that appears to be part of the mid-portion of the ear of the user, the object classification component 112 can determine that the particular subdivision is associated with the ear lobe of the user and/or can determine the contact classification for the contact or association (e.g., hover) of the object with the touch sensitive surface 104 to be an ear or head contact or association. In contrast, if the particular subdivision appears to be an ear lobe, but further appears to be in the middle of a contact area, as part of the contact classification determination, the object classification component 112 can or may determine that such contact or association with respect to that particular subdivision is not representative of the ear of the user.

It will be understood from above that in either of the embodiments illustrated in FIG. 13 or in FIG. 21, the methods 1300 and 2100, and the object classification component 112, can utilize any or all of the descriptive features determined for a subdivision of the frame data, the location of the subdivision, and the shape of the subdivision, as well as frame data and descriptive features associated with subdivisions that are adjacent to or proximate to the subdivision being analyzed in order to improve any or all of the reliability, speed, and/or efficiency of the process.

In some embodiments, at reference numeral 2108, the contact classification can be (e.g., optionally can be) subject to confidence testing to determine whether there is adequate confidence in the contact classification determination. The object classification component 112 can evaluate the contact classification by performing confidence testing of the contact classification to determine whether there is sufficient confidence in the contact classification, in accordance with the defined classification criteria. For instance, the object classification component 112 can determine and produce a classification confidence level for the contact classification and can determine whether that classification confidence level satisfies the defined classification criteria (e.g., satisfies a defined threshold confidence level).

In certain embodiments, to yield more robust and desirable behavior, the event determination component 114, the processor 1110, or other component(s) of the touch sensitive device 1100 can control switching of a mode(s) of operation of the touch sensitive device 1100 (e.g., a mode(s) of the touch sensitive surface 104 and/or a mode(s) of the display screen 1104) such that a mode(s) of the touch sensitive device 100 can be (e.g., only will be) switched (e.g., from one mode to another mode) when it is determined (e.g., by the object classification component 112 or other component) that the confidence level of the contact classification satisfies a defined threshold confidence level (e.g., defined threshold high confidence level) to indicate that the confidence level in the contact classification is sufficiently high.

In some embodiments, the object classification component 112 (or event determination component 114) can determine or evaluate (e.g., optionally can determine or evaluate) a confidence level of a particular contact classification by comparing the particular contact classification to one or more alternate contact classifications determined by the object classification component 112. The object classification component 112 can determine such alternate classifications in any of a number of ways and using any of a number of alternative contact classification methods or techniques, such as, for example, contact classification using pattern analysis, as described herein, or a next best classification that can be determined using the descriptive features determined from the subdivisions during subdivision analysis.

It is to be appreciated and understood that, in instances where this is done, the object classification component 112, the consistency determining act of reference numeral 1306 of the method 1300 of FIG. 13, and/or the contact classification confidence determination of reference numeral 2108 of the method 2100 of FIG. 21 can make use of the combination of features that can be determined (e.g., by the object classification component 112) during subdivision analysis of frame data as well as location information associated with the subdivisions. Furthermore, the object classification component 112 can utilize shape information regarding the shape of any subdivision of the subdivisions in connection with the subdivision analysis to facilitate determining the contact classification. Further, in some embodiments, the object classification component 112 can determine a confidence level for a contact classification with respect to frame data, in part, by determining (e.g., calculating) a confidence metric for use in connection with a contact classification determination, and determining a confidence level for the contact classification based at least in part on this confidence metric, in accordance with the defined classification criteria.

With further regard to the method 2100 of FIG. 21, at reference numeral 2110, a contact classification (e.g., a frame contact classification) can be compared with previous contact classification determinations to determine a current contact state of an object 1108 with respect to the touch sensitive surface 104. In accordance with reference numeral 2110 of the method 2100, the object classification component 112 or the event determination component 114 can compare a contact classification with previous contact classification determinations to determine a current contact state of an object 1108 with respect to the touch sensitive surface 104, as more fully described herein.

At reference numeral 2112, an event can be determined, based at least in part on the current contact state associated with the touch sensitive surface 104. For instance, the event determination component 114 can utilize the current contact state relating to contact (or no contact) or association (e.g., hovering) of an object 1108 with respect to the touch sensitive surface 104 (and/or associated display screen 1104) to determine an event, based at least in part on the current contact state associated with the touch sensitive surface 104. The event can be an action (e.g., a response action) that can be performed by the event determination component 114, the processor 1110, the touch sensitive surface 104, the touch sensing system 102, the display screen 1104, the display system 1102, or another component of the touch sensitive device 1100, as appropriate. Depending in part on the contact classification, the event can comprise, for example, enabling a touch function(s) of the touch sensitive surface 104 (or associated display screen 1104), disabling a touch function(s) of the touch sensitive surface 104 (or associated display screen 1104), turning the display screen 1104, or a portion of the display screen 1104, on, or turning the display screen 1104, or a portion of the display screen 1104, off.

At reference numeral 2114, the method 2100 can terminate, or the method 2100 can continue by proceeding to reference numeral 2102 to receive further frame data and proceed from that point.

Figure 22:
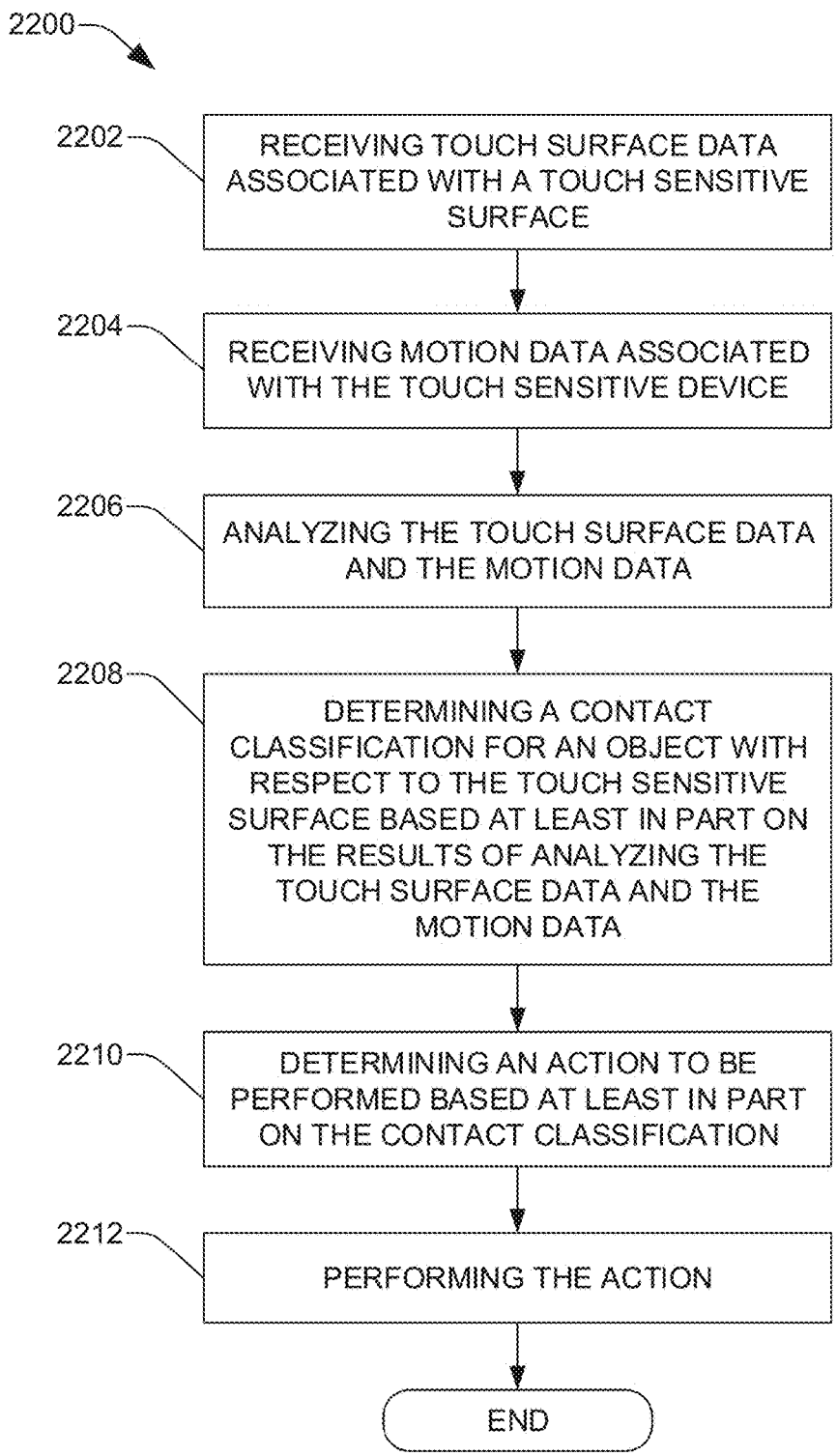
FIG. 22 depicts a flow diagram of an example method for classifying contacts of objects with or in proximity to a touch sensitive surface of a touch sensitive device based at least in part on touch surface data associated with the touch sensitive surface and motion data associated with the touch sensitive device, in accordance with various aspects and embodiments of the disclosed subject matter.

FIG. 22 depicts a flow diagram of an example method 2200 for classifying contacts of objects with or in proximity to a touch sensitive surface 104 of a touch sensitive device (e.g., 100, 1100) based at least in part on touch surface data associated with the touch sensitive surface 104 and motion data associated with the touch sensitive device, in accordance with various aspects and embodiments of the disclosed subject matter.

At reference numeral 2202, touch surface data associated with the touch sensitive surface 104 can be received. The object classification component 112 can receive the touch surface data (e.g., touch surface-related sensor data) from one or more surface-related sensors 108 of the sensor component 106, wherein the one or more surface-related sensors 108 can be associated with the touch sensitive surface 104. In some embodiments, the touch surface data can comprise capacitive data obtained from capacitive sensors of the sensor component 106.

At reference numeral 2204, motion data associated with the touch sensitive device can be received. The object classification component 112 can receive the motion data associated with the touch sensitive device from one or more motion-related sensors 110 of the sensor component 106, wherein the motion data can relate to motion of the touch sensitive device. The motion data can comprise respective portions of the motion data associated with one or more respective axes and/or one or more respective motion-related sensors 110. The motion-related sensors 110 can comprise an accelerometer (e.g., a three-axis accelerometer), a gyroscope (e.g., a three-axis gyroscope, and/or an IMU (e.g., a multi-axis IMU).

At reference numeral 2206, the touch surface data and the motion data can be analyzed. The object classification component 112 can analyze the touch surface data and the motion data to facilitate determining a contact classification with respect to an object (e.g., one or more object items) that can be in contact with or associated with (e.g., hovering in proximity to) the touch sensitive surface 104 of the touch sensitive device.

In some embodiments, the object classification component 112 can analyze the touch surface data separately from analyzing the motion data. For example, the object classification component 112 can analyze the touch surface data to facilitate determining an initial or preliminary contact classification for an object with respect to the touch sensitive surface 104. The object classification component 112 also can analyze (e.g., via a separate analysis) the motion data to facilitate determining another preliminary contact classification for an object with respect to the touch sensitive surface 104. Such other preliminary contact classification can be used by the object classification component 112 to facilitate determining whether the initial or preliminary contact classification is consistent with the other preliminary contact classification, determining or evaluating a confidence level in the accuracy of the initial or preliminary contact classification, and/or enhancing the accuracy of the contact classification for an object with respect to the touch sensitive surface 104.

In accordance with various implementations, as part of the analysis of the touch surface data, the object classification component 112 can generate frame data from the touch surface data, extract features from the frame data, generate a frame image based at least in part on the frame data, perform a subdivision analysis on the frame data or features extracted from the frame data, and/or perform a pattern analysis on a pattern determined based at least in part on the frame data or features (e.g., pattern features) extracted from the frame data, as more fully described herein, wherein the extracted features can be indicative of a type or classification of an object (e.g., one or more object items). In accordance with various other implementations, as part of the analysis of the motion data, the object classification component 112 can extract features from the motion data, perform an analysis on the extracted features, and/or perform a pattern analysis on a pattern determined based at least in part on the motion data or extracted features, as more fully described herein, wherein the extracted features can be indicative of a type or classification of an object (e.g., one or more object items) with respect to contact or association of the object with the touch sensitive surface 104. The features can comprise, for example, characteristics, shapes, dimensions, spectral centroid, spectral density, spherical harmonics, total average spectral energy, and/or log spectral band ratios related to the contact or association of the object(s) with the touch sensitive surface 104, with respect to the time domain or frequency domain, respectively.

In other embodiments, the object classification component 112 can analyze the touch surface data and the motion data in a combined analysis to facilitate determining the contact classification for an object with respect to the touch sensitive surface 104, determining a confidence level in the accuracy of the contact classification, and/or enhancing the accuracy of the contact classification for an object with respect to the touch sensitive surface 104.

At reference numeral 2208, a contact classification for an object with respect to the touch sensitive surface 104 can be determined based at least in part on the results of analyzing the touch surface data and the motion data, in accordance with the defined classification criteria. The object classification component 112 can determine the contact classification for the object with respect to the touch sensitive surface 104 based at least in part on the results of analyzing the touch surface data and the motion data, in accordance with the defined classification criteria, as more fully described herein.

The contact classification be one of a set of contact classifications that can comprise, for example, a no touch state, a head state, a finger state, a head-hovering state, and a finger-hovering state. The no touch state can indicate that an object is not in contact with and is not hovering in proximity to the touch sensitive surface 104. The head state can indicate that the object is a face, a head, and/or an ear of a user, and such object is in contact with the touch sensitive surface 104. The finger state can indicate that the object is a finger or a hand of the user, and that object is in contact with the touch sensitive surface 104. The head-hovering state can indicate that the object is the face, the head, and/or the ear of the user, and such object is hovering over and in proximity to the touch sensitive surface 104 and is not in contact with the touch sensitive surface 104. The finger-hovering state can indicate that the object is the finger or the hand of the user, and that object is hovering over and in proximity to the touch sensitive surface 104 and is not in contact with the touch sensitive surface 104.

At reference numeral 2210, an action to be performed can be determined based at least in part on the contact classification. The event determination component 114 can determine the action (e.g., an event or responsive action) that can be performed based at least in part on (e.g., in response to the determination of) the contact classification.

At reference numeral 2212, the action can be performed. The event determination component 114 can facilitate the performance of the action to facilitate enhanced (e.g., improved or optimal) control of operation of the touch sensitive surface 104, display screen 1104, or another component of the touch sensitive device. Depending in part on the particular action to be performed, the event determination component 114, the processor 1110, the touch sensitive surface 104, the touch sensing system 102, the display screen 1104, the display system 1102, and/or another component of the touch sensitive device can perform respective operations to perform the action. Depending in part on the contact classification, the action can comprise, for example, enabling a touch function(s) of the touch sensitive surface 104 (or associated display screen 1104), disabling a touch function(s) of the touch sensitive surface 104 (or associated display screen 1104), turning the display screen 1104, or a portion of the display screen 1104, on, or turning the display screen 1104, or a portion of the display screen 1104, off.

Figure 23:
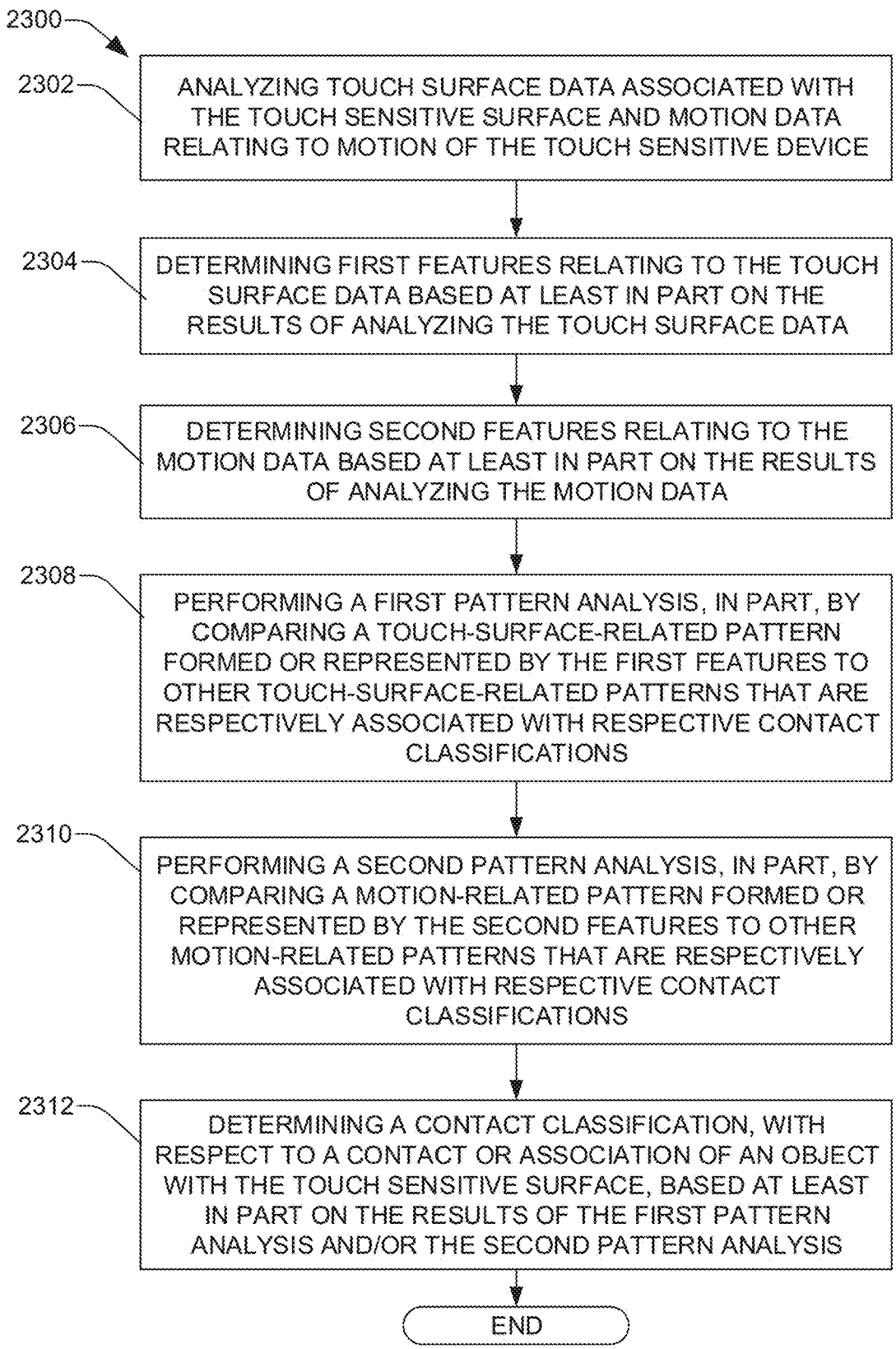
FIG. 23 illustrates a flow diagram of another example method for classifying contacts of objects with or in proximity to a touch sensitive surface of a touch sensitive device based at least in part on touch surface data associated with the touch sensitive surface and motion data associated with the touch sensitive device, in accordance with various aspects and embodiments of the disclosed subject matter.

FIG. 23 illustrates a flow diagram of another example method 2300 for classifying contacts of objects with or in proximity to a touch sensitive surface 104 of a touch sensitive device (e.g., 100, 1100) based at least in part on touch surface data associated with the touch sensitive surface 104 and motion data associated with the touch sensitive device, in accordance with various aspects and embodiments of the disclosed subject matter.

At reference numeral 2302, touch surface data associated with the touch sensitive surface 104 and motion data relating to motion of the touch sensitive device can be analyzed. The object classification component 112 can receive the touch surface data and the motion data from respective sensors of the sensor component 106, as more fully described herein. The object classification component 112 can analyze the touch surface data and the motion data to facilitate determining or extracting respective features from the touch surface data and the motion data, in connection with determining a contact classification with respect to a contact or association of an object with the touch sensitive surface 104.

At reference numeral 2304, first features relating to the touch surface data can be determined based at least in part on the results of analyzing the touch surface data. At reference numeral 2306, second features relating to the motion data can be determined based at least in part on the results of analyzing the motion data. The object classification component 112 can determine the first features and the second features based at least in part on the results of analyzing the touch surface data and the motion data.

The first features and second features can be utilized in respective pattern analyses to facilitate determining a contact classification with respect to an object (e.g., one or more object items) that can be in contact with or associated with (e.g., hovering in proximity to) the touch sensitive surface 104 of the touch sensitive device. The respective features can be indicative of a type or classification of an object (e.g., one or more object items) with respect to contact or association of the object with the touch sensitive surface 104. The respective features can comprise, for example, characteristics, shapes, dimensions, spectral centroid, spectral density, spherical harmonics, total average spectral energy, and/or log spectral band ratios related to the contact or association of the object(s) with the touch sensitive surface 104, with respect to the time domain or frequency domain, as applicable, respectively.

In some implementations, as part of the analysis of the touch surface data, the object classification component 112 can generate frame data from the touch surface data, generate a frame image based at least in part on the frame data, and/or perform a subdivision analysis on the frame data or features determined or extracted from the touch surface data or frame data, as more fully described herein. In accordance with various other implementations, as part of the analysis of the touch surface data and/or the motion data, the object classification component 112 can employ an FFT or a similar function to convert (e.g., transform) the touch surface data, the motion data, or other data (e.g., frame data) from a time domain representation of such data to a frequency domain representation of such data to facilitate efficient analysis of such data.

At reference numeral 2308, a first pattern analysis can be performed, in part, by comparing a touch-surface-related pattern formed or represented by the first features to other touch-surface-related patterns that are respectively associated with respective contact classifications. The object classification component 112 can employ one or more pattern recognition techniques to facilitate performing the first pattern analysis with respect to the touch-surface-related pattern. For instance, as part of the first pattern analysis, the object classification component 112 can compare the touch-surface-related pattern associated with the first features to other respective touch-surface-related patterns that can be associated with respective contact classifications to facilitate determining which pattern(s) of the other touch-surface-related patterns most closely or sufficiently closely matches the touch-surface-related pattern. Such first pattern analysis can facilitate determining the contact classification with respect to a contact or association of the object with the touch sensitive surface 104.

At reference numeral 2310, a second pattern analysis can be performed, in part, by comparing a motion-related pattern formed or represented by the second features to other motion-related patterns that are respectively associated with respective contact classifications. The object classification component 112 can employ one or more pattern recognition techniques to facilitate performing the second pattern analysis with respect to the motion-related pattern. For example, as part of the second pattern analysis, the object classification component 112 can compare the motion-related pattern associated with the second features to other respective motion-related patterns that can be associated with respective contact classifications to facilitate determining which pattern(s) of the other motion-related patterns most closely or sufficiently closely matches the motion-related pattern. Such second pattern analysis also can facilitate determining the contact classification with respect to the contact or association of the object with the touch sensitive surface 104.

At reference numeral 2312, a contact classification, with respect to a contact or association of an object with the touch sensitive surface 104, can be determined based at least in part on the results of the first pattern analysis and/or the second pattern analysis. The object classification component 112 can determine the contact classification with respect to the contact or association of the object with the touch sensitive surface 104 based at least in part on the results of the first pattern analysis and/or the second pattern analysis.

For example, if the result of the first pattern analysis indicates that the object is a finger of the user in contact with (or in proximity to) the touch sensitive surface 104, and the result of the second pattern analysis indicates that the object is the finger of the user in contact with (or in proximity to) the touch sensitive surface 104, the object classification component can determine that contact classification is a finger contact (or a finger-hover). As another example, if the result of the first pattern analysis indicates that the object is a head (e.g., ear) of the user in contact with (or in proximity to) the touch sensitive surface 104, and the result of the second pattern analysis indicates that the object is the head of the user in contact with (or in proximity to) the touch sensitive surface 104, the object classification component 112 can determine that contact classification is a head contact (or a head-hover).

As still another example, if the result of the first pattern analysis indicates a first type of contact or association of the object (e.g., head of the user) with respect to the touch sensitive surface 104, and the result of the second pattern analysis indicates a second type of contact or association of the object (e.g., finger of the user) with respect to the touch sensitive surface 104, the object classification component 112 can determine that a contact classification is not sufficiently clear, and can determine that further data analysis is to be performed using subsequent (e.g., next) touch surface data and motion data or previous touch surface data and motion data (e.g., previous contact classifications determined using such previous data) to facilitate determining the contact classification.

As yet another example, if the result of the first pattern analysis indicates a first type of contact of the object (e.g., head of the user) with respect to the touch sensitive surface 104, and the result of the second pattern analysis indicates a first type of association of the object (e.g., head-hover of the user) with respect to the touch sensitive surface 104, in accordance with various implementations, the object classification component 112 can determine that the contact classification a head-related contact classification (e.g., head contact or head hover) or can determine that the contact classification is not sufficiently clear, depending in part on the applicable classification criteria. For instance, with regard to certain potentially applicable classification criteria related to some instances, it may be sufficient to classify the contact as a head contact or head hover in order to determine an action (e.g., event or response action) to be performed by the event determination component 114, wherein, the action can comprise, for example, a disabling of a touch function associated with the touch sensitive surface 104 and/or a switching off of the display screen 1104.

However, with regard to other potentially applicable classification criteria related to other instances, it may not be sufficient to classify the contact as a head contact or head hover in order to determine an action to be performed by the event determination component 114, and a more precise contact classification may be desirable. In such instances, the object classification component 112 can determine that further data analysis is to be performed using subsequent touch surface data and motion data or previous touch surface data and motion data to facilitate determining the contact classification with respect to the object (if any) and the touch sensitive surface 104.

In some embodiments, the object classification component 112 can utilize previous (e.g., relatively recent) or historical contact classifications with respect to object contacts or associations with the touch sensitive surface 104 (whether determined based on the method 2300 or another method(s) or technique(s), such as disclosed herein) to facilitate determining the contact classification with respect to the object (if any) and the touch sensitive surface 104.

In certain embodiments, the object classification component 112 can determine a contact classification for a contact or association (e.g., hover) of an object with respect to the touch sensitive surface 104, based at least in part on the results of analyzing the touch surface data and/or the motion data (e.g., raw or substantially raw touch surface data and/or motion data), without having to perform a pattern analysis (or subdivision analysis).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

With regard to the methods and/or flow diagrams described herein, for simplicity of explanation, the methods have been depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed herein and throughout this specification are capable of being stored on an article of manufacture to facilitate transporting and transferring such methods to computers. The term article of manufacture, as used herein, is intended to encompass a computer program accessible from any computer-readable device or storage media.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," "unit," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
  analyzing, by a system comprising a processor, characteristics of touch screen data associated with a touch sensitive surface that is associated with a device and a portion of motion data of at least one axis associated with the device, wherein a first amount of the motion data and a number of axes of the motion data to be included in the portion of the motion data is determined based at least in part on at least one of a second amount of time available to perform the analyzing, a third amount of resources available to perform the analyzing, or a confidence level that is associated with a preliminary contact classification for an object with respect to the touch sensitive surface and determined based at least in part on a preliminary analysis result of analyzing the touch screen data; and
  based at least in part on at least one result of the analyzing, determining, by the system, a contact classification for the object with respect to the touch sensitive surface to determine a contact state of the object in relation to the touch sensitive surface.

2. The method of claim 1, wherein the touch screen data comprises at least one of contact data or capacitive data, wherein, when the touch screen data comprises the contact data, the contact data indicates whether the object is in contact or is not in contact with the touch sensitive surface, and wherein, when the touch screen data comprises the capacitive data, the capacitive data indicates whether the object is in contact with the touch sensitive surface, is not in contact with the touch sensitive surface, is hovering within a defined distance of the touch sensitive surface resulting in a change in a capacitance value associated with the touch sensitive surface, or is not hovering within the defined distance of the touch sensitive surface.

3. The method of claim 1, wherein there is a set of contact classifications, comprising the contact classification, relating to the contact state of the object in relation to the touch sensitive surface, wherein the set of contact classifications comprise a no touch state, a head state, a finger state, a head-hovering state, and a finger-hovering state, wherein the no touch state indicates the object is not in contact with and is not hovering in proximity to the touch sensitive surface, the head state indicates that the object is a face, a head, or an ear of a user and is in contact with the touch sensitive surface, the finger state indicates that the object is a finger or a hand of the user and is in contact with the touch sensitive surface, the head-hovering state indicates that the object is the face, the head, or the ear of the user and is hovering over the touch sensitive surface in proximity to the touch sensitive surface and is not in contact with the touch sensitive surface, and the finger-hovering state indicates that the object is the finger or the hand of the user and is hovering over the touch sensitive surface in proximity to the touch sensitive surface and is not in contact with the touch sensitive surface.

4. The method of claim 1, wherein the motion data comprises at least one of vibro-acoustic data associated with the device, inertial measurement unit data associated with the device, accelerometer data associated with the device, gyroscope data associated with the device, acceleration data indicating an acceleration of the device, velocity data indicating a velocity of the device, angular rate data indicating an angular rate of the device, position data indicating a position or a change in position of the device, or orientation data indicating an orientation or a change in orientation of the device.

5. The method of claim 1, wherein the motion data of the at least one axis associated with the device comprises motion data of two or more axes associated with one or more sources of the motion data.

6. The method of claim 1, further comprising receiving, by the system, the motion data from at least one of an accelerometer, a gyroscope, an inertial measurement unit, or a sensor.

7. The method of claim 1, further comprising determining whether the object is in contact with the touch sensitive surface or whether the object is hovering in proximity to the touch sensitive surface based at least in part on the at least one result of the analyzing.

8. The method of claim 1, further comprising controlling, by the system, a display function associated with the touch sensitive surface based at least in part on the contact classification for the object, wherein the display function comprises enabling a touch sensitive function of the touch sensitive surface of a display screen of the device, disabling the touch sensitive function of the touch sensitive surface, switching the display screen to an on state, or switching the display screen to an off state.

9. The method of claim 1, further comprising determining, by the system, one or more descriptive features that are indicative of the object for at least one subdivision of subdivisions associated with at least one of the touch screen data or the motion data, based at least in part on the at least one result of the analyzing.

10. The method of claim 9, wherein the determining the contact classification comprises determining the contact classification for the object in contact with the touch sensitive surface based at least in part on the one or more descriptive features, at least one location of the at least one subdivision, and the motion data.

11. The method of claim 9, further comprising:
generating, by the system, frame data representative of an image indicating one or more respective locations of contact or hovering of one or more respective portions of the object with the touch sensitive surface based at least in part on at least one of the touch screen data or the motion data; and
dividing, by the system, the frame data into respective portions of the frame data to generate respective subdivisions of the subdivisions, wherein the respective subdivisions comprise the at least one subdivision, wherein the at least one subdivision comprises a first subdivision associated with a first portion of the frame data and a second subdivision associated with a second portion of the frame data, wherein the first subdivision partially overlaps the second subdivision, and wherein the analyzing comprises analyzing the respective subdivisions to determine respective descriptive features of the respective subdivisions.

12. The method of claim 11, further comprising:
converting, by the system, the frame data into a frequency domain representation, wherein the subdivisions are defined in the frequency domain representation;
extracting, by the system, at least one of a spectral centroid, a spectral density, spherical harmonics, a total average spectral energy, or log spectral band ratios based at least in part on the frequency domain representation; and
based at least in part on the extracting, classifying, by the system, one or more respective contacts within one or more respective subdivisions of the subdivisions of the touch sensitive surface.

13. The method of claim 1, further comprising:
comparing, by the system, the contact classification for the object with previous contact classifications; and
determining, by the system, the contact state of the object with the touch sensitive surface based at least in part on a comparison result of the comparing.

14. A system, comprising:
a memory that stores executable components; and
a processor, operatively coupled to the memory, that executes the executable components, the executable components comprising:
an object classification component configured to analyze touch surface information associated with a touch sensitive surface that is associated with a device and a portion of motion information of at least one axis associated with the device, wherein the object classification component is further configured to determine a contact classification for an object with respect to the touch sensitive surface, based at least in part on at least one result of the analyzing, to determine a contact state of the object with respect to the touch sensitive surface, and wherein a number of axes of the motion information to be included in the portion of the motion information is determined based at least in part on at least one of a first amount of time available to perform the analysis, a second amount of processing resources available to perform the analysis, or a confidence value that is associated with a preliminary contact classification for the object with respect to the touch sensitive surface and determined based at least in part on an intermediate analysis result of analyzing the touch surface information.

15. The system of claim 14, wherein the touch surface information comprises at least one of contact information or capacitive information, wherein the contact information indicates whether the object is in contact or is not in contact with the touch sensitive surface, and wherein the capacitive information indicates whether the object is in contact with the touch sensitive surface, is not in contact with the touch sensitive surface, is hovering in proximity to the touch sensitive surface resulting in a change in an amount of capacitance associated with the touch sensitive surface, or is not hovering in proximity to the touch sensitive surface.

16. The system of claim 14, wherein there is a set of contact classifications, comprising the contact classification, relating to the contact state of the object with respect to the touch sensitive surface, wherein the set of contact classifications comprise a no touch state, a head state, a finger state, a head-hovering state, and a finger-hovering state, wherein the no touch state indicates the object is not in contact with and is not hovering in proximity to the touch sensitive surface, the head state indicates that the object is a face, a head, or an ear of a user and is in contact with the touch sensitive surface, the finger state indicates that the object is a finger or a hand of the user and is in contact with the touch sensitive surface, the head-hovering state indicates that the object is the face, the head, or the ear of the user and is hovering over the touch sensitive surface in proximity to the touch sensitive surface and is not in contact with the touch sensitive surface, and the finger-hovering state indicates that the object is the finger or the hand of the user and is hovering over the touch sensitive surface in proximity to the touch sensitive surface and is not in contact with the touch sensitive surface.

17. The system of claim 14, wherein the motion information comprises at least one of vibro-acoustic information associated with the device, inertial measurement unit information associated with the device, accelerometer information associated with the device, gyroscope information associated with the device, acceleration information indicating an acceleration of the device, velocity information indicating a velocity of the device, angular rate information indicating an angular rate of the device, position information indicating a position or a change in position of the device, or orientation information indicating an orientation or a change in orientation of the device.

18. The system of claim 14, wherein the motion information of the at least one axis associated with the device comprises motion information of two or more axes associated with one or more sources of the motion information.

19. The system of claim 14, wherein the object classification component receives the motion information from at least one of an accelerometer, a gyroscope, an inertial measurement unit, or a sensor.

20. The system of claim 14, wherein the executable components further comprise an event determination component configured to control a display function associated with the touch sensitive surface based at least in part on the contact classification for the object, wherein the display function comprises enabling a touch sensitive function of the touch sensitive surface of a display screen of the device, disabling the touch sensitive function of the touch sensitive surface, transitioning the display screen from an off state to an on state, or transitioning the display screen from the on state to the off state.

21. The system of claim 14, wherein the object classification component is further configured to analyze the touch surface information, the motion information, and at least one other type of information, and determine the contact classification for the object with respect to the touch sensitive surface based at least in part on at least one result of the analyzing, and wherein the at least one other type of information comprises at least one of orientation information relating to an orientation of the device or touch information relating to touching of a portion of the device by a user.

22. The system of claim 14, wherein the motion information comprises previous motion information received prior to most recent motion information of the motion information, wherein the touch surface information comprises capacitive information that includes previous capacitive information received prior to most recent capacitive information of the capacitive information, and wherein the object classification component is further configured to determine the contact classification for the object with respect to the touch sensitive surface based at least in part on the previous capacitive information and the previous motion information.

23. The system of claim 14, wherein the object classification component is further configured to determine the contact classification for the object with respect to the touch sensitive surface, based at least in part on a result of analyzing previous classifications associated with the touch sensitive surface, to determine the contact state of the object with respect to the touch sensitive surface.

24. The system of claim 14, wherein the object classification component is further configured to determine one or more descriptive features that are indicative of the object for at least one subdivision of subdivisions of at least one of the touch surface information or the motion information, based at least in part on the at least one result of the analyzing, and wherein the contact classification for the object is determined based at least in part on the one or more descriptive features, at least one location of the at least one subdivision, and the motion information.

25. The system of claim 14, wherein the object classification component is further configured to be trained to distinguish between a first type of contact with the touch sensitive surface and at least one other type of contact with the touch sensitive surface based at least in part on example training classification samples comprising first positive example training classification samples relating to the first type of contact and at least one other example positive training classification samples relating to the at least one other type of contact, and wherein the first type of contact relates to an ear of a user in contact with the touch sensitive surface.

26. The system of claim 14, further comprising a buffer component configured to store at least one of a portion of the touch surface information or the portion of the motion information, in response to the device being determined to be in an in-call state, wherein the object classification component retrieves, from the buffer component, and analyzes at least one of the portion of the touch surface information or the portion of the motion information.

27. A non-transitory machine-readable medium, comprising executable instructions that, when executed by a processor, cause the processor to perform operations, comprising:
examining characteristics of frame data associated with a touch sensitive surface that is associated with a device and a subset of a set of motion data associated with at least one axis that is associated with the device, wherein a number of axes of the motion data to be included in the subset of the motion data is determined based at least in part on at least one of a time period available to perform the examining, an amount of resources available to perform the examining, or a confidence level that is for an initial contact classification for an object with respect to the touch sensitive surface and is determined based at least in part on an intermediate result of examining the frame data; and
based at least in part on at least one result of the examining, determining a contact classification for the object with respect to the touch sensitive surface to determine a contact state of the object with respect to the touch sensitive surface.

28. The non-transitory machine-readable medium of claim 27, wherein the operations further comprise:
receiving the motion data from at least one of an accelerometer, a gyroscope, an inertial measurement device, or a sensor, wherein the motion data is associated with more than one axis, and wherein the motion data is indicative of the contact classification to be associated with the object with respect to the touch sensitive surface.

* * * * *